US006725232B2

(12) United States Patent
Bradley et al.

(10) Patent No.: US 6,725,232 B2
(45) Date of Patent: Apr. 20, 2004

(54) DATABASE SYSTEM FOR LABORATORY MANAGEMENT AND KNOWLEDGE EXCHANGE

(75) Inventors: Jean-Claude Bradley, Philadelphia, PA (US); Benjamin P. Samuel, Philadelphia, PA (US); Nadarajan S. Babu, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 352 days.

(21) Appl. No.: 09/765,807

(22) Filed: Jan. 19, 2001

(65) Prior Publication Data

US 2003/0167280 A1 Sep. 4, 2003

(51) Int. Cl.⁷ .............................................. G06F 17/30
(52) U.S. Cl. ................ 707/103 R; 707/102; 707/104.1; 715/513; 715/531
(58) Field of Search ............................. 707/5, 10, 101, 707/104.1, 9, 102; 705/30; 715/102, 103 R, 513, 514, 530, 531; 713/1

(56) References Cited

U.S. PATENT DOCUMENTS

| 5,180,309 A | | 1/1993 | Egnor |
| 5,233,513 A | * | 8/1993 | Doyle ............................ 705/7 |
| 5,441,415 A | | 8/1995 | Lee et al. |
| 5,455,903 A | | 10/1995 | Jolissaint et al. |
| 5,725,384 A | | 3/1998 | Ito et al. |
| 5,740,035 A | | 4/1998 | Cohen et al. |
| 5,743,746 A | | 4/1998 | Ho et al. |

(List continued on next page.)

OTHER PUBLICATIONS

Soutou, Christian, "Knoledge Discovery in Relational Satabase: Extraction of N–ary Relationships", Proceedings of the Third Basque International Workshop on Information Technology, BIWIT Jul. 2–4, 1997, pp. 46–53.*

(List continued on next page.)

Primary Examiner—Shahid Alam
(74) Attorney, Agent, or Firm—Akin Gump Strauss Hauer & Feld LLP

(57) ABSTRACT

A database system is provided that allows for navigation to outgoing links and incoming links. The database system is defined by a plurality of database-oriented projects. Each project has one or more parameters. Each project also has one or more instances thereof. An entry is associated with each parameter in each instance of a project. In a project, a parameter may be defined as being a parameter of a previously defined project. If so, then the parameter is designated as a link to the parameter of the previously defined project. The link designation changes the structure of the database system. The name of a previously defined instance of a previously defined project is entered for the linked parameter entry. When a previously defined instance of a project having at least one linked parameter entry is displayed, an instance of a project having a linked parameter entry may be viewed by selecting the respective link from the display, thereby providing navigation to an outgoing link. The display further includes links to any instances having at least one link to the currently displayed instance of a project. The linked instances may be viewed by selecting the respectively displayed link from the display, thereby providing navigation to an incoming link. Furthermore, the entire process may be performed through a web browser interface. Also, reports are periodically generated of any user activity relating to users defining, modifying or viewing projects, parameters or instances. The reports are electronically communicated to predefined entities, thereby allowing the entities to be periodically made aware of any activity within the database system, including any changes made to the structure of the database as a result of defining or modifying projects. Knowledge exchange schemes are implemented using the database systems.

4 Claims, 67 Drawing Sheets

Partial View of an experiment in a Project Management Protocol

U.S. PATENT DOCUMENTS

| | | | |
|---|---|---|---|
| 5,784,539 A | | 7/1998 | Lenz |
| 6,029,171 A | * | 2/2000 | Smiga et al. ................ 707/102 |
| 6,041,303 A | | 3/2000 | Mathews ........................ 705/1 |
| 6,064,978 A | | 5/2000 | Gardner et al. |
| 6,421,678 B2 | * | 7/2002 | Smiga et al. ................ 707/102 |
| 6,449,659 B1 | * | 9/2002 | Caron et al. ................. 709/315 |

OTHER PUBLICATIONS

DOE2000 Electronic Notebook, printout from web site (http://www.epm.ornl.gov/enote), printout date: Nov. 13, 2000, 3 pages.

Geist, A. et al., ORNL Electronic Notebook Project, printout web site http://www.epm.ornl.gov/~geist/java/applets/enote/), printout date: Nov. 13, 2000, 7 pages.

Lima, T. "Creating Table Relationships." Printout from web site http://www.windowwatch.com/access4.html), printout date: Dec. 12, 2000, 6 pages. (article adapted from book: Microsoft Access 2.0 Projects for Windows (Benjamin–Cummings, 1995).

Fitzgerald, M.C. "The evolving, fully loaded, electronic laboratory notebook," printed from web site (http://pubs.acs.org/hotartcl/ci/00/jan/inet.html), printout date: Nov. 13, 2000, 4 pages. (article from Journal: Chemical Innovation, vol. 30, No. 1, Jan. 2000, p. 52+.

* cited by examiner

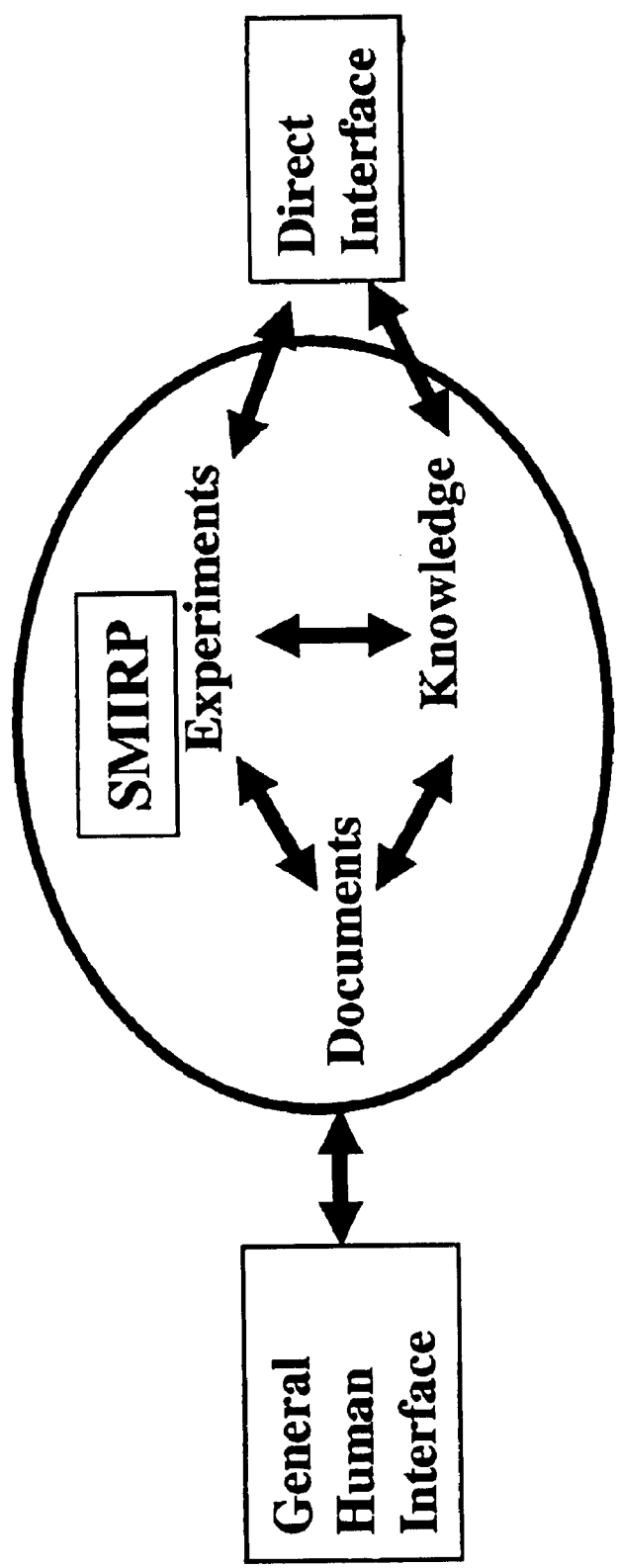
Figure 1. SMIRP General Design

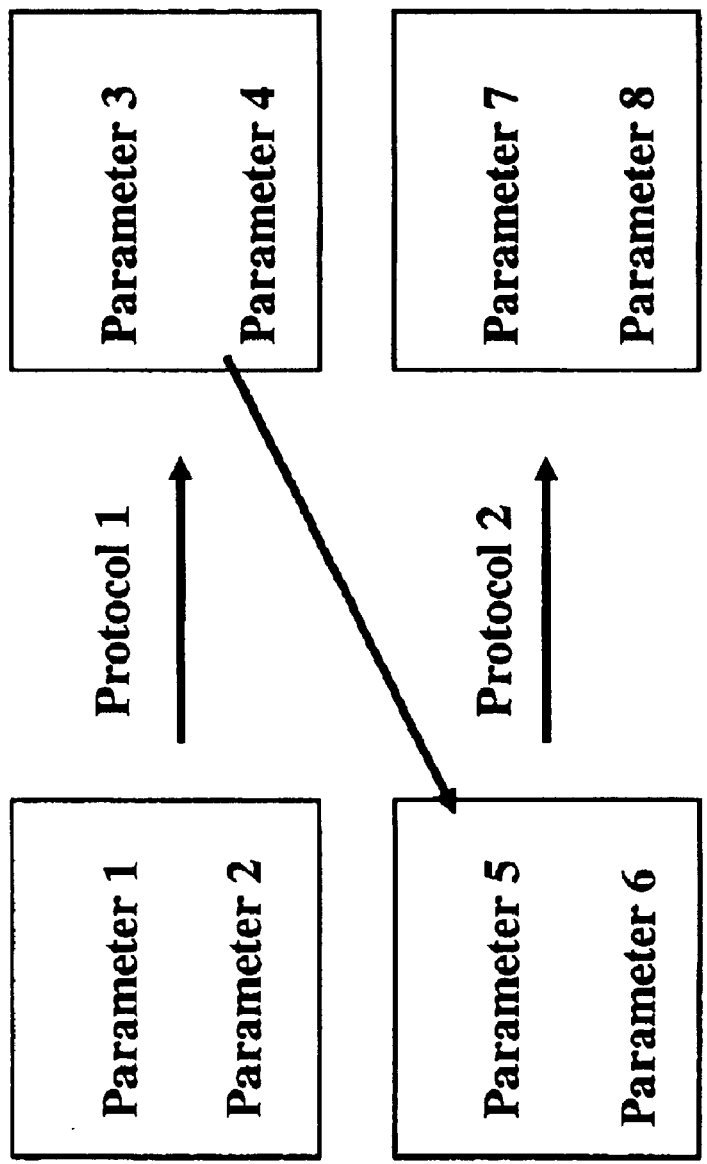
Figure 2. Fundamental Information Representation in SMIRP

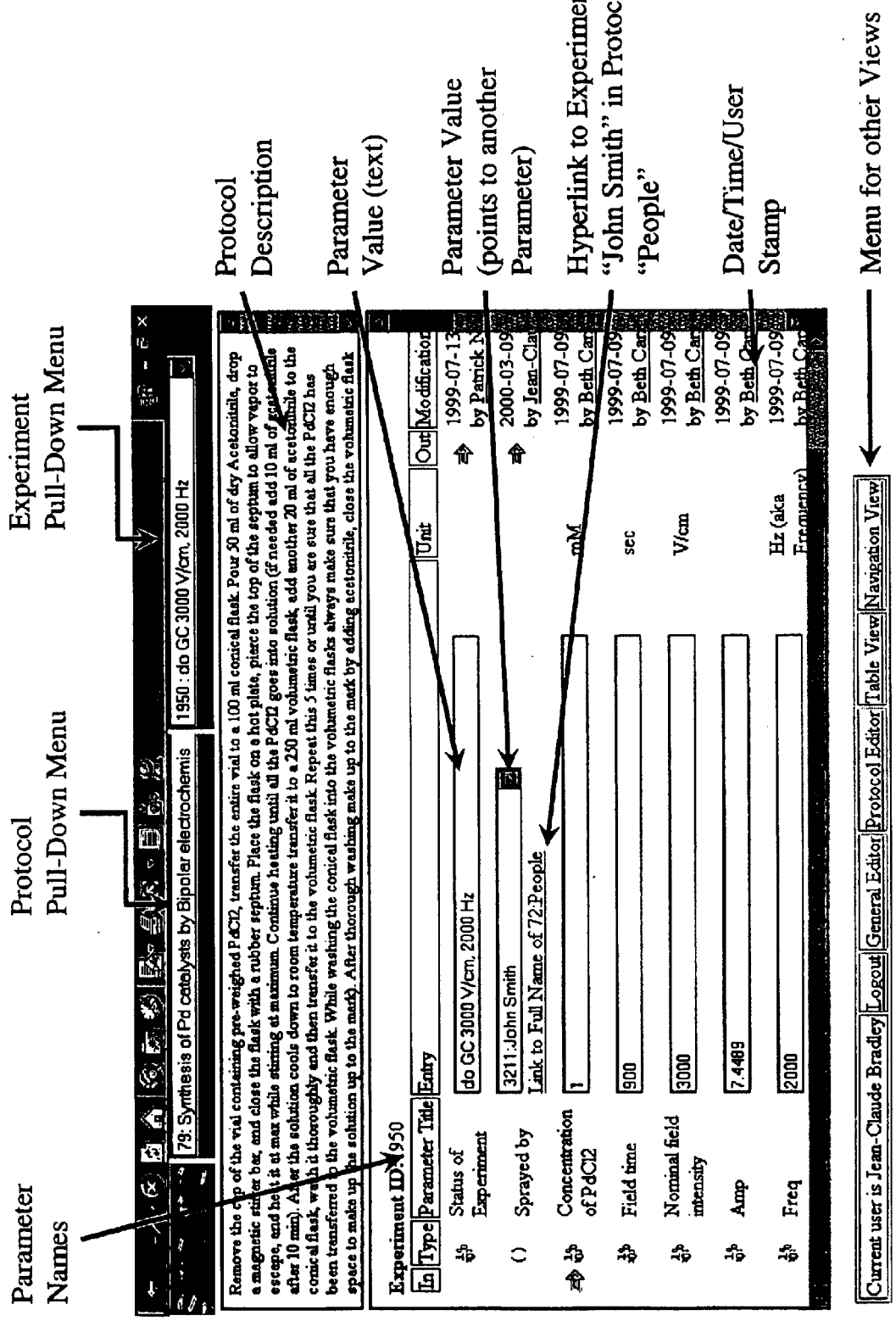
Figure 3: Key Features of the General Editor View

Figure 4: Link obtained upon clicking on "John Smith" hyperlinked parameter value

Protocol ID:79 Name:Synthesis of Pd catalysts by Bipolar electrochemis

Displaying 41st through 60th experiments out of 217.

| ID | Sprayed by | Concentration of PdCl2 (mM) | Field time (sec) | Nominal field intensity (V/cm) | Pd content from (%Pd on C) |
|---|---|---|---|---|---|
| 1824 | Patrick Ndungu | 1 | 900 | 1000 | 0.230 |
| 1825 | Patrick Ndungu | 1 | 900 | 2000 | 0.657 |
| 1849 | Aditya Mittal | 1 | 900 | 3000 | 1.3129 |
| 1850 | Aditya Mittal | 1 | 900 | 3000 | 3.7631 |
| 1851 | Aditya Mittal | 1 | 900 | 3000 | 1.2208 |
| 1852 | Aditya Mittal | 1 | 900 | 3000 | 1.8656 |
| 1853 | Aditya Mittal | 1 | 0 | 0 | 0.4778 |
| 1854 | Aditya Mittal | 1 | 900 | 3000 | 0.9383 |
| 1855 | Aditya Mittal | 1 | 900 | 0 | 0.3672 |
| 1856 | Aditya Mittal | 1 | 900 | 500 | 0.368 |
| 1875 | Beth E. Carroll | 1 | 900 | 3000 | 13.9 |
| 1876 | Beth E. Carroll | 1 | 900 | 500 | 0.243 |
| 1877 | Beth E. Carroll | 1 | 900 | 1000 | 1.02 |
| 1878 | Beth E. Carroll | 1 | 900 | 2000 | 0.419 |

Current user is Jean-Claude Bradley | Logout | General Editor | Protocol Editor | Table View | Navigation View

Fig 5. Table View of selected experiments and parameters from a protocol

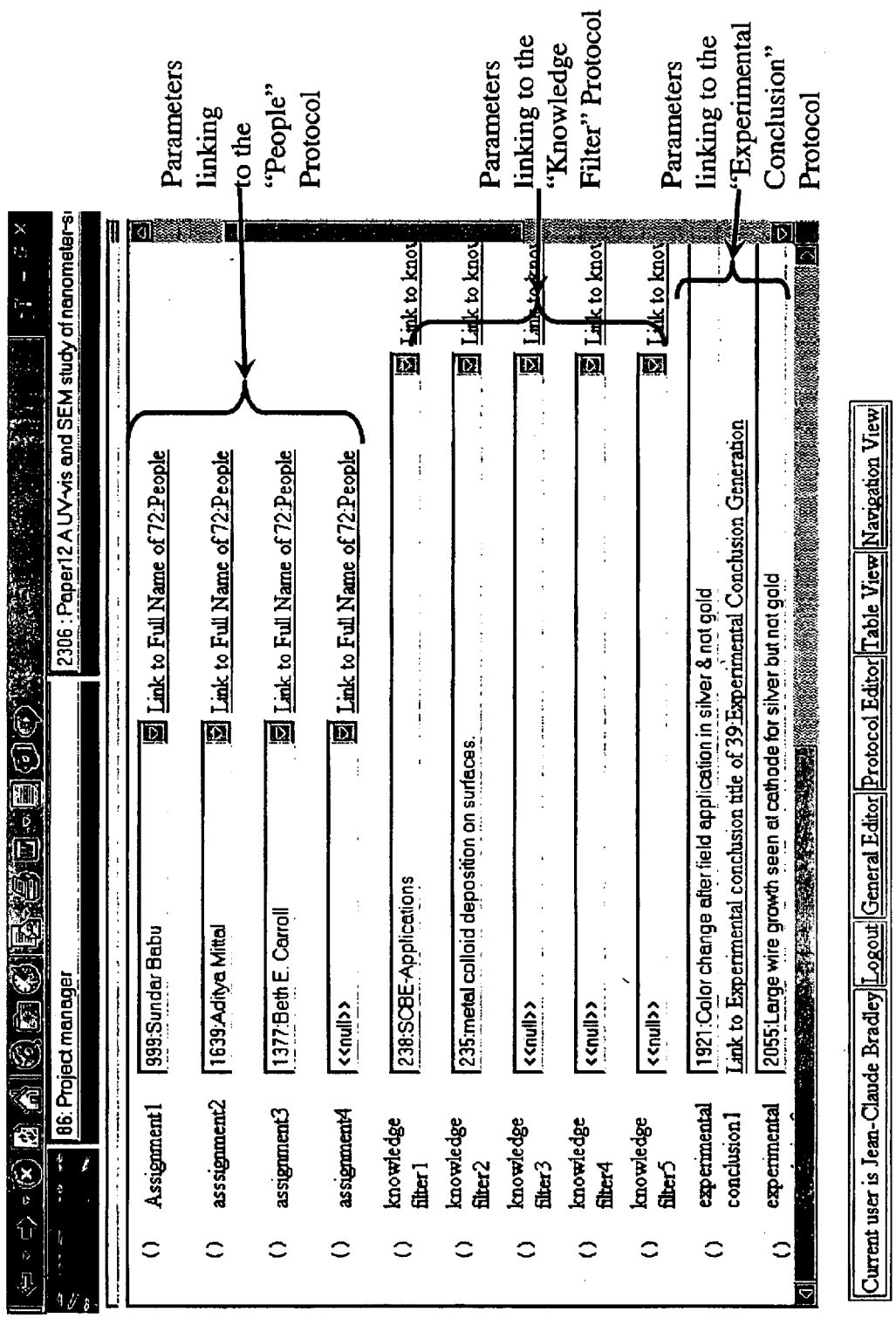
Figure 6: Partial View of an experiment in a Project Management Protocol

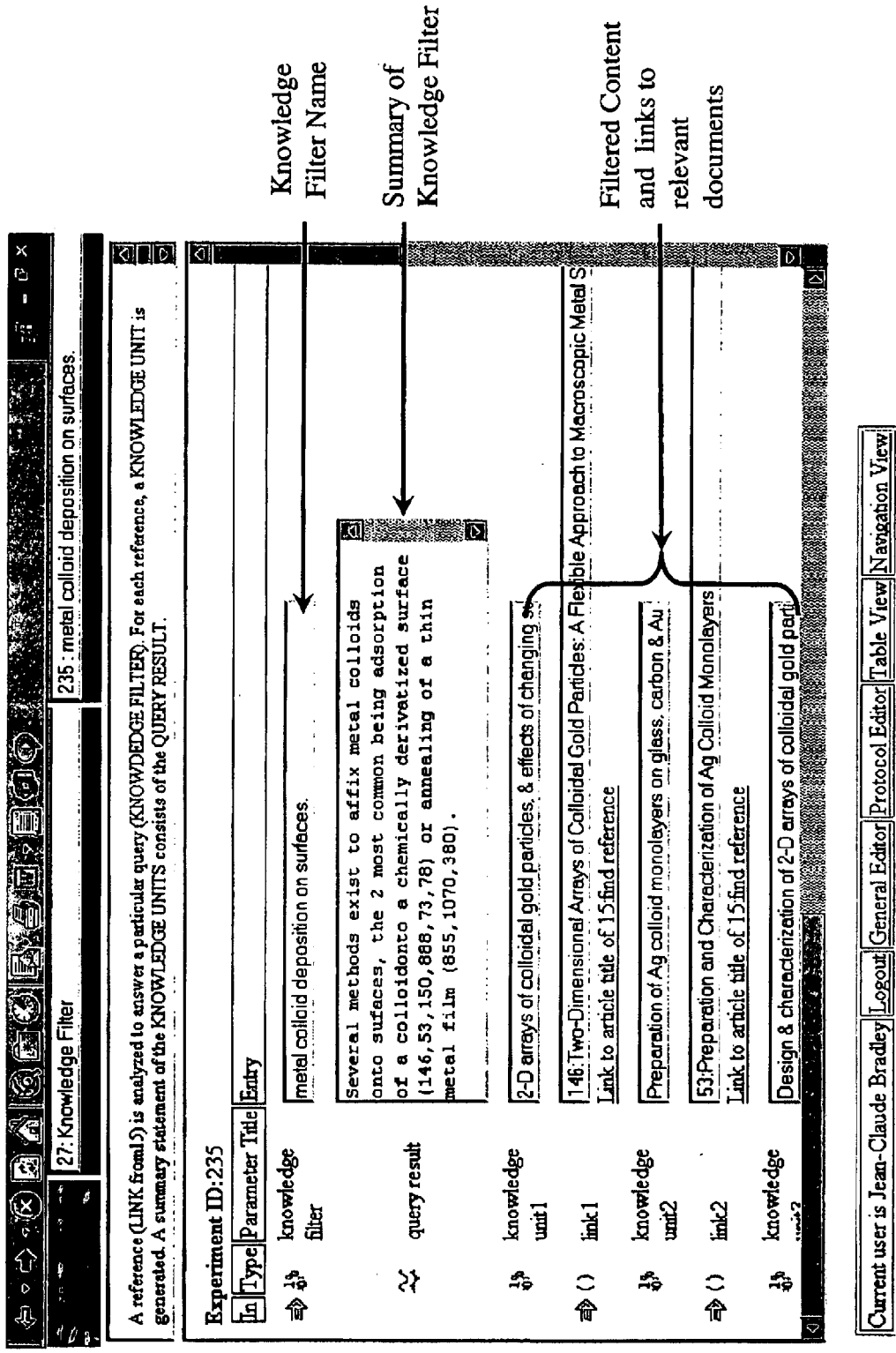
Figure 7: Knowledge Filter Protocol

Figure 8: Link obtained upon clicking on "John Smith" hyperlinked parameter value

Protocol ID: 3       IMPORTANT: WHEN YOU ARE FINISHED WITH YOUR ANSWER SELECT "ANSWER FINISHED-PLEASE GRADE" FROM THE GRADING CATEGORY After you have found an appropriate reference and either uploaded or linked to it in Protocol 5 (References), do the following:

1) Fill in the "Student/Question#" Field with your codeword and your question (e.g. "s01-q1" for student "s01" answering question 1)

2) Select the question you are answering by selecting it from the drop down "Question"

3) Select your own codename

4) The "Authorized User" field will automatically fill itself out

5) Enter your answer in plain text as follows:
Each answer must be between 500 and 1000 words.
Each answer must be supported by at least 1 published reference (Max of 3).
If you have more than one reference indicate the appropriate reference number within your text in square brackets.
Textbooks and non-peer reviewed Web pages DO NOT qualify as a reference 6) Select the appropriate reference(s) using the pull down menus.

7) Your answer will be graded and commented by the teacher in the remaining fields.

FIG. 11A

| Protocol ID: 5 | IMPORTANT: YOU CAN ONLY GUARANTEE YOUR REFERENCE PRIORITY WITH A PROPER CITATION FORMAT. |

AN IMPROPER CITATION WILL NOT SORT PROPERLY AND MAY BE MISSED AS OTHER STUDENTS CHECK TO SEE IF THAT REFERENCE HAS ALREADY BEEN TAKEN. DO NOT BOTHER TO UPLOAD A REFERENCE UNLESS YOU ARE WILLING TO PUT A PROPER CITATION.

This is the first step of answering a question.

Supply those resources that are relevant to a question you are trying to answer. You may not list or use a reference which has already been uploaded by another student. It is your responsibility to ensure that your reference has not already been used. It is recommended that you enter your references early to ensure that they will still be available.

Textbooks and non-peer reviewed Web pages DO NOT qualify as a reference.

1) Use the following format for the "Citation":
Last name, Initial.; Last name, Initial.; Last name, Initial. (Year). Article title. Journal/book title, volume: pages.
Example of format:
McEachron, D.; Finegold, L. (2000). Epidemiology: Teaching the Fundamentals. American Biology Teacher, 62: 8-17.
Gardiner, K. (1997). Clonability and gene distribution on human chromosome 21: reflections of junk DNA content?. Gene 205: 39-46.
Herdegen, T.; Leah, J. D. (1998). Inducible and constitutive transcription factors in the mammalian nervous system: control of gene expression by Jun, Fos and Krox, and CREB/ATF proteins. Brain Research Reviews, 28: 370-490.
Holroyd, C.; Kistner, U.; Annaert, W.; Jahn, R. (1999). Fusion of Endosomes Involved in Synaptic Vesicle Recycling. Molecular Biology of the Cell, 10: 3035-44.

2) Select your own codeword using the "Student" pulldown.

3) Either Upload a file into "Document" or write out the url to a web page into "Hyperlink". To upload a file:

a) You can obtain a list of online journals from http://www.library.drexel.edu/er/er.html. Once you have found the article you are looking for, right click on the link that says "article PDF" and then select "save as target". Save the file to the desktop and be sure to check it by opening the file from the desktop icon.
b) Click on Save Changes and Review so the Hyperlink "Preview" appears next to Document.
c) Click on the Hyperlink "Preview" then browse and upload a file.

4) Your reference will be graded and commented separately from your answer.

FIG. 12L smip

Protocol ID: 30 | 30: Job applicant tracking for new paralegal
Load

Protocol ID: 30 | This protocol will be used for tracking job applicants who respond to our advertisement in Monster.com for a paralegal position with our law firm.

0 : <<blank>> | Load

Protocol ID: 30 Experiment ID: blank

| Parameter Title | Entry | Unit | Modification Information |
|---|---|---|---|
| Applicant name | | | |
| Results of first interview | | | |
| Results of second interview | | | |
| Applicant met with | 0 : <<Null>> | | |
| | Link to Name (3) of People (1) | | |
| | Go | | |

Save Changes & Review | Save Changes & Show Blank Form

CLARK: | General Editor | Table View | Logout | Protocol Editor

FIG. 12N

FIG. 12O smirpspace28 - Hourly Audit

| date_time | firstname | lastname | experimentID | expName | protocolID | protocol_name | parameter_name | pvalue | email |
|---|---|---|---|---|---|---|---|---|---|
| 12/20/2000 5:47:39 PM | clark | | 533 | Eager Beaver | 30 | Job applicant tracking for new paralegal | Applicant name | Eager Beaver | |
| 12/20/2000 5:47:39 PM | clark | | 533 | Eager Beaver | 30 | Job applicant tracking for new paralegal | Results of first interview | Very enthusiastic, flag for second interview | |
| 12/20/2000 5:47:39 PM | clark | | 533 | Eager Beaver | 30 | Job applicant tracking for new paralegal | Results of second interview | | |
| 12/20/2000 5:47:39 PM | clark | | 533 | Eager Beaver | 30 | Job applicant tracking for new paralegal | Applicant met with | 2762 | |

12/20/2000 6:01:04 PM

FIG. 14A smirpspace28 - Profile Dump

| Date_time | First Name | Last Name | Protocol ID | Protocol Name | Experiment ID | Experiment Name | Parameter Entry ID | Parameter Name | Value | Template | Authorisation | Operation | trackID | track_referID |
|---|---|---|---|---|---|---|---|---|---|---|---|---|---|---|
| 12/20/2000 5:23:39 PM | clark | | 0 | | 0 | | 0 | | success | /smirpspace28/editor/default.cfm | True | login | 25489 | 0 |
| 12/20/2000 5:23:39 PM | clark | | 0 | | 0 | | 0 | | | /smirpspace28/editor/default.cfm | True | read | 25490 | 0 |
| 12/20/2000 5:23:40 PM | clark | | 1 | People | 0 | | 0 | | | /smirpspace28/editor/protocol.cfm | True | read | 25491 | 25490 |
| 12/20/2000 5:23:40 PM | clark | | 1 | People | 0 | | 0 | | | /smirpspace28/editor/experiment.cfm | True | read | 25492 | 25490 |
| 12/20/2000 5:23:41 PM | clark | | 1 | People | 0 | | 0 | | | /smirpspace28/editor/expFrame.cfm | True | read | 25493 | 25490 |
| 12/20/2000 5:23:42 PM | clark | | 1 | People | 0 | | 0 | | | /smirpspace28/editor/form.cfm | True | read | 25494 | 25493 |

FIG. 14B

| | | | | | | | | | | |
|---|---|---|---|---|---|---|---|---|---|---|
| 12/20/2000 5:23:42 PM | clark | 1 | People | 0 | | 0 | | /smirpspace28/swap.cfm | True | read | 25495 | 25493 |
| 12/20/2000 5:23:43 PM | clark | 1 | People | 0 | | 0 | | /smirpspace28/editor/desc.cfm | True | read | 25496 | 25493 |
| 12/20/2000 5:24:43 PM | clark | 1 | People | 0 | | 0 | | /smirpspace28/protocols/default.cfm | True | read | 25497 | 25495 |
| 12/20/2000 5:24:44 PM | clark | 1 | People | 0 | | 0 | | /smirpspace28/protocols/quicknav.cfm | True | read | 25498 | 25497 |
| 12/20/2000 5:24:44 PM | clark | 1 | People | 0 | | 0 | | /smirpspace28/swap.cfm | True | read | 25499 | 25497 |
| 12/20/2000 5:25:40 PM | clark | 0 | | 0 | | 0 | | /smirpspace28/protocols/editpro.cfm | True | read | 25500 | 25498 |
| 12/20/2000 5:29:55 PM | clark | 30 | Job applicant tracking for new paralegal | 0 | | 0 | | /smirpspace28/protocols/updatePro.cfm | True | insert | 25501 | 0 |

FIG. 14C

| | | | | | | | | |
|---|---|---|---|---|---|---|---|---|
| 12/20/2000 5:30:01 PM | clark | | 30 | Job applicant tracking for new paralegal | 0 | | 0 | /smirpspace28/protocols/default.cfm | True | read | 25502 | 25501 |
| 12/20/2000 5:30:02 PM | clark | | 30 | Job applicant tracking for new paralegal | 0 | | 0 | /smirpspace28/protocols/editPro.cfm | True | read | 25503 | 25502 |
| 12/20/2000 5:30:03 PM | clark | | 30 | Job applicant tracking for new paralegal | 0 | | 0 | /smirpspace28/swap.cfm | True | read | 25504 | 25502 |
| 12/20/2000 5:30:04 PM | clark | | 30 | Job applicant tracking for new paralegal | 0 | | 0 | /smirpspace28/protocols/quicknav.cfm | True | read | 25505 | 25502 |
| 12/20/2000 5:31:46 PM | clark | | 30 | Job applicant tracking for new paralegal | 0 | | 0 | /smirpspace28/protocols/default.cfm | True | read | 25506 | 25505 |
| 12/20/2000 5:31:50 PM | clark | | 30 | Job applicant tracking for new paralegal | 0 | | 0 | /smirpspace28/protocols/showPar.cfm. | True | read | 25507 | 25506 |

FIG. 14D

| 12/20/ 2000 5:31:5 0 PM | clark | 30 | Job applicant tracking for new paralegal | 0 | | | /smirpspace28/proto cols/quicknav.cfm | True | read | 25508 | 25506 |
| 12/20/ 2000 5:31:5 1 PM | clark | 30 | Job applicant tracking for new paralegal | 0 | | | /smirpspace28/proto cols/listParam.cfm | True | read | 25509 | 25507 |
| 12/20/ 2000 5:31:5 3 PM | clark | 30 | Job applicant tracking for new paralegal | 0 | | | /smirpspace28/swap. cfm | True | read | 25510 | 25506 |
| 12/20/ 2000 5:31:5 3 PM | clark | 30 | Job applicant tracking for new paralegal | 0 | | | /smirpspace28/proto cols/editParam.cfm | True | read | 25511 | 25509 |
| 12/20/ 2000 5:32:1 2 PM | clark | 30 | Job applicant tracking for new paralegal | 0 | | | /smirpspace28/proto cols/showPar.cfm | True | read | 25512 | 0 |
| 12/20/ 2000 5:35:1 3 PM | clark | 30 | Job applicant tracking for new paralegal | 0 | | | /smirpspace28/proto cols/listParam.cfm | True | read | 25513 | 25512 |

FIG. 14E

| | | | | | | | | |
|---|---|---|---|---|---|---|---|---|
| 12/20/2000 5:35:36 PM | clark | 30 | Job applicant tracking for new paralegal | 0 | | | /smirpspace28/protocols/editParam.cfm | True | read | 25514 | 25513 |
| 12/20/2000 5:36:41 PM | clark | 30 | Job applicant tracking for new paralegal | 0 | | | /smirpspace28/protocols/showPar.cfm | True | read | 25515 | 0 |
| 12/20/2000 5:36:42 PM | clark | 30 | Job applicant tracking for new paralegal | 0 | | | /smirpspace28/protocols/listParam.cfm | True | read | 25516 | 25515 |
| 12/20/2000 5:36:48 PM | clark | 30 | Job applicant tracking for new paralegal | 0 | | | /smirpspace28/protocols/editParam.cfm | True | read | 25517 | 25516 |
| 12/20/2000 5:37:03 PM | clark | 30 | Job applicant tracking for new paralegal | 0 | | | /smirpspace28/protocols/showPar.cfm | True | read | 25518 | 0 |
| 12/20/2000 5:37:04 PM | clark | 30 | Job applicant tracking for new paralegal | 0 | | | /smirpspace28/protocols/listParam.cfm | True | read | 25519 | 25518 |

FIG. 14F

| | | | | | | | | | |
|---|---|---|---|---|---|---|---|---|---|
| 12/20/ 2000 5:37:12 PM | clark | 30 | Job applicant tracking for new paralegal | 0 | | /smirpspace28/proto cols/editParam.cfm | True | read | 25520 | 25519 |
| 12/20/ 2000 5:37:50 PM | clark | 0 | | 0 | | | | | | |
| 12/20/ 2000 5:38:33 PM | clark | 30 | Job applicant tracking for new paralegal | 0 | | /smirpspace28/proto cols/typePicker.cfm | True | read | 25521 | 0 |
| 12/20/ 2000 5:38:34 PM | clark | 30 | Job applicant tracking for new paralegal | 0 | | /smirpspace28/proto cols/showPar.cfm | True | read | 25535 | 0 |
| 12/20/ 2000 5:38:49 PM | clark | 30 | Job applicant tracking for new paralegal | 0 | | /smirpspace28/proto cols/listParam.cfm | True | read | 25536 | 25535 |
| 12/20/ 2000 5:38:49 PM | clark | 30 | Job applicant tracking for new paralegal | 0 | | /smirpspace28/proto cols/deleteParam.cf m | True | delete | 25537 | 25536 |
| 12/20/ 2000 5:38:49 PM | clark | 30 | Job applicant tracking for new paralegal | 0 | | /smirpspace28/proto cols/showPar.cfm | True | read | 25538 | 25537 |

FIG. 14G

| | | | | | | | | |
|---|---|---|---|---|---|---|---|---|
| 12/20/2000 5:38:50 PM | clark | | 30 | Job applicant tracking for new paralegal | 0 | | /smirpspace28/protocols/listParam.cfm | True | read | 25539 | 25538 |
| 12/20/2000 5:38:52 PM | clark | | 30 | Job applicant tracking for new paralegal | 0 | | /smirpspace28/protocols/editParam.cfm | True | read | 25540 | 25539 |
| 12/20/2000 5:40:05 PM | clark | | 30 | Job applicant tracking for new paralegal | 0 | | /smirpspace28/protocols/showPar.cfm | True | read | 25541 | 0 |
| 12/20/2000 5:40:05 PM | clark | | 30 | Job applicant tracking for new paralegal | 0 | | /smirpspace28/protocols/listParam.cfm | True | read | 25542 | 25541 |
| 12/20/2000 5:40:11 PM | clark | | 30 | Job applicant tracking for new paralegal | 0 | | /smirpspace28/protocols/deleteParam.cfm | True | delete | 25543 | 25542 |
| 12/20/2000 5:40:11 PM | clark | | 30 | Job applicant tracking for new paralegal | 0 | | /smirpspace28/protocols/showPar.cfm | True | read | 25544 | 25543 |

FIG. 14H

| | | | | | | | | |
|---|---|---|---|---|---|---|---|---|
| 12/20/2000 5:40:15 PM | clark | | 30 | Job applicant tracking for new paralegal | 0 | | /smirpspace28/protocols/listParam.cfm | True | read | 25545 | 25544 |
| 12/20/2000 5:40:18 PM | clark | | 30 | Job applicant tracking for new paralegal | 0 | | /smirpspace28/protocols/editParam.cfm | True | read | 25546 | 25545 |
| 12/20/2000 5:40:51 PM | clark | | 30 | Job applicant tracking for new paralegal | 0 | | /smirpspace28/protocols/showPar.cfm | True | read | 25547 | 0 |
| 12/20/2000 5:40:52 PM | clark | | 30 | Job applicant tracking for new paralegal | 0 | | /smirpspace28/protocols/listParam.cfm | True | read | 25548 | 25547 |
| 12/20/2000 5:40:58 PM | clark | | 30 | Job applicant tracking for new paralegal | 0 | | /smirpspace28/protocols/deleteParam.cfm | True | delete | 25549 | 25548 |
| 12/20/2000 5:40:58 PM | clark | | 30 | Job applicant tracking for new paralegal | 0 | | /smirpspace28/protocols/showPar.cfm | True | read | 25550 | 25549 |

FIG. 14I

| | | | | | | | | | |
|---|---|---|---|---|---|---|---|---|---|
| 12/20/2000 5:41:02 PM | clark | | 30 | Job applicant tracking for new paralegal | 0 | | | /smirpspace28/protocols/listParam.cfm | True | read | 25551 | 25550 |
| 12/20/2000 5:41:12 PM | clark | | 30 | Job applicant tracking for new paralegal | 0 | | | /smirpspace28/protocols/editParam.cfm | True | read | 25552 | 25551 |
| 12/20/2000 5:41:12 PM | clark | | 30 | Job applicant tracking for new paralegal | 0 | | | /smirpspace28/protocols/editParam.cfm | True | read | 25553 | 25551 |
| 12/20/2000 5:41:40 PM | clark | | 30 | Job applicant tracking for new paralegal | 0 | | | /smirpspace28/protocols/showPar.cfm | True | read | 25554 | 0 |
| 12/20/2000 5:41:41 PM | clark | | 30 | Job applicant tracking for new paralegal | 0 | | | /smirpspace28/protocols/listParam.cfm | True | read | 25555 | 25554 |
| 12/20/2000 5:42:25 PM | clark | | 30 | Job applicant tracking for new paralegal | 0 | | | /smirpspace28/editor/default.cfm | True | read | 25556 | 25510 |

FIG. 14J

| | | | | | | | | |
|---|---|---|---|---|---|---|---|---|
| 12/20/2000 5:42:26 PM | clark | | 30 | Job applicant tracking for new paralegal | 0 | | 0 | /smirpspace28/editor/protocol.cfm | True | read | 25557 | 25556 |
| 12/20/2000 5:42:29 PM | clark | | 30 | Job applicant tracking for new paralegal | 0 | | 0 | /smirpspace28/editor/experiment.cfm | True | read | 25558 | 25556 |
| 12/20/2000 5:42:30 PM | clark | | 30 | Job applicant tracking for new paralegal | 0 | | 0 | /smirpspace28/editor/expFrame.cfm | True | read | 25559 | 25556 |
| 12/20/2000 5:42:31 PM | clark | | 30 | Job applicant tracking for new paralegal | 0 | | 0 | /smirpspace28/editor/form.cfm | True | read | 25560 | 25559 |
| 12/20/2000 5:42:31 PM | clark | | 30 | Job applicant tracking for new paralegal | 0 | | 0 | /smirpspace28/editor/desc.cfm | True | read | 25561 | 25559 |
| 12/20/2000 5:42:32 PM | clark | | 30 | Job applicant tracking for new paralegal | 0 | | 0 | /smirpspace28/swap.cfm | True | read | 25562 | 25559 |

FIG. 14K

| | | | | | | | | | | |
|---|---|---|---|---|---|---|---|---|---|---|
| 12/20/ 2000 5:43:35 PM | clark | | Job applicant tracking for new paralegal | 0 | | | | /smirpspace28/protocols/default.cfm | True | read | 25563 | 25562 |
| 12/20/ 2000 5:43:36 PM | clark | 30 | Job applicant tracking for new paralegal | 0 | | | | /smirpspace28/protocols/quicknav.cfm | True | read | 25564 | 25563 |
| 12/20/ 2000 5:43:36 PM | clark | 30 | Job applicant tracking for new paralegal | 0 | | | | /smirpspace28/swap.cfm | True | read | 25565 | 25563 |
| 12/20/ 2000 5:45:14 PM | clark | 1 | People | 0 | | | Name | /smirpspace28/editor/controlAuxiliary.cfm | True | read | 25566 | |
| 12/20/ 2000 5:47:39 PM | clark | 30 | Job applicant tracking for new paralegal | 533 | Eager Beaver | 0 | Applicant name | Eager Beaver | /smirpspace28/editor/modify.cfm | True | insert | 25599 | 25598 |

FIG. 14L

| 12/20/2000 5:47:39 PM | clark | 30 | Job applicant tracking for new paralegal | 533 | Eager Beaver | 0 | Results of first interview | Very enthusiastic, flag for second interview | /smirpspace28/editor/modify.cfm | True | insert | 25600 | 25598 |
|---|---|---|---|---|---|---|---|---|---|---|---|---|---|
| 12/20/2000 5:47:39 PM | clark | 30 | Job applicant tracking for new paralegal | 533 | Eager Beaver | 0 | Results of second interview | | /smirpspace28/editor/modify.cfm | True | insert | 25601 | 25598 |
| 12/20/2000 5:47:39 PM | clark | 30 | Job applicant tracking for new paralegal | 533 | Eager Beaver | 0 | Applicant met with | 2762 | /smirpspace28/editor/modify.cfm | True | insert | 25602 | 25598 |
| 12/20/2000 5:47:39 PM | Clark | 30 | Job applicant tracking for new paralegal | 0 | | 0 | | | /smirpspace28/editor/modify.cfm | True | update | 25598 | 25560 |
| 12/20/2000 5:47:42 PM | Clark | 30 | Job applicant tracking for new paralegal | 533 | Eager Beaver | 0 | | | /smirpspace28/editor/experiment.cfm | True | read | 25603 | 25598 |

FIG. 14M

| 12/20/ 2000 5:47:4 2 PM | Clark | 30 | Job applicant tracking for new paralegal | 533 | Eager Beaver | 0 | | | /smirpspace28/editor/form.cfm | True | read | 25604 | 25598 |

12/20/2000 6:02:08 PM

FIGS. 14N application templates

| logout.cfm | Clears a user's session data |

| swap.cfm | Allows navigation between Smirp sections. |

| nothing.cfm | Does nothing. Used to safely test the server. |

FIG. 15B custom templates

| experimentList.cfm | Fetches a list of experiments accessible to the user. |

| experimentCount.cfm | Counts the number of experiments accessible to the user. |

| protocol.cfm | Loads a protocol into the global protocol stash. |

| experiment.cfm | Loads an experiment into a local structure. |

| permissions.cfm | Determines what privileges the user has for various objects. |

FIG. 15E editor templates

| | |
|---|---|
| expFrame.cfm | Continued from previous page. |
| desc.cfm | Displays a protocol-switching widget. |
| form.cfm | Displays the form for entry and modification. |
| | Continued on next page. |
| swap.cfm | Displays swap bar to switch between Smirp sections. | central templates

| loopSpaces.cfm | Applies an action to the user's selection of spaces. |

| testUrl.cfm | Loads a URL and returns the result, success or failure. |

FIG. 15Q

Custom Tags

| dump.cfm | Outputs simple and complex Cold Fusion data structures in HTML. Ought to be part of Cold Fusion. |
|---|---|
| careful.cfm | Acts as a gatekeeper, presenting a form that warns the user of danger without having to code two separate pages. |
| style.cfm | Handles CSS for the entire site, and works around odd Netscape bugs. |
| RegistryCopyKey.cfm | Recursively copies an entire branch in the Windows Registry. |

FIG. 15R

DATABASE SYSTEM FOR LABORATORY MANAGEMENT AND KNOWLEDGE EXCHANGE

STATEMENT REGARDING FEDERALLY SPONSORED RESEARCH OR DEVELOPMENT

This research was supported in part by U.S. Government funds (National Science Foundation Grant Number CHE-9875855, and the U.S. Government may therefore have certain rights in the invention.

COMPACT DISC APPENDIX

This patent application includes an Appendix on one compact disc having a file named appendix.txt, created on Jan. 17, 2001, and having a size of 351,000 bytes. The compact disc is incorporated by reference into the present patent application.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Computer database technology, the Internet and automation have enabled an uprecedented production of new data and analysis capabilities for recording and managing scientific data. For example, the biotechnology sector produces vast amounts of data, primarily due to highly automated combinatorial techniques for drug discovery.

However, the management of discovery-driven scientific processes is not as readily amenable to such automation since experimental designs and results may be highly variable. The current industry approach to managing the scientific processes is to use "electronic notebooks." An electronic notebook (also referred to as an "electronic R&D notebook" or an "electronic laboratory notebook") is the electronic equivalent of a paper research notebook. The electronic notebook receives inputs from keyboards, sketchpads, pointer devices (e.g., a mouse), image files, microphones, or outputs of scientific instruments. Electronic notebook software typically allows for collaborative work so that scientists in different remote locations may collaborate on scientific tasks by sharing common records containing ideas, data, and events of joint experiments and research programs.

There are various approaches to implement electronic notebooks. Numerous industry projects are underway to create standardized electronic notebooks for the research community. Some projects include (1) DOE 2000 Electronic Notebook Project; (2) Collaborative Electronic Notebook Systems Consortium; (3) Virtual Notebook Environment (ViNE) developed at University of Oregon; and (4) ZOO which is a generic Desktop Experiment Management Environment (see http://www.cs.wisc.edu/ZOO).

One difficulty with the flexibility of most general purpose electronic notebooks is that inherent data tractability is somewhat limited and highly dependent upon the initiative of the researcher to include sufficient information when recording experiments. In other words, there is generally no standard mechanism to trace data related to a particular experiment within an electronic notebook environment. Also, the primary application of electronic notebooks lies in the recording of experiments, with limited attention to other aspects of laboratory management.

It would be desirable to provide an electronic system that can encompass not only laboratory research, but also virtually all other components involved in the discovery-driven research operation. It would also be desirable to provide a system that allows users of research databases to selectively manipulate the structure of the database for their particular needs, without the user needing to possess computer programming skills. Furthermore, it would be desirable to use such a system for commercial purposes so that queries of interest to commercial entities may be entered into the system, respondents may enter answers into the system, and the answers may be sold to the commercial entities.

BRIEF DESCRIPTION OF THE DRAWING

The foregoing summary as well as the following detailed description of preferred embodiments of the invention, will be better understood when read in conjunction with the appended drawing. For the purpose of illustrating the invention, there is shown in the drawing an embodiment which are presently preferred. It should be understood, however, that the invention is not limited to the precise arrangements and instrumentalities shown. In the drawing:

FIG. 1 shows a general high-level design of the present invention;

FIG. 2 shows the fundamental information representation of the present invention;

FIGS. 3–8, 9A–9D, 10A–10E, 11A–11B and 12A–12O show screen captures of user interface displays of the present invention;

FIGS. 14A–14N show sample alerts that are communicated to authorized persons who monitor the use of the system in the present invention.

BRIEF SUMMARY OF THE INVENTION

Figure 10A:
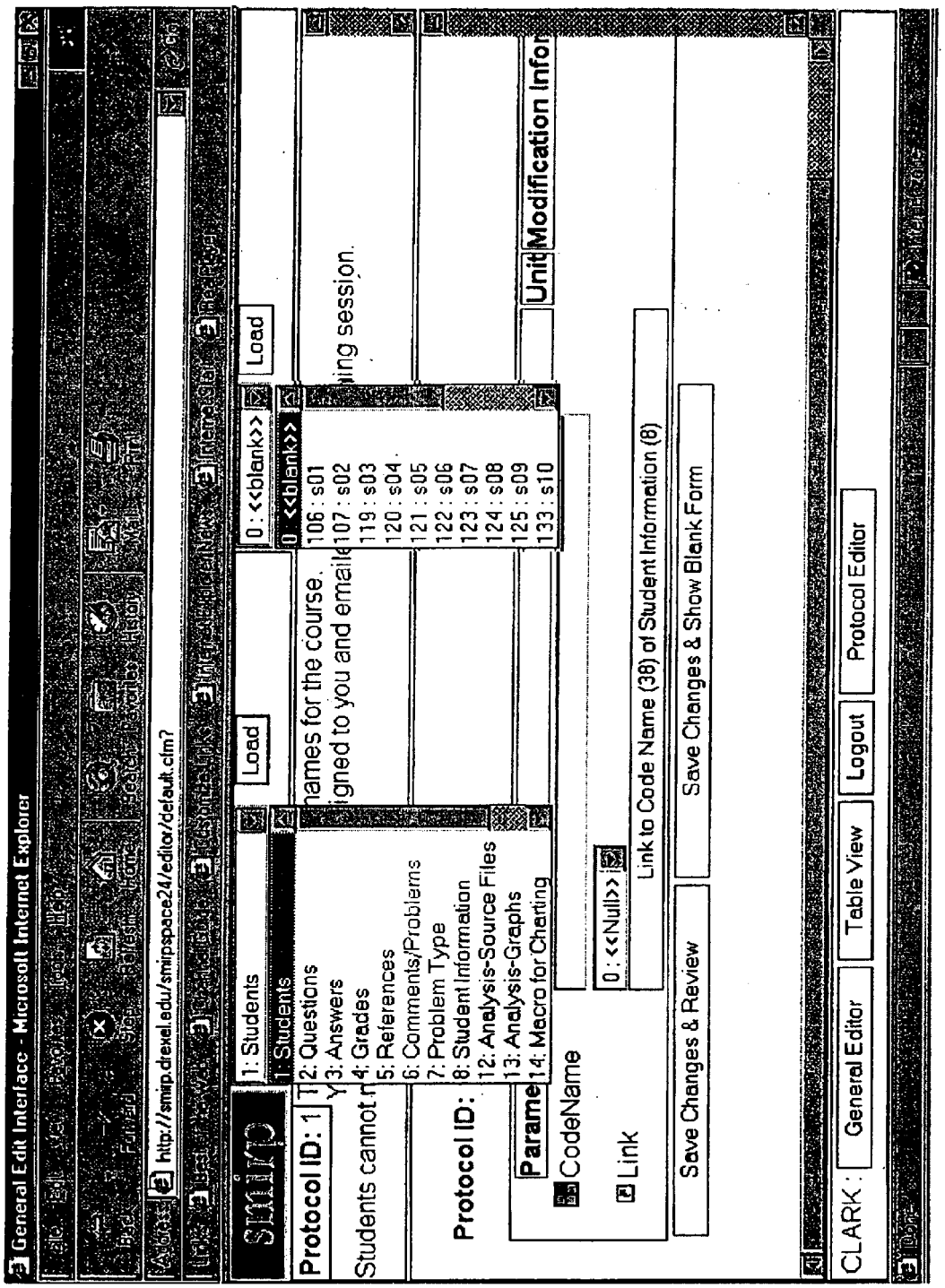

The present invention provides a database system that allows for navigation to outgoing links and incoming links. The database system is defined by a plurality of database-oriented projects. Each project has one or more parameters. Each project also has one or more instances thereof. An entry is associated with each parameter in each instance of a project. In a project, a parameter may be defined as being a parameter of a previously defined project. If so, then the parameter is designated as a link to the parameter of the previously defined project. The link designation changes the structure of the database system. The name of a previously defined instance of a previously defined project is entered for the linked parameter entry. When a previously defined instance of a project having at least one linked parameter entry is displayed, an instance of a project having a linked parameter entry may be viewed by selecting the respective link from the display, thereby providing navigation to an outgoing link. The display further includes links to any instances having at least one link to the currently displayed instance of a project. The linked instances may be viewed by selecting the respectively displayed link from the display, thereby providing navigation to an incoming link.

The present invention also provides a database system that may be created via a browser interface. The database system is defined by a plurality of database-oriented projects. Each project has one or more parameters. By using a web browser interface, at least one parameter of the project is defined as being a parameter of a previously defined project. Also, by using the web browser interface, at least one parameter is defined as a link to the parameter of the previously defined project. The link designation changes the structure of the database system.

The present invention also provides a database system and a scheme for auditing any changes to the structure of the database. The database system is defined by a plurality of database-oriented projects, each project having one or more parameters. Each project also has one or more instances thereof. An entry is associated with each parameter in each instance of a project. A plurality of users define, modify and view projects, parameters and instances. Reports are periodically generated of any user activity relating to users defining, modifying or viewing projects, parameters or instances. The reports are electronically communicated to predefined entities, thereby allowing the entities to be periodically made aware of any activity within the database system, including any changes made to the structure of the database as a result of defining or modifying projects. A parameter may be defined as being a parameter of a previously defined project. If a parameter is designated as a link to the parameter of the previously defined project, such a link designation changes the structure of the database system. The report further includes any activity relating to adding link designations.

The present invention further provides a scheme for maintaining security in a database system. The database system is defined by a plurality of database-oriented projects. Each project has one or more parameters. Each project also has one or more instances thereof. An entry is associated with each parameter in each instance of a project. In the scheme, a plurality of users define, modify and view projects, parameters and instances. Via a web browser, security settings are set for the users which define rights to read, write and modify the projects, parameters and instances.

The present invention further provides knowledge exchange schemes which are implemented using the database systems described above.

DETAILED DESCRIPTION OF THE INVENTION

Certain terminology is used herein for convenience only and is not to be taken as a limitation on the present invention. In the drawings, the same reference letters are employed for designating the same elements throughout the several figures.

I. Definitions and Acronyms protocol—a protocol is a database-oriented project.

SMIRP and SMIRPspace—Standard Modular Integrated Research Protocols. SMIRP is a database system. A plurality of database subsystems or "SMIRPspaces" may exist within SMIRP. Each SMIRPspace contains all of the protocols for a subsystem of the database. A SMIRPspace may thus be viewed as a separate instance of SMIRP that is fully self-contained in terms of available protocols and authorized users.

parameter—a parameter is equivalent in concept to a field in a database. Each protocol has one or more parameters.

parameter type—when a parameter is defined, the type of parameter is also specified. The parameter may be text, a number or value, a file (e.g., a data file, a media file), a hyperlink, or the like.

parameter parameter—this is a special type of parameter. The parameter type "parameter" is a link to a parameter of a previously defined protocol or project. The link may be implemented in the form of a hyperlink. This type of parameter is equivalent to the "join" concept in databases such as Microsoft Access.

experiment—an experiment is an instance of a protocol. An experiment is equivalent in concept to a record in a database.

entry—an entry is a parameter value. Each parameter of an experiment will have an entry. An entry may also be blank.

II. Detailed Description

The present invention is described in the context of a database system having the acronym SMIRP. SMIRP may be used for to manage any type of project that generates data. To illustrate the structure and operation of SMIRP, a web-based laboratory management system that uses SMIRP is described herein. However, the scope of the present invention is not limited to any particular application.

SMIRP uses a protocol-experiment-parameter data representation system for all components of laboratory operations, including knowledge acquisition, laboratory data generation and analysis, and document production. Data tractability is inherent to the user of the system, permitting rapid browser-based navigation through linked information.

FIG. 1 shows the general design of SMIRP. The most common way to communicate scientific information today is through written documents in the form of research articles. This modality is represented in FIG. 1 as the General Human Interface. However, the ultimate function of the scientific document is to communicate specific information from one researcher to another, usually related to a series of experiments. In addition to this fundamental data set, research articles can also provide rich metadata surrounding experiments in the context of other related scientific work. This interpreted data set is represented in FIG. 1 as "knowledge" and may take the form of hypotheses, comparisons, conclusions and recommendations.

SMIRP provides a standard approach to directly access primary knowledge and experiment components without the need to go through the intermediary of integrated documents such as research articles. The intent is not to bypass peer-reviewed publications but rather to complement this mode of communication and to offer access to data which may not be publishable because it does not fit into a sufficiently integrated format. This type of access may be useful in collaborative research.

To provide this type of representation, a standard mechanism is provided to determine the context of recorded information. SMIRP achieves this by providing a general modular structure where much of the information related to a particular data set can be represented and linked in an intuitive fashion.

FIG. 2 shows the construct used in SMIRP which is the protocol-experiment-parameter representation. As described above in the definitions section, a protocol is a database-oriented project. In the specific example provided herein, a protocol may also be described as a description of the relationship between a set of parameters. Typically, this relationship pertains to some kind of action or manipulation of objects, which can be either physical or abstract. Variability in the protocol is handled by parameters, generally with input parameters that can be controlled and output paramaters that are observed. The execution of a protocol with specific parameter values is defined as an experiment, or an instance of a protocol as described in the definitions section. This type of representation is a natural and traditional approach to record laboratory processes. However, other aspects of laboratory are generally not represented in this manner. By using the protocol-experiment-parameter construct for all information recorded in SMIRP, context and data tractability derive naturally.

FIG. 3 shows a screen capture of a user interface display (hereafter, "a screen") for a laboratory experiment involving the preparation of palladium catalysts using pulsed electric fields. Specifically, FIG. 3 shows a screen of the General Editor, which is the default view in SMIRP. In this view, data relating to a specific experiment may be entered. In this protocol, parameters such as concentrations of chemicals, electric field frequency and intensity, and duration of the experiment can be entered directly into the window associated with each parameter. Additional parameters, including output parameters relating to properties of the resulting catalysts are present within the same frame but are not visible in the capture area shown in FIG. 3. To the right of the frame are date/time stamps which are automatically updated when any parameter is modified by a user. The identity of the user in a given session is determined by password access.

Navigation through the General Editor is straightforward through the use of two pull-down menus at the top of the screen. The right pull-down menu allows rapid navigation to any other experiment within the current protocol. The left pull-down menu will switch to any other protocol within the present SMIRPspace. Between these two pull-down menus and the frame containing the parameters is a frame containing the protocol description. This is a detailed description of how to execute the present protocol and is identical for all experiments of a given protocol.

Referring to FIG. 3, the second parameter, "Sprayed by," appears in the form of a drop down menu. This represents an embodiment of the abstraction in FIG. 2 where a parameter from one protocol can be used as an input parameter in another protocol. The linking of protocols in this manner leads to the formation of "experimental chains" that can be navigated through hyperlinks in both the forward and reverse direction. This is an important component of automatic context generation. By following hyperlinks, it is generally possible to obtain details of the input parameters and to discover how the objects or information were used in subsequent steps by following output parameters. Coupled with the protocol description frame, the navigation of experimental chains is a powerful method to extract the context of a particular experiment.

Figure 4:
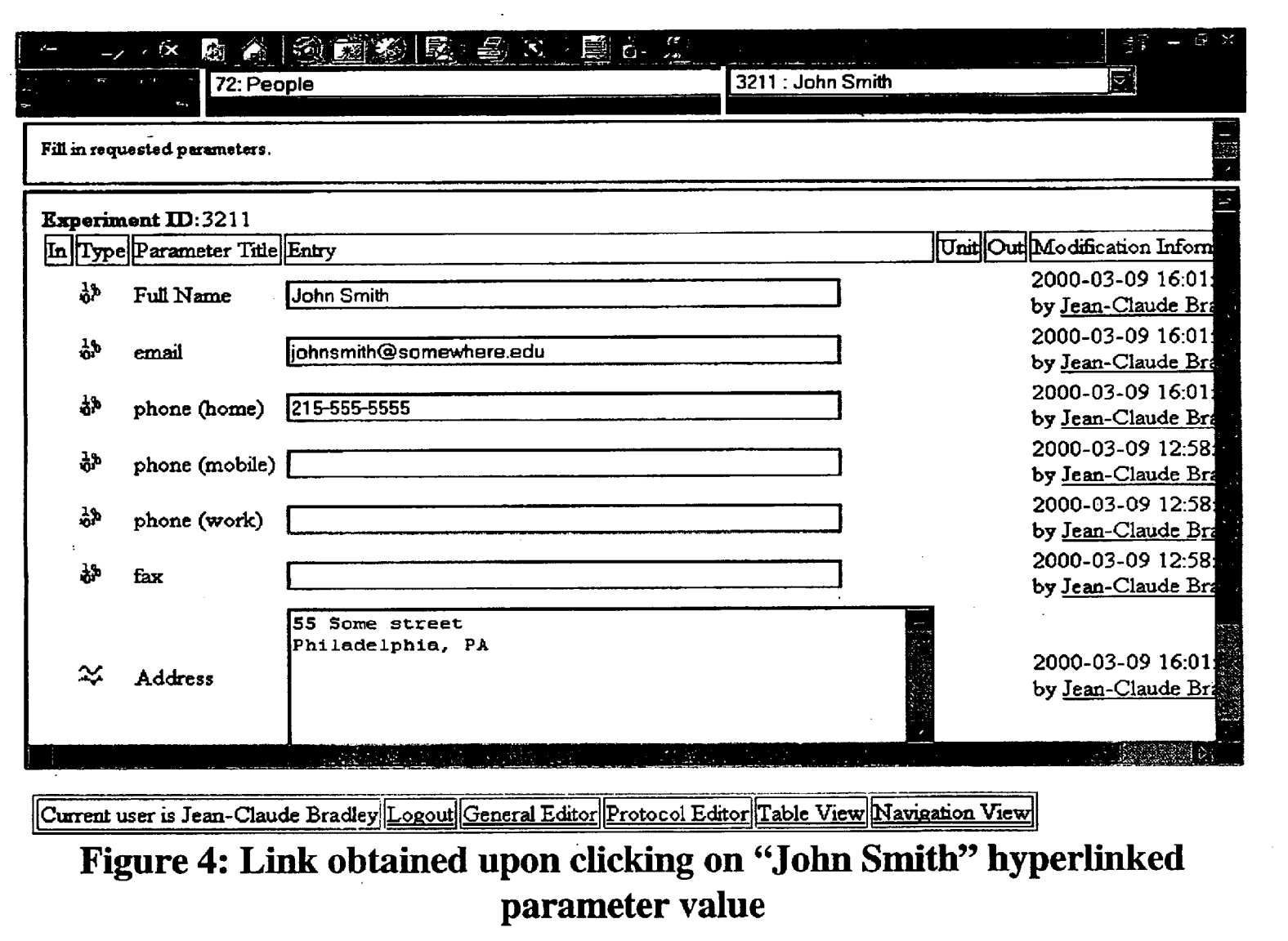

FIG. 4 shows an example of the navigation of experimental chains. By clicking on the "Sprayed by" parameter from the General Editor view in FIG. 3, one can view the protocol named "People," specifically, the experiment named "John Smith" in FIG. 4. Using an identical representation as for the previous laboratory protocol, one can quickly find other parameters such as the telephone numbers, fax, e-mail and address information for that particular individual. The execution of this protocol consists simply of filling in the available data for a given Name. Any time that the parameter "Name" from the protocol "People" is used as an input parameter within a protocol, it will automatically appear as a drop-down menu and create a hyperlink to information relating to that particular individual. To create such a linking parameter, the user selects the parameter type "parameter" when defining the protocol, as described in more detail below.

At the bottom of the screen in FIG. 3 are a series of hyperlinks that permit different views of the information represented in SMIRP. The Table View creates a summary view of all experiments in the protocol currently being viewed in the form of a table. User selected parameters appear as columns whereas individual experiments appear as rows. To aid in navigation, the rows are hyperlinked to the General Editor view for any given experiment being clicked.

FIG. 5 shows an example of a Table View of the experimental protocol "Synthesis of Pd Catalysts . . . " shown in FIG. 3. This represents a convenient mechanism to scan for parameter values that have been used within a given protocol, regardless of who performed the experiments. For other types of protocols, the summarization feature provided by the Table View represents a convenient access to certain types of information not typically associated with experimental data stored in electronic notebook systems. For example, the Table View from the "People" protocol in effect yields an address book of all individuals associated with the research operation.

FIG. 6 shows a screen of a portion of the General Editor view of a "Project Management" protocol used to coordinate laboratory activities and information related to specific projects. The topmost parameter set links to the "People" protocol, used in the context to signify individuals assigned to this particular project. The next parameter set links to experiments from a "Knowledge Filter" protocol, which are subsequently linked to references and documents relevant to the project. The third set of parameters links to an "Experimental Conclusion" protocol that eventually links to individual experiments, such as those described in the "Preparation of Catalysts . . . " protocol described above.

FIG. 7 shows the screen that appears by clicking on one of the Knowledge Filter parameter links in the FIG. 6 screen. This protocol derives its name from its function as a type of conceptual filter when applied to the collection of documents present in this SMIRPspace. Only those documents that yield an answer to the stated query should be "filtered" through and become collected within a specific experiment. Answers appear in text boxes next to each document link and the summary of all of these answers is included in a text box at the top of the page. Each of the links shown here will lead directly to the "Find Reference" protocol that contains as a file the actual document being referenced. In this manner, it is possible to quickly drill down to specific information. In contrast to the "Preparation of Catalysts . . . " protocol above, the "Knowledge Filter" protocol involves only the transformation of information without physical manipulation. However, its representation within SMIRP is completely identical.

Thus far, navigation through the General Editor or the Table View has been unidirectional. The ability to reuse modules has also been described. For example, the "People" protocol was pointed to within two different contexts, one to indicate who performed a specific step in a laboratory protocol and another to indicate who is part of a project under the "Project Management" protocol. Navigation in the opposite direction would also be useful. For example, it would be useful to ask for all instances where a particular experiment is being referenced. The General Editor view can also be used for this purpose.

Figure 8:
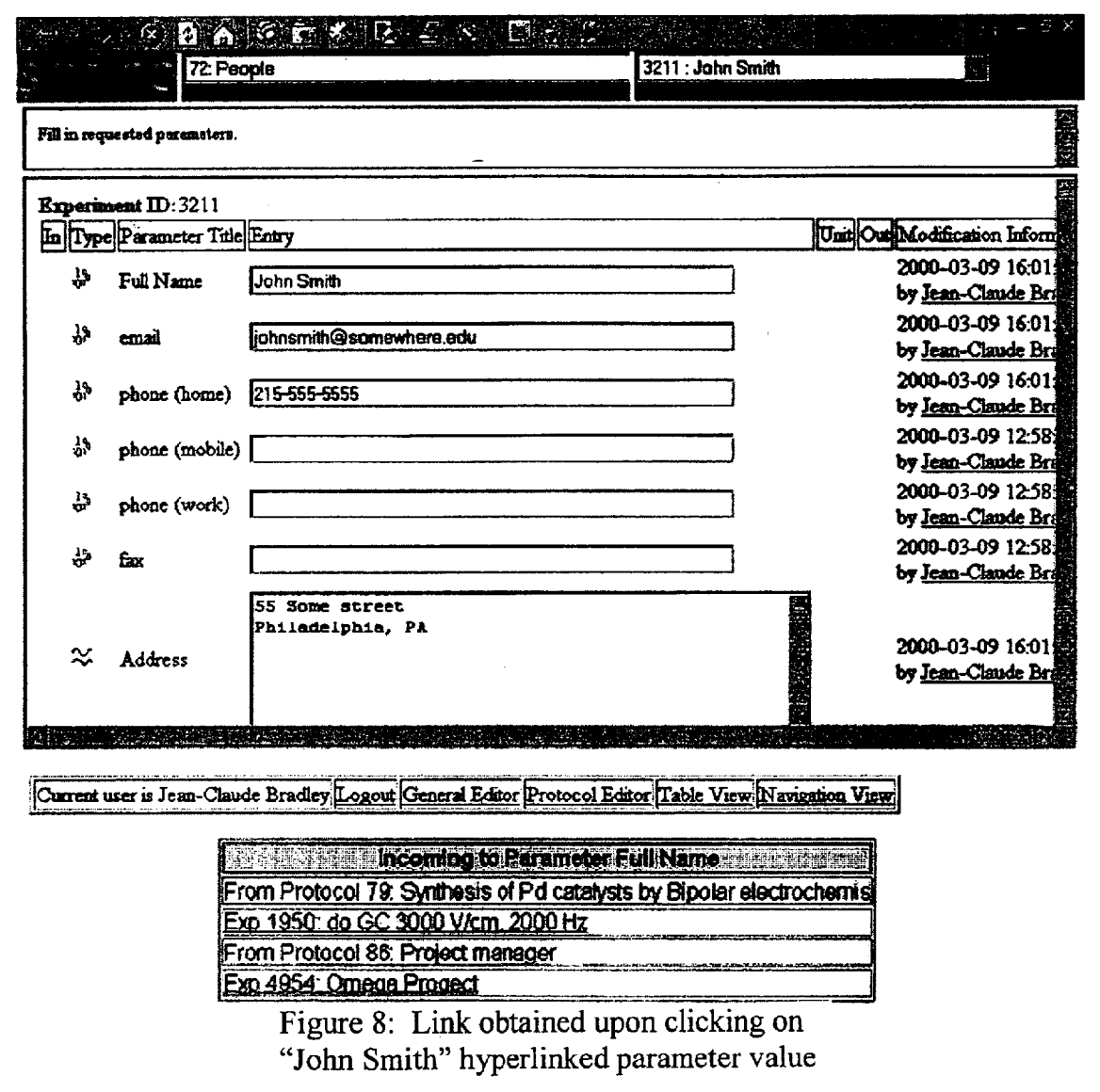

FIG. 8 is a bottom portion of a General Editor screen of FIG. 4, and shows all instances where Experiment ID: 3211 is being referenced. See the section entitled "Incoming to Parameter Name" wherein "Name" is the protocol. The instances are hyperlinked and can be accessed by clicking the corresponding link. Thus, the General Editor shows both outgoing links and incoming links. That is, outgoing links relate to parameters that are defined as being a parameter type "parameter," as described in the definitions section above. Incoming links which relate to the experiment currently being displayed by the General Editor are listed at the bottom section of the General Editor screen.

The protocols described thus far are used for illustrative purposes and represent only one way to use SMIRP to link data. The only information representation that is hard-coded within SMIRP is the protocol-parameter-experiment construct. When a SMIRPspace is created, it is completely blank. Protocols must first be created using the Protocol Editor View. The construction or modification of a SMIRPspace is also accomplished over the Internet through the same browser-based interface that is used for recording data. One suitable browser is Internet Explorer version 5.0. Since protocols and parameters can be modified on the fly, a SMIRPspace is a very dynamic and flexible system that can adapt to environmental changes. For this reason, the ability to associate context with data is necessary to minimize confusion.

Additional examples of how SMIRP may be used are provided below.

AUTOMATIC EXECUTION OF LABORATORY EXPERIMENTS—The standard representation of SMIRP with well-defined input and output parameters allows one to substitute, in a modular fashion, components of experiments that are currently done manually with automatic systems. In one example, current and voltage must be sampled during an experiment. Using SMIRP, buttons in the General Editor View allow passing of parameters between SMIRP and LabView to both execute an experiment and to acquire the data from an experiment run and load the resulting files and data into the SMIRP experiment. (LabView is a graphical programming development environment for data acquisition and control, data analysis and data presentation. LabView is commercially available from National Instruments Corporation, Austin, Tex.) Since there is no difference in the way manual and automatic processes use and store information in SMIRP, this greatly facilitates a stepwise modular approach to automation.

Figure 9A:
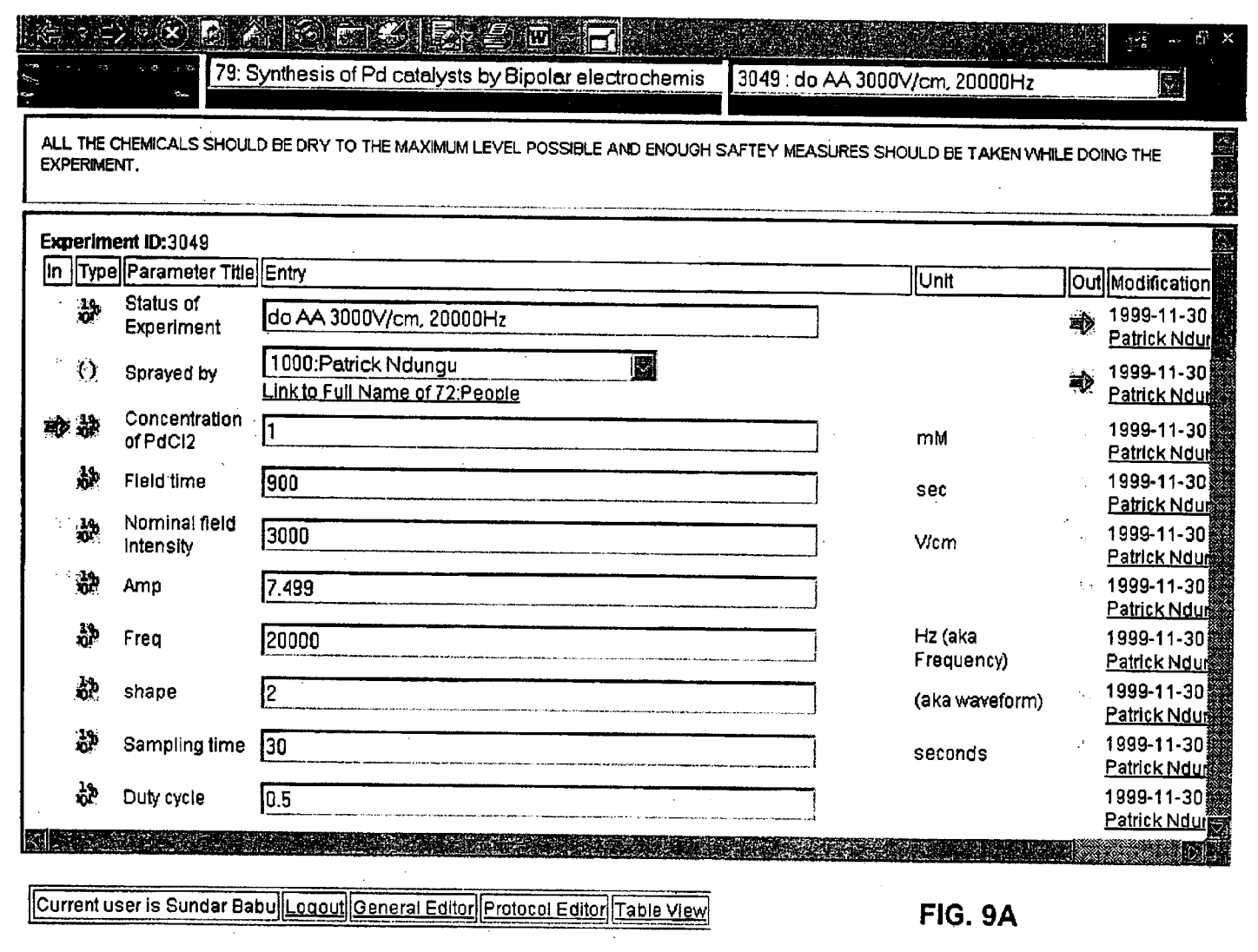
Figure 9B:
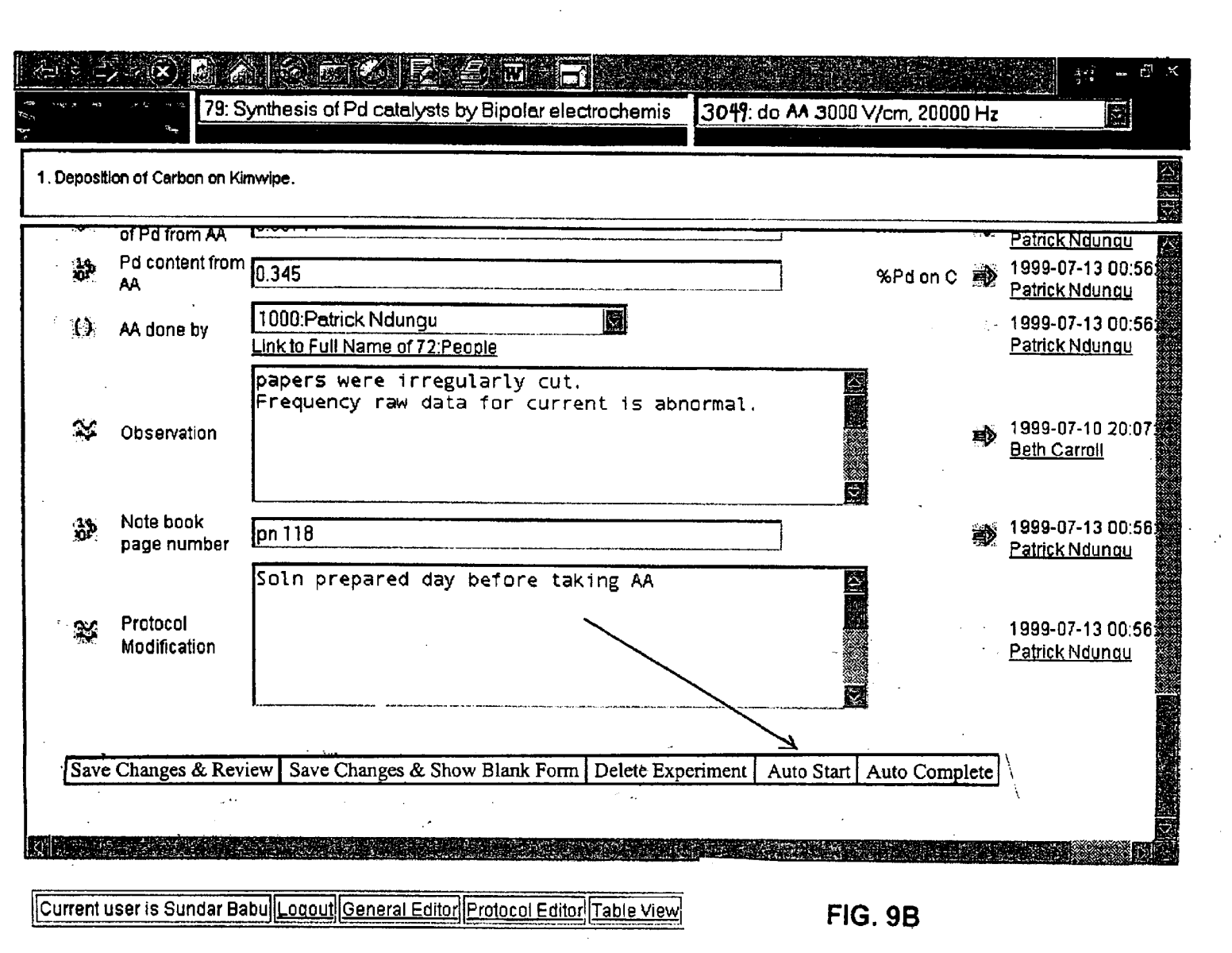
Figure 9C:
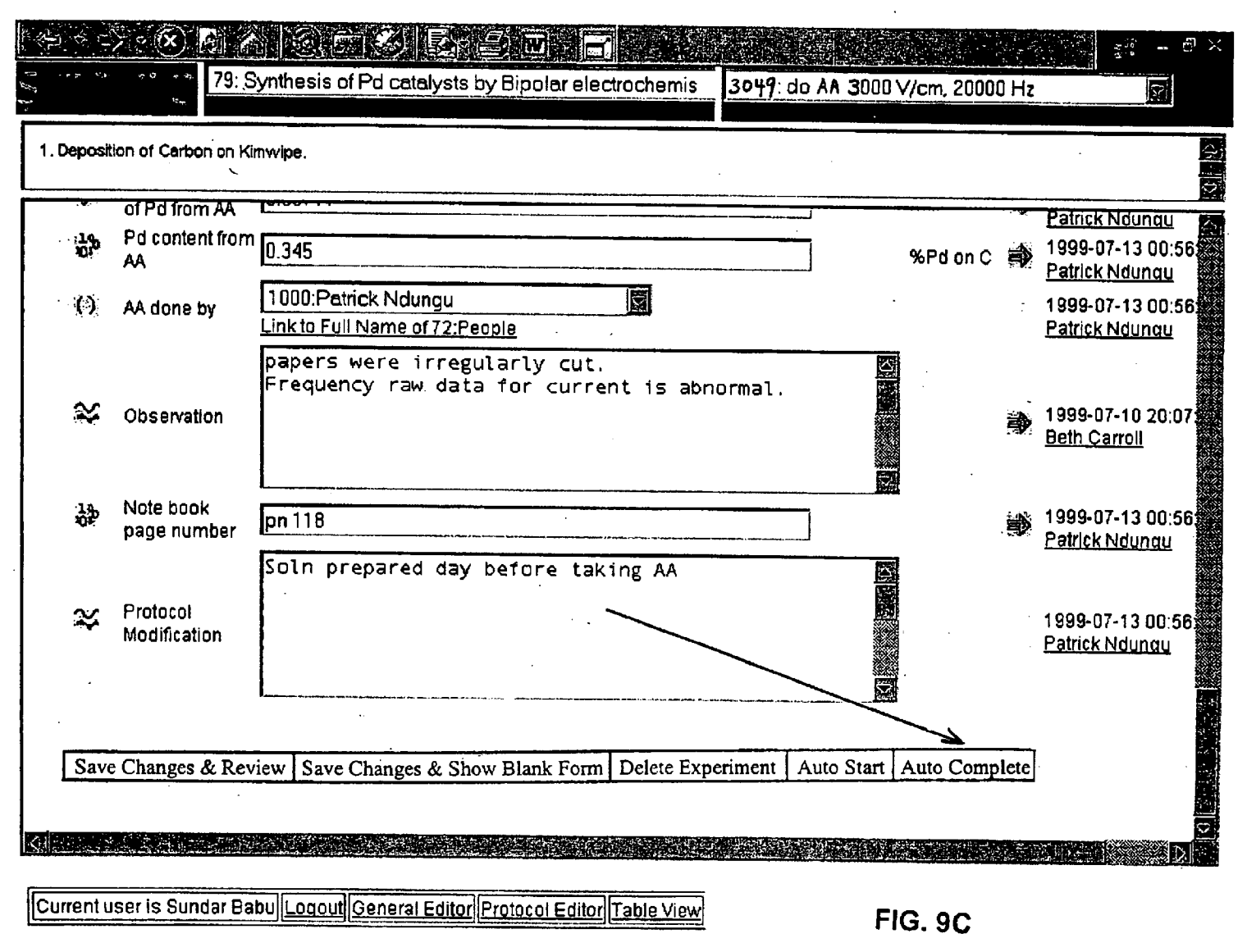
Figure 9D:
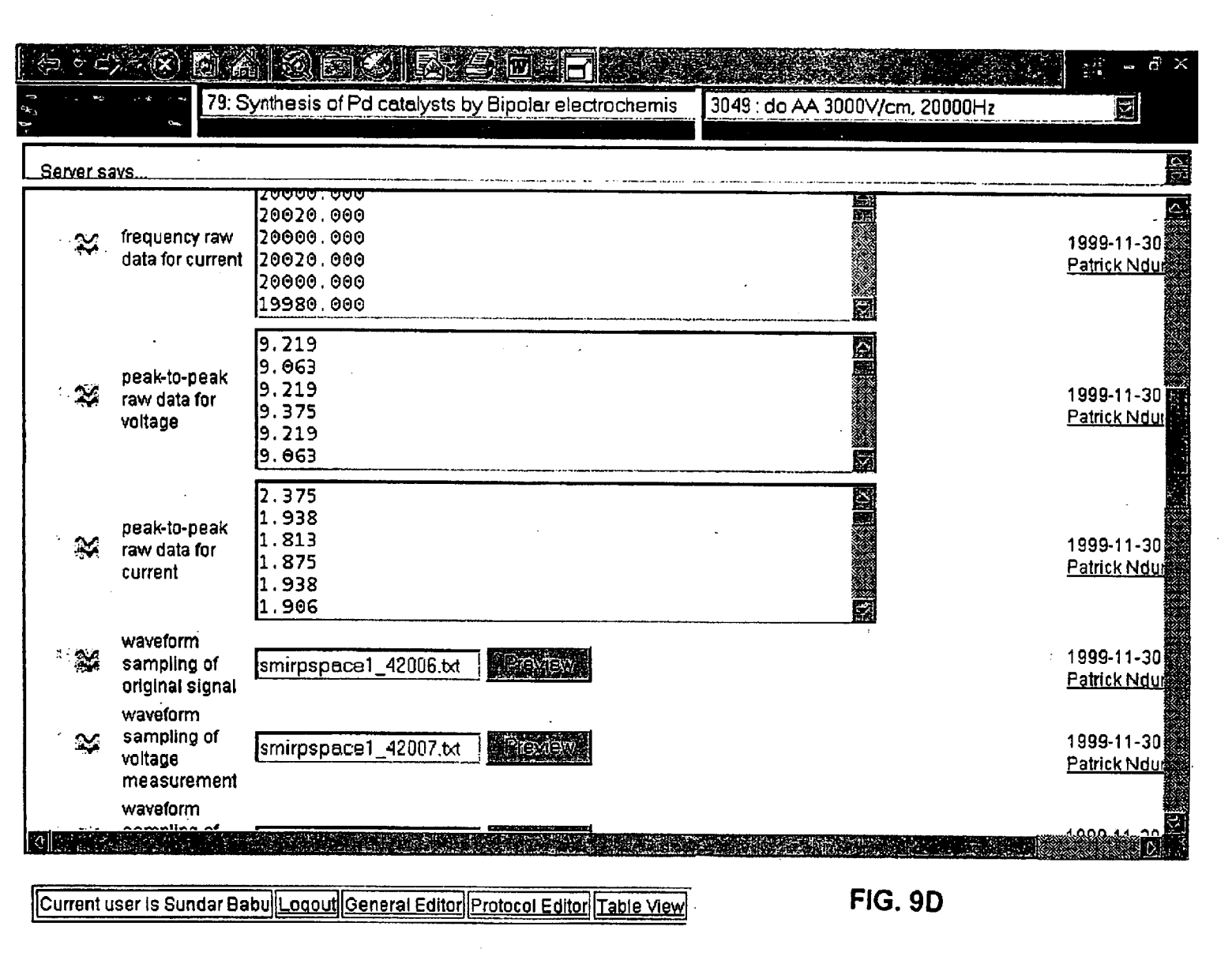

FIGS. 9A–9D show a succession of General Editor screens that illustrate the SMIRP/LabVIEW interaction. FIGS. 9A and 9B show the top and bottom portions of the same General Editor screen. The process proceeds as follows:

1. Referring to FIGS. 9A and 9B, the user enters parameter values for parameters in Experiment ID: 3049 of Protocol 79: Synthesis of Pd catalysts by Bipolar electrochemistry.
2. The user selects "Auto Start" at the bottom of the screen in FIG. 9B, thereby causing pre-selected parameters to be exported to LabVIEW for processing within LabVIEW.
3. An indication is provided that the LabVIEW processing has been completed (not shown).
4. The user selects "Auto Complete" at the bottom of the screen in FIG. 9C, thereby causing the LabVIEW results to be imported into pre-designated and initially blank parameters of the Experiment ID: 3049. FIG. 9D shows some of the imported results which have been automatically placed in parameters of the Experiment ID: 3049.

SMIRP Security Settings

For a particular SMIRPspace, all individuals who can access the system are either "SMIRPspace administrators" or "SMIRPspace users." SMIRPspace users can be included as "Protocol members" for each individual protocol in the SMIRPspace. Finally, Protocol members can become either "Experiment guests" or "Experiment users" for experiment level privileges. Each of these entities is described below.

1. SMIRPspace administrators. All read/write/add/delete functions for parameters, experiments and protocols are available for a specific SMIRPspace and cannot be restricted.
2. SMIRPspace users. Have access to General Editor and Table View but not Protocol Editor. Therefore they cannot add or delete parameters or protocols or change user privileges. For each protocol, their access can be modified by a SMIRPspace administrator using the protocol editor.
3. Protocol member. Once a SMIRPspace user is included in a protocol using the protocol editor, they become Protocol members and it is possible for a SMIRPspace administrator to configure their privileges. Permission to read, write (modify data in an existing experiment), add (create a new experiment) or delete (delete an experiment) can be controlled by an administrator. If they have none of these permissions for a given protocol, they will not even know that the protocol exists.
4. Experiment guest and Experiment user. If a parameter of type "authorized user" is added to a protocol, a dropdown menu of all of the Protocol members for that protocol will appear when a SMIRPspace administrator views an experiment in that protocol. The authorized user parameter is visible to SMIRPspace users that have the permission to view the specific experiment but it cannot be modified by them. When the authorized user parameter is set to the username of a Protocol member, that member becomes the Experiment user of that particular experiment. The Experiment user can have different security settings than an Experiment guest, which corresponds to any Protocol member who is not an Experiment user. There are two ways to set the authorized user parameter. First, if a Protocol member creates an experiment, that experiment will have the authorized user parameter set to their username. Alternatively, a SMIRPspace administrator can change the authorized user parameter in any protocol to any Protocol member at any time. A typical use of the Experiment guest/Experiment user distinction is to set guest privileges at read and user privileges at read/write/add. With these settings, all experiments in a given protocol can be seen by all Protocol members. However an experiment can only be modified by the user who created it, or by a SMIRPspace administrator.

EDUCATIONAL TOOL—The flexibility of SMIRP to represent information may be used in a classroom environment to study the way in which students process information. In this application, students in a specific class are assigned a series of questions to be answered by a certain date. All answers are required to be supported by specific references, with the only limitation that students cannot use the same references. All students have access to the answers and references from the entire class. Thus, a type of collaborative knowledge sharing approach to learning is facilitated via SMIRP. Within the SMIRP architecture, the system is represented through interlinked protocols including "Questions," "Answers," "References," "Students," and "Grades."

FIGS. 10A–10E show different screens used in this process. FIG. 10A shows the initial default screen upon entry of the SMIRPspace relating to the Educational Tool example.

The left drop-down menu shows the different protocols that are available for selection. The right drop-down menu shows the different experiments that are available for selection for the selected protocol. (In the General Editor, the left and right pull-down menus cannot appear simultaneously. Both menus are shown simultaneously for illustration purposes only.)

Figure 10B:
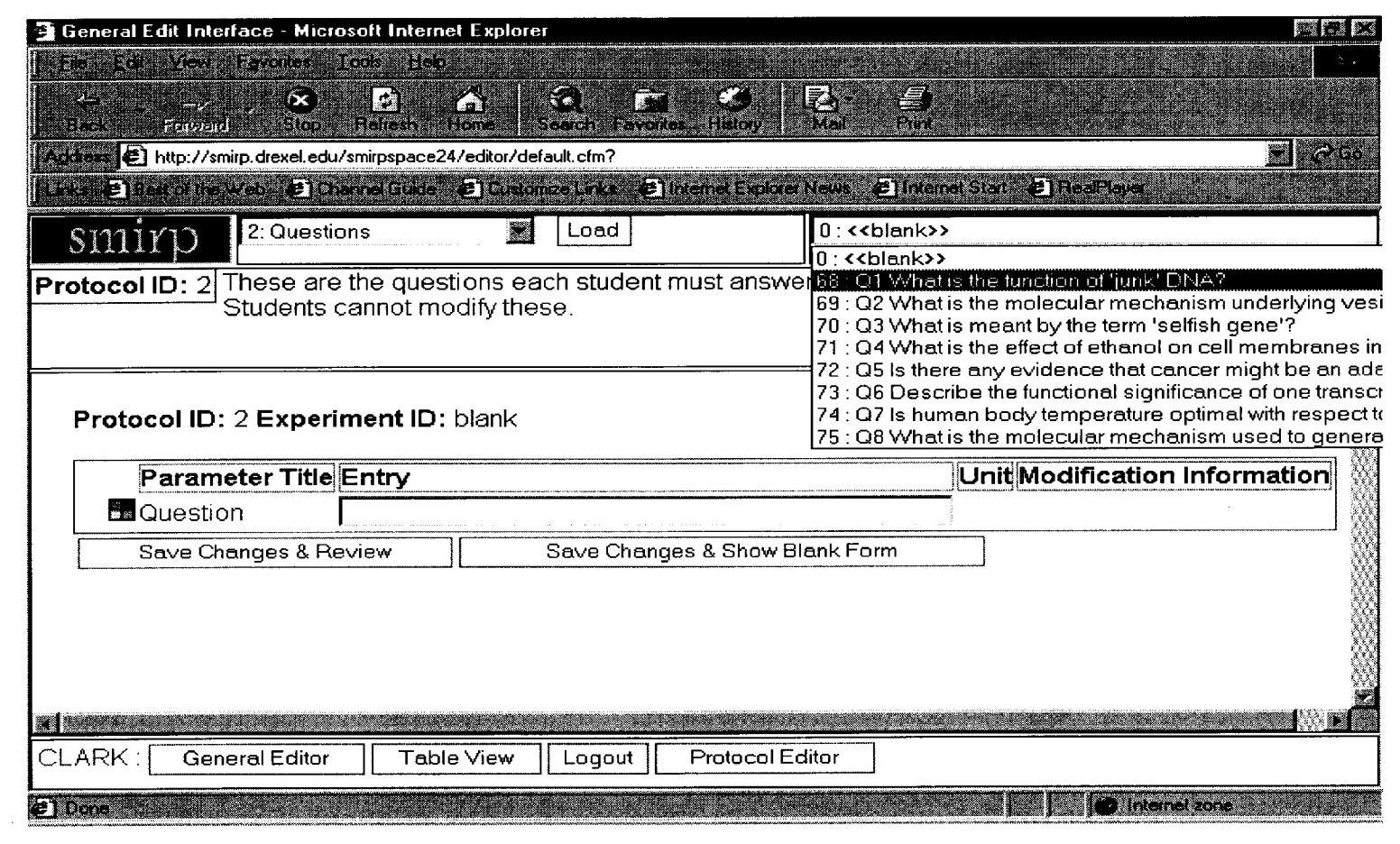

FIG. 10B shows the initial default screen for Protocol ID: 2: Questions. FIG. 10B also shows the right drop-down menu showing the experiments (i.e., individual questions) that can be selected.

Figure 10C:
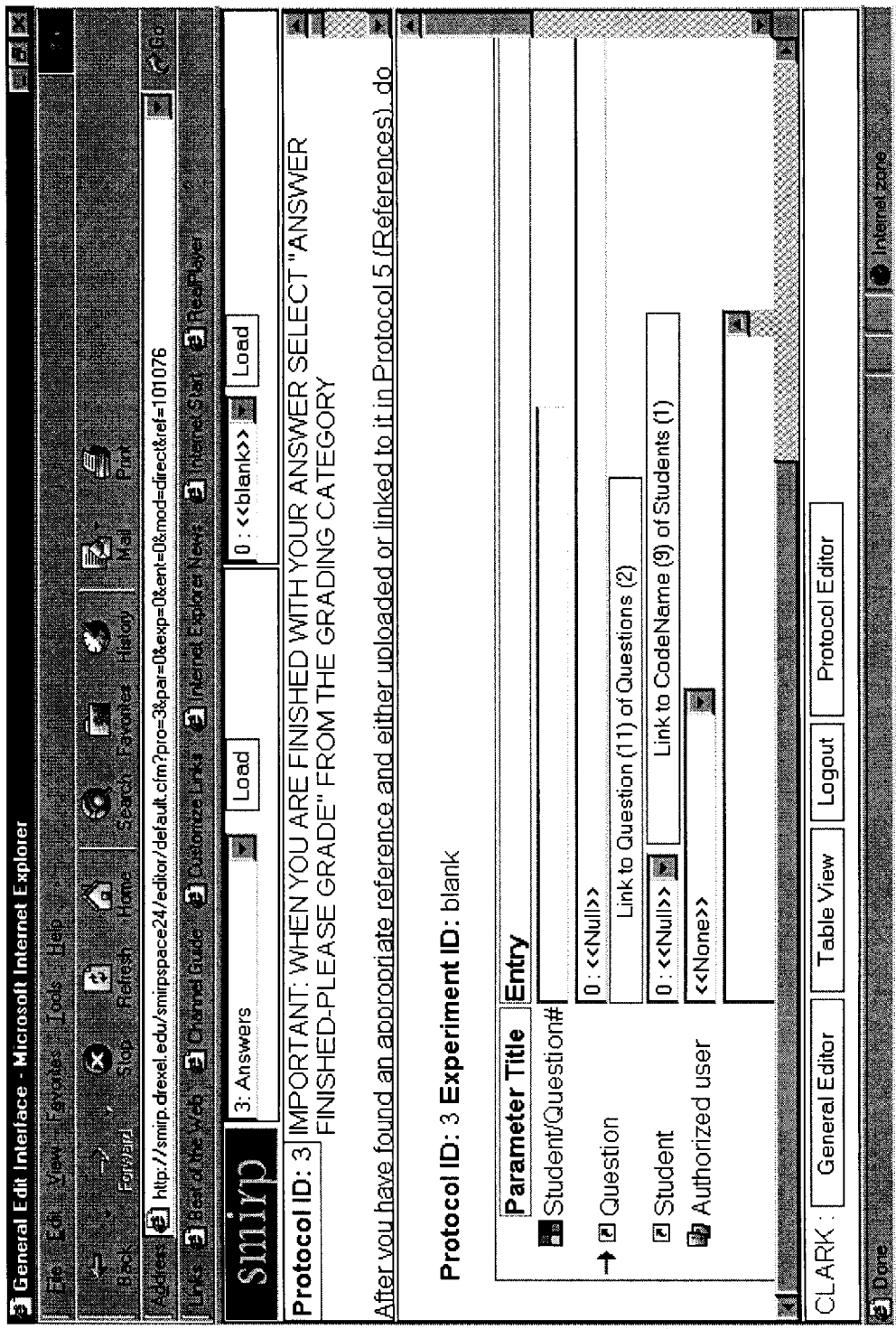
Figure 10D:
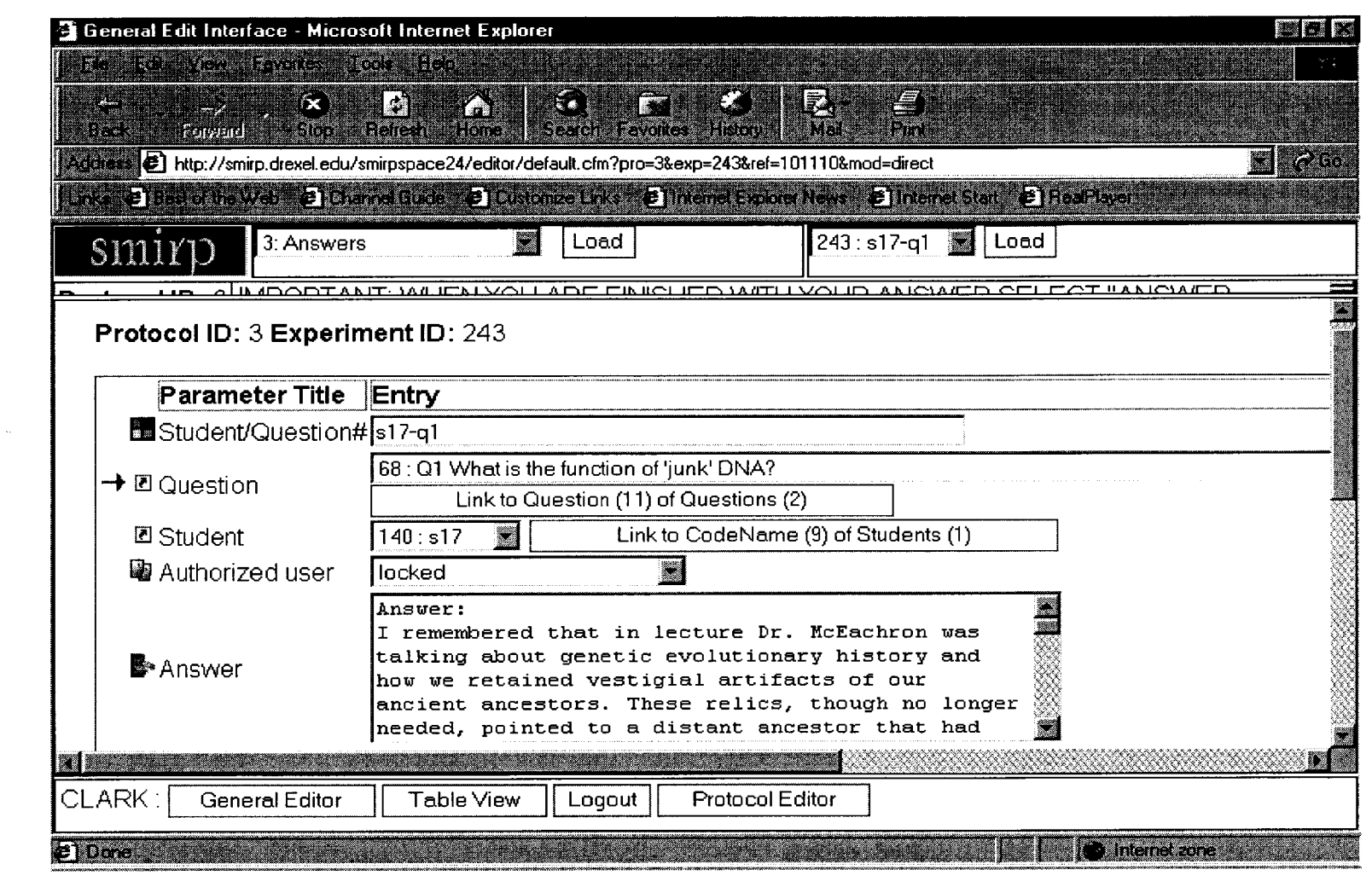
Figure 10E:
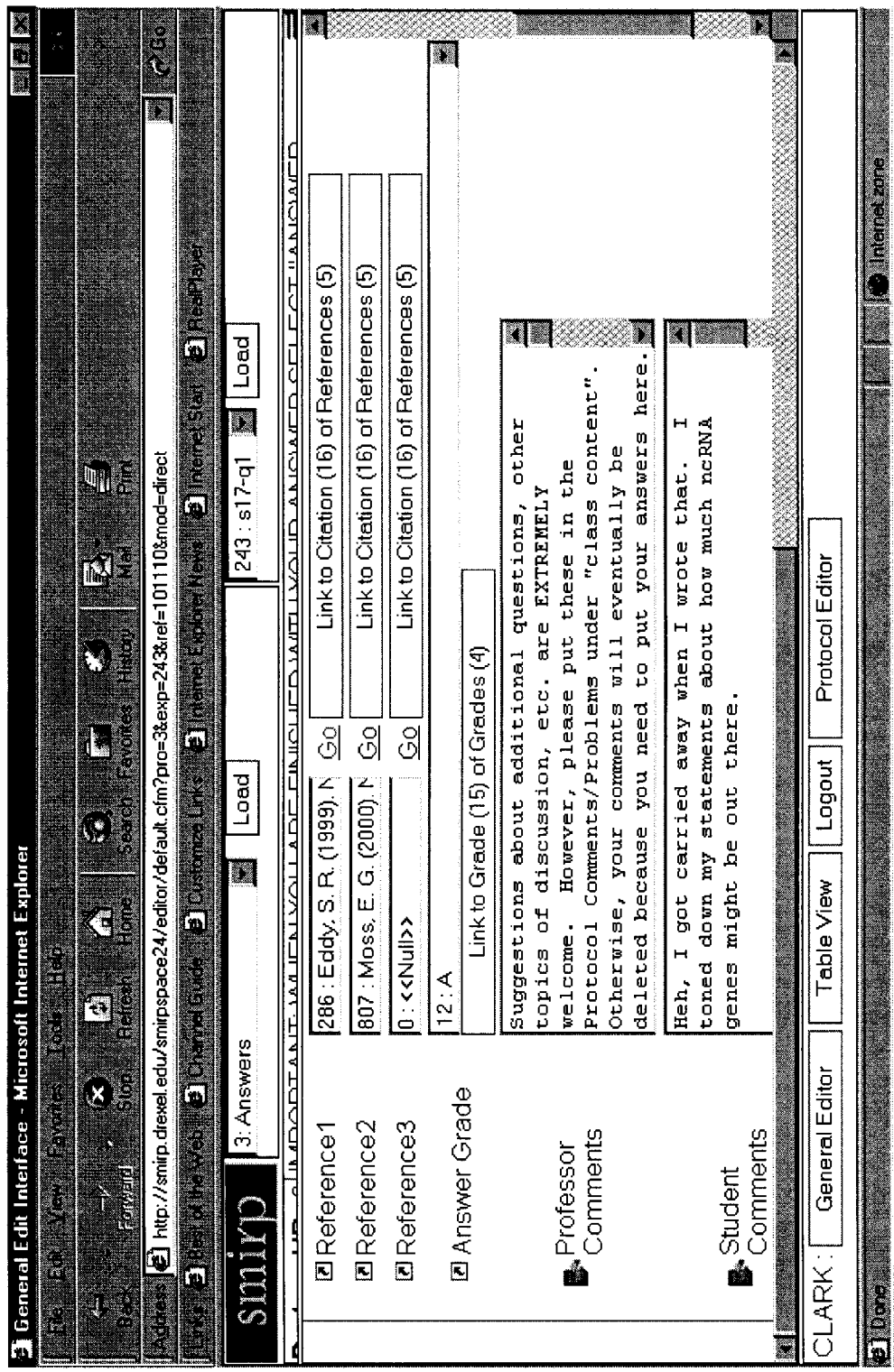

FIG. 10C shows the initial default screen for Protocol ID: 3: Answers. FIG. 10C also shows the right drop-down menu showing the experiments (i.e., student answers) that can be selected. FIGS. 10D and 10E show top and bottom portions of the answer for one of the students.

FIG. 11A shows the instructions that the student is provided with under the protocol description for Protocol ID: 3: Answers. FIG. 11B shows the instructions that the student is provided with under the protocol description for Protocol ID: 5: References.

FIGS. 10A–10E and 11A–11B provide an example of using SMIRP to assist in the teaching of a class. This application made heavy use of both the security settings described above and the alerting components of SMIRP (described below). Briefly, the students are given a list of questions to answer and are instructed to link their answer to a reference that supports their answer. The teacher grades each question separately. The process of generating these answers coupled with teacher validation is an example of Passive Content Generation.

Additional explanation of the teaching SMIRPSPACE architecture is provided below.

The following protocols are created to manage the class:
1. Students—contains student pseudonyms and grade information-linked to Student Information protocol- student permissions to read only for all Protocol members.
2. Questions—contains the questions to be answered by the students—student permissions to read only for all Protocol members.
3. Answers—contains the answers of the students linked to the Students, Questions, References, Grades protocols—student permissions set to read only for Experiment guest and read/write/add for Experiment User.
4. Grades—contains the grading categories and other comments pertaining to references or answers—student permissions set to read only for all Protocol members.
5. References—contains the references—linked to Students and Grades protocols-student permissions set to read only for Experiment guest and read/write/add for Experiment user.
6. Comments/Problems—contains problems or comments made by the students and responses by the class administrators—linked to Problem Type protocol—student permissions to read/write/add for all protocol members.
7. Problem Type—contains the problem categories that students might encounter during the class—student permissions to read for all protocol members.
8. Student Information—contains contact information and real names of students—student permissions set to nothing for Experiment guest and read/write for Experiment user.

Additional explanation of the teaching SMIRP processes is provided below.

1. The teacher enters a series of questions in the Questions protocol.
2. The teacher puts the rules of the class and instructions in the protocol description section of relevant protocols.
3. Students fill in their contact information in the Student Information protocol. They could modify this information at any point during the course of the class. However, the only experiment they are able to see in that protocol is their own, thus ensuring student privacy. If one of the students wants to put in two e-mail addresses (not part of the original configuration of the SMIRPspace), a parameter for the second e-mail address may be quickly added by an administrator using the web interface.
4. Students read the questions in the Questions protocol and find references that they believe would be relevant to the answer.
5. Students verify that the reference that they want to use is not already selected by another student. The reference is then made electronically available in the References protocol and a citation is entered for that reference in a format specified in the protocol description for the References Protocol. The students also linked the experiment of their reference to their pseudonym listed in the Students Protocol.
6. Students answer a question from the Questions protocol in a text box provided in the Answers protocol and linked to that question. They also link to their pseudonym in the Students protocol and to their references in the References protocol. When they are finished with their answer, the students select "ANSWER FINISHED-PLEASE GRADE" from the grading categories.
7. Students report problems they have with either the class content or technical issues with SMIRP use in the Comments/Problems Protocol.
8. The teacher reads the students' answers in the Answers protocol and then evaluates if the answer was supported by the cited reference by clicking on the parameter-parameter linking to the reference. A grade is then assigned by selecting from the link to the grade protocol. The permissions of the student are changed from Experiment user to Experiment guest by changing the authorized user to "locked." In this way the student could still view the experiment but could not modify it.

To further explain the SMIRPspace concept, the protocols shown in FIGS. 10A–10E relate to a SMIRPspace for a specific class named BMES 501 (Medical Sciences I) Fall 2000. Only the students, the instructor, and anybody else authorized by the instructor, are permitted into this SMIRPspace. The protocols relating to the laboratory example shown in FIGS. 3–9 relate to a different SMIRPspace, wherein only the laboratory workers, supervisors and persons authorized by the supervisors, are permitted into this SMIRPspace.

The process of creating and modifying protocols is an important feature of the present invention. SMIRP allows a user to create and modify a database structure without any formal training in database programming. Furthermore, the process may be performed via a conventional browser interface.

Figure 12A:
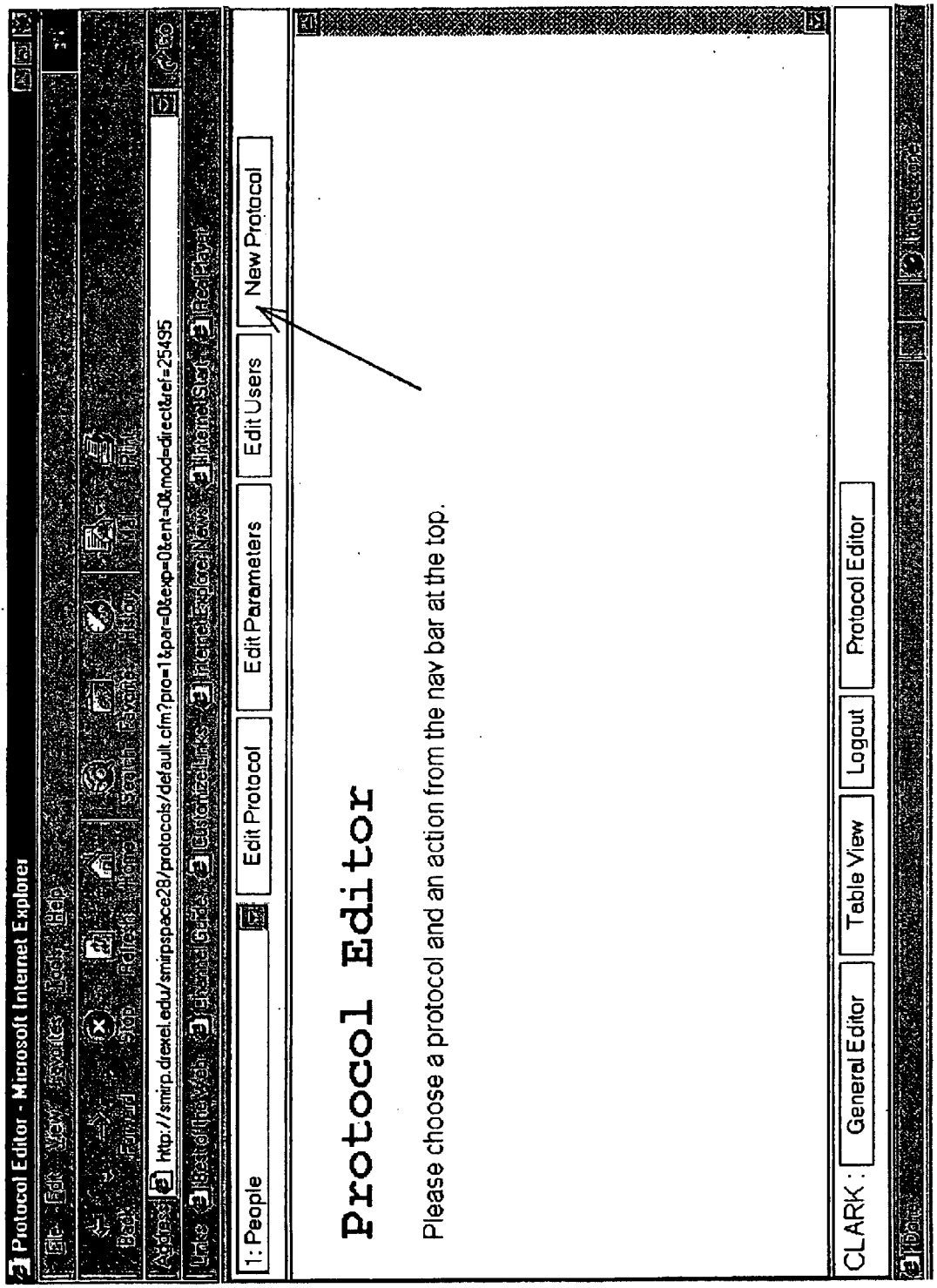

FIGS. 12A–12O show a succession of screens that are used in one example of a protocol creation process. The process proceeds as follows:
1. Select the Protocol Editor screen (FIG. 12A) via the Protocol Editor menu button at the bottom of the screen.

Figure 12B:
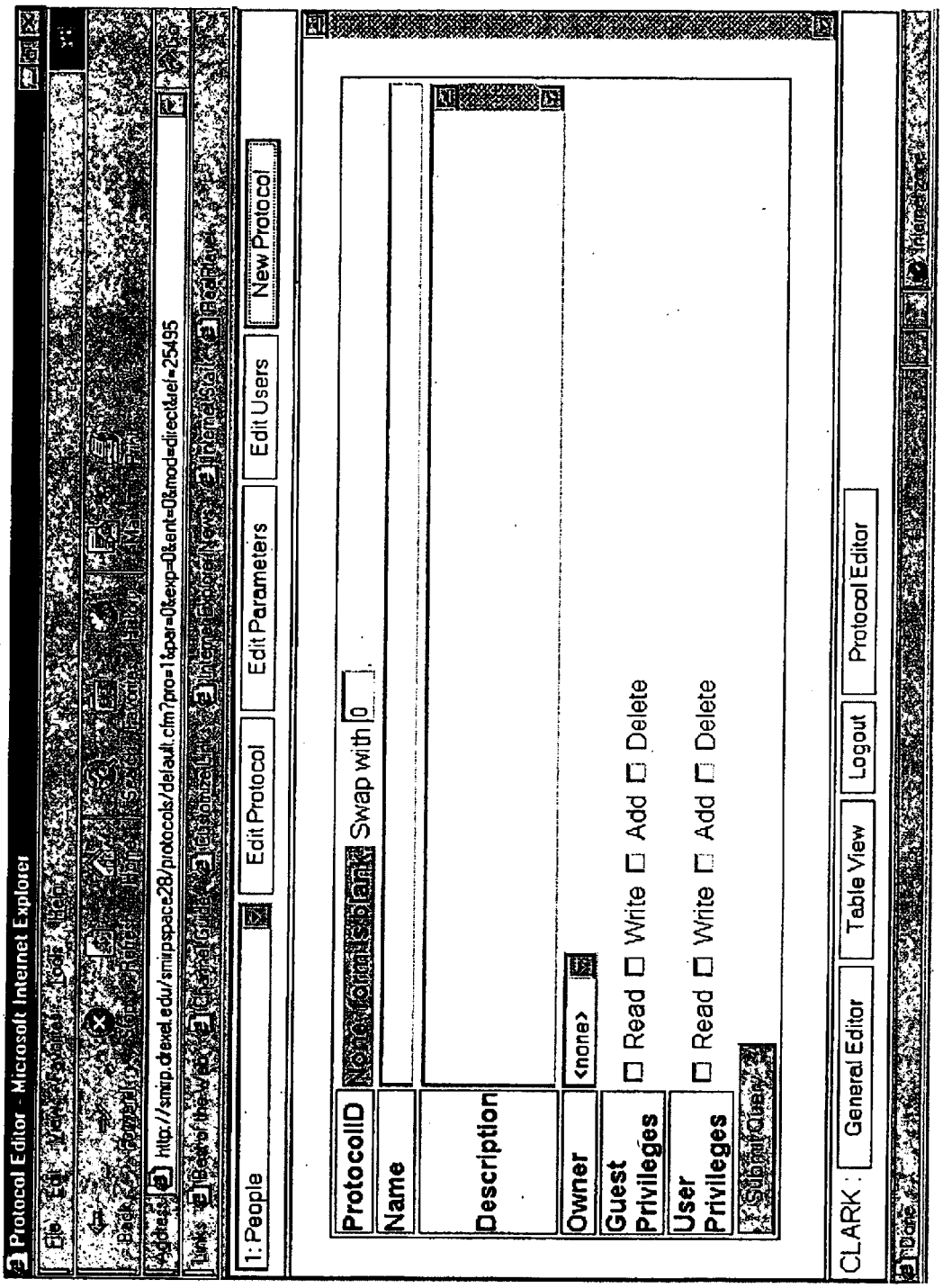
Figure 12C:
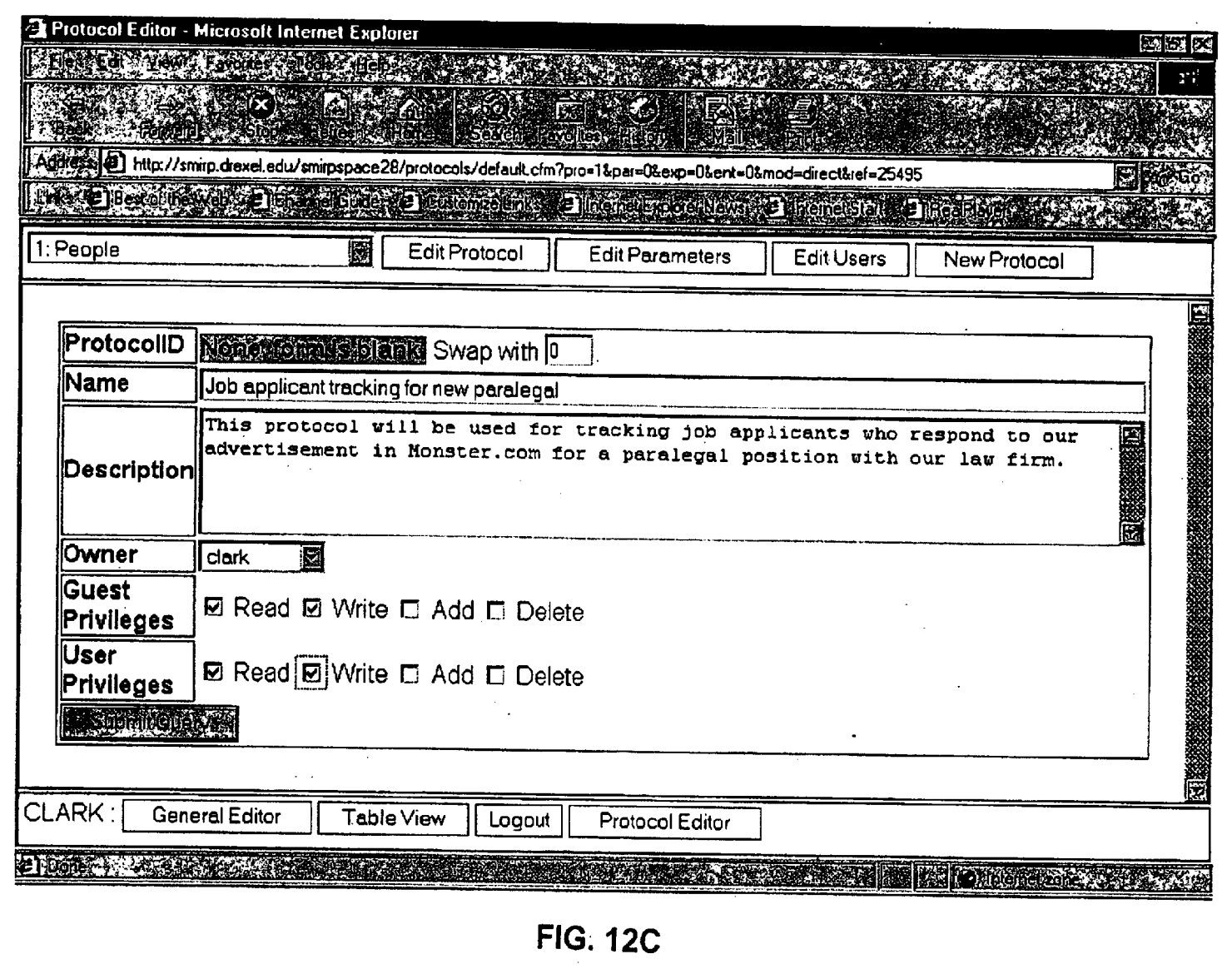
Figure 12D:
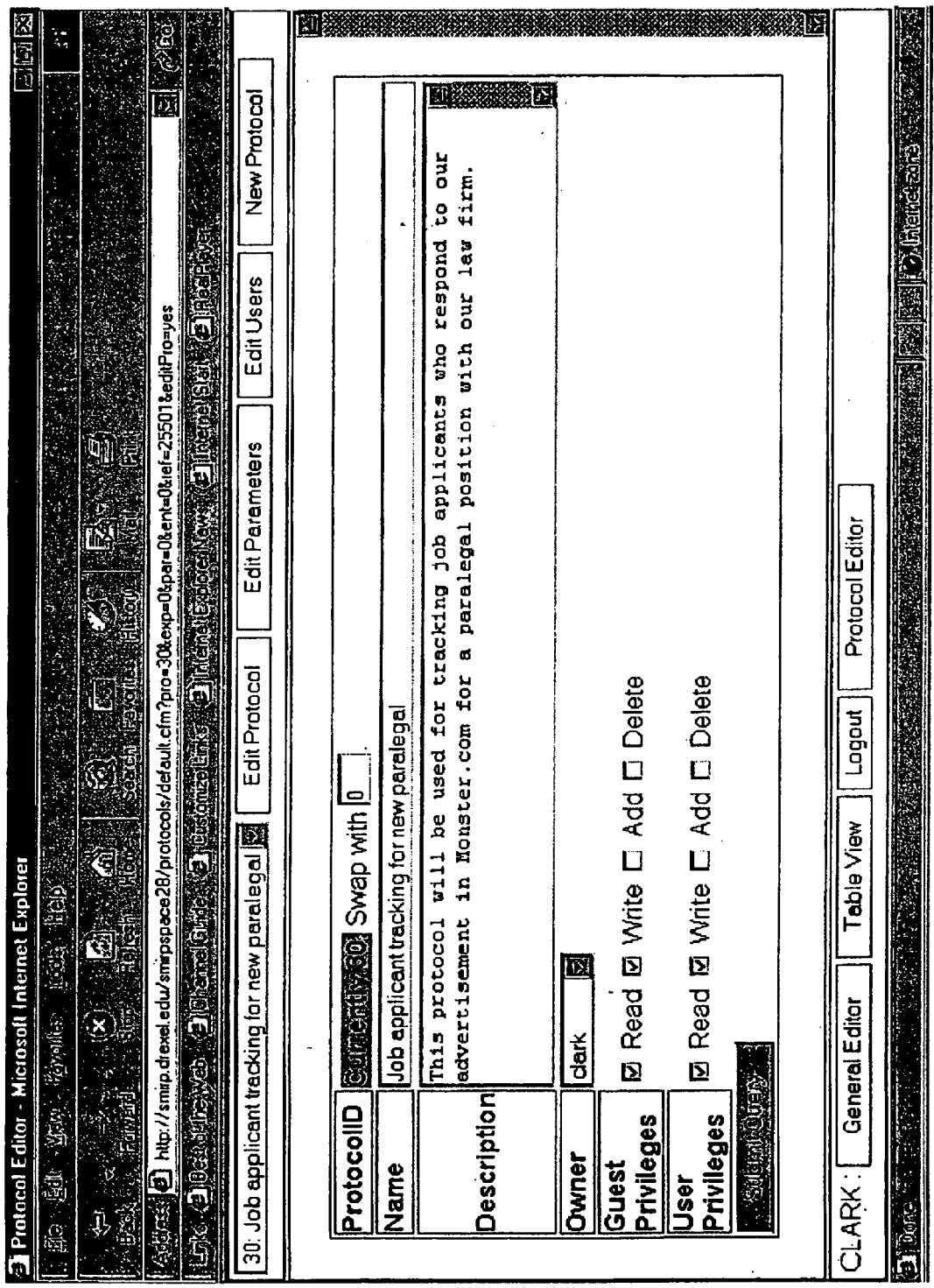
Figure 12E:
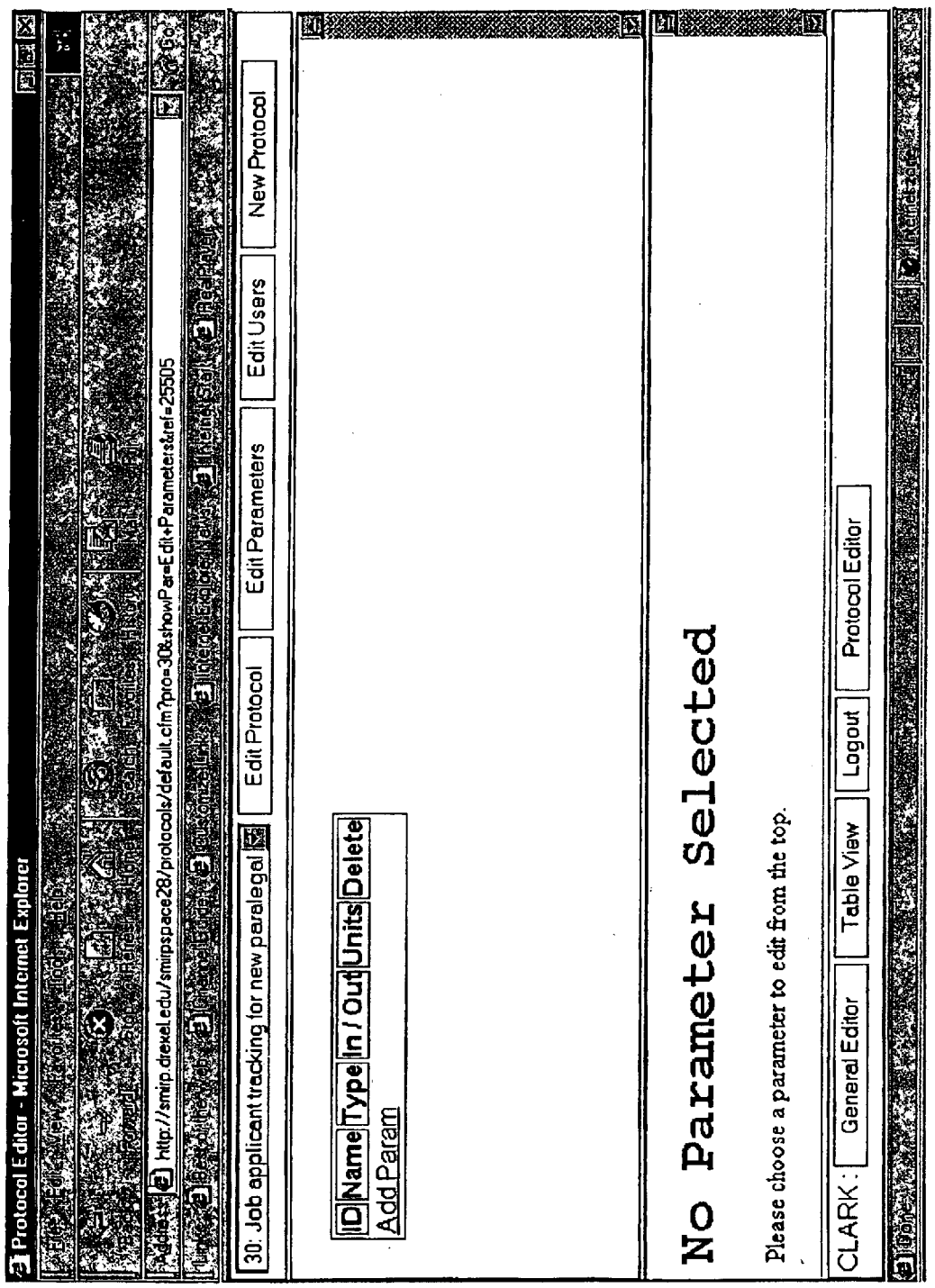
Figure 12F:
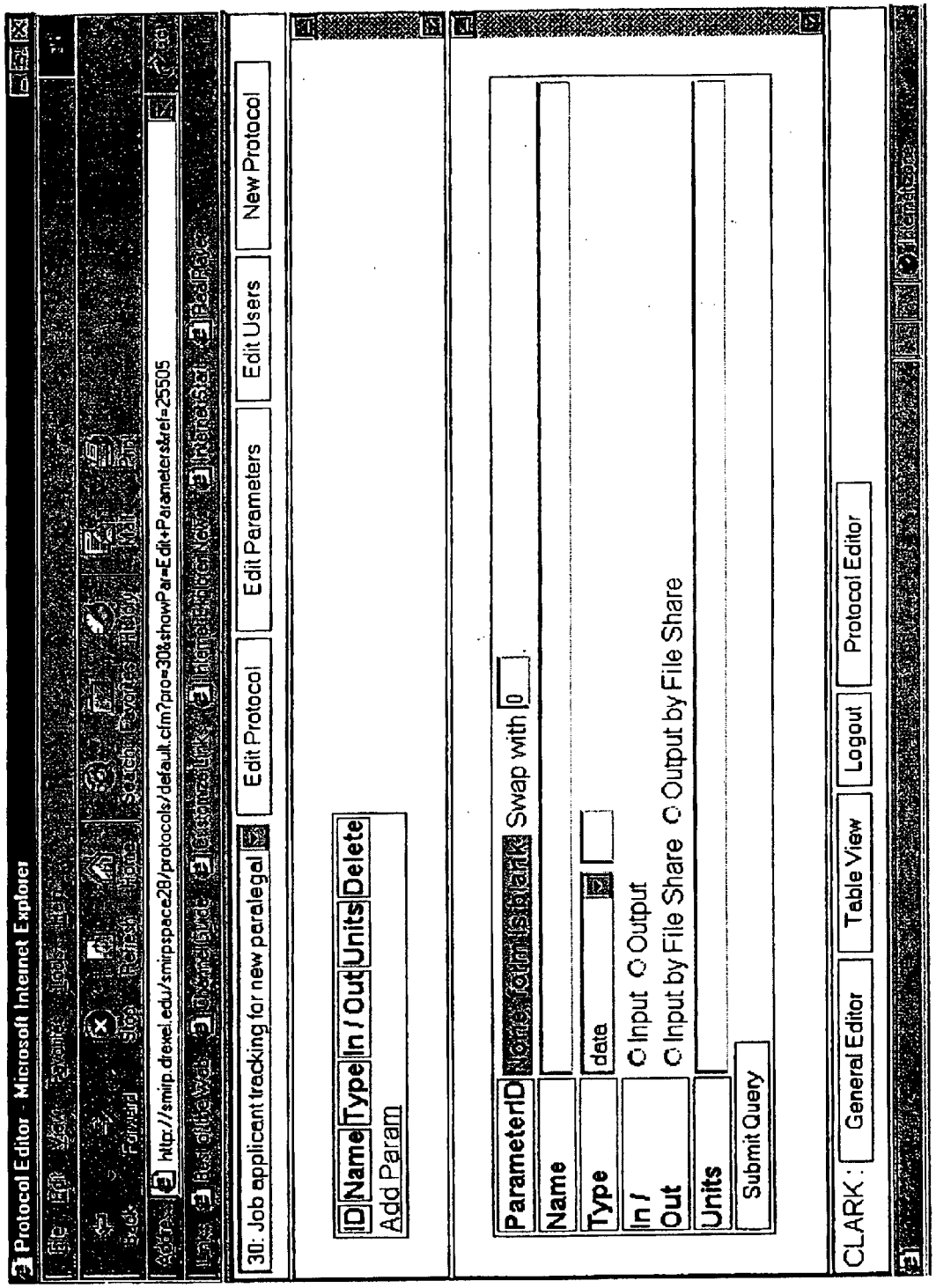
Figure 12G:
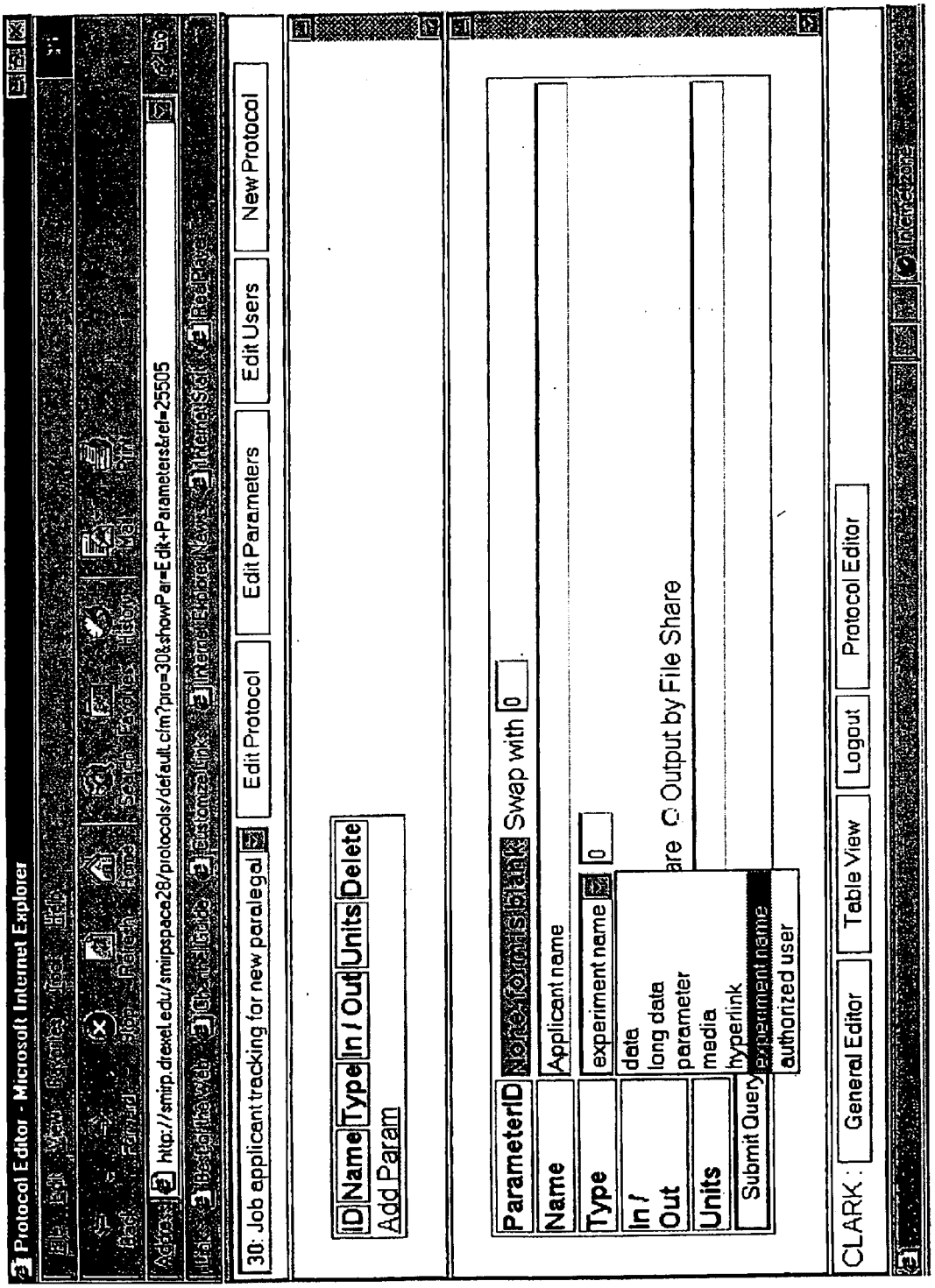
Figure 12H:
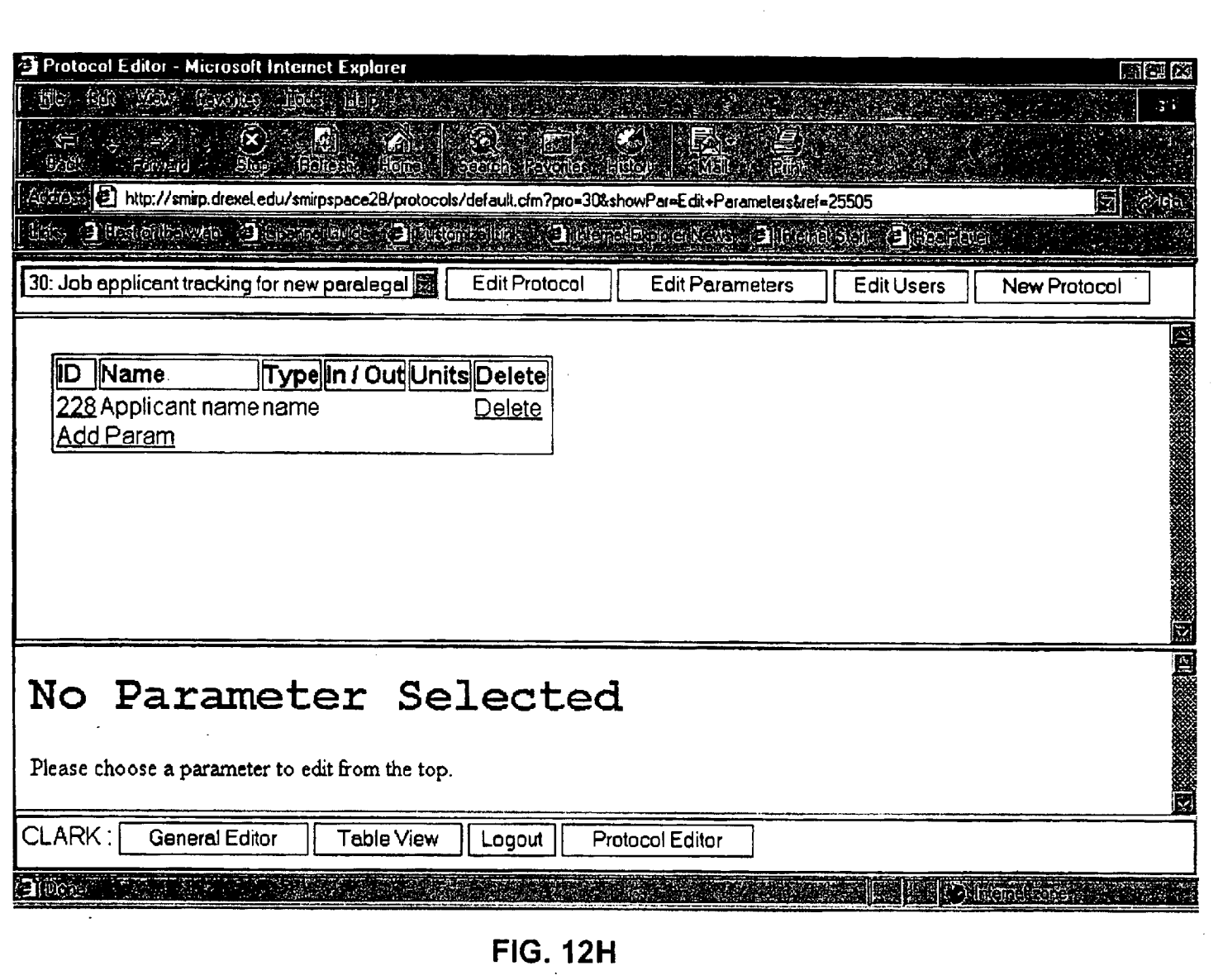
Figure 12I:
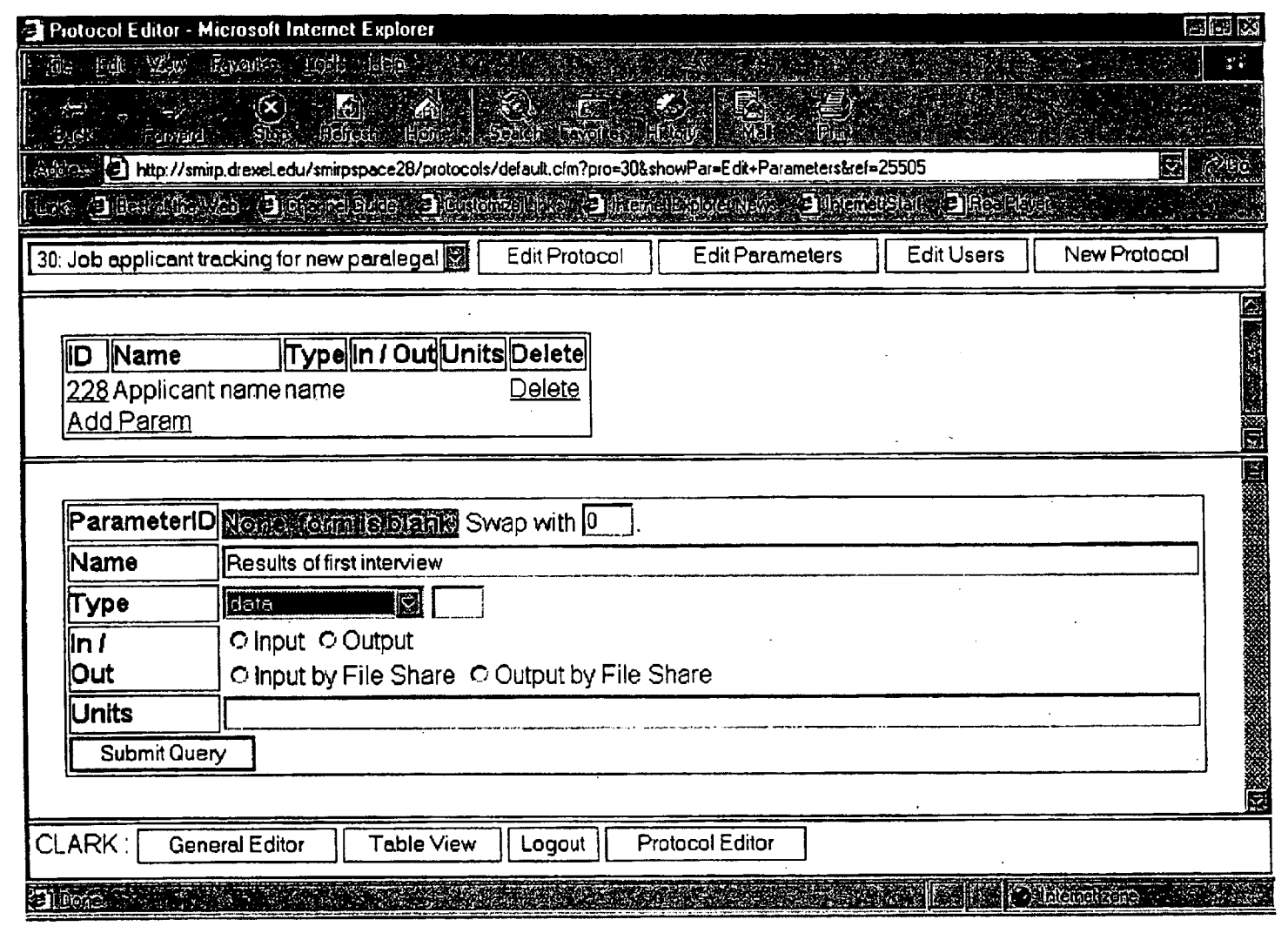
Figure 12J:
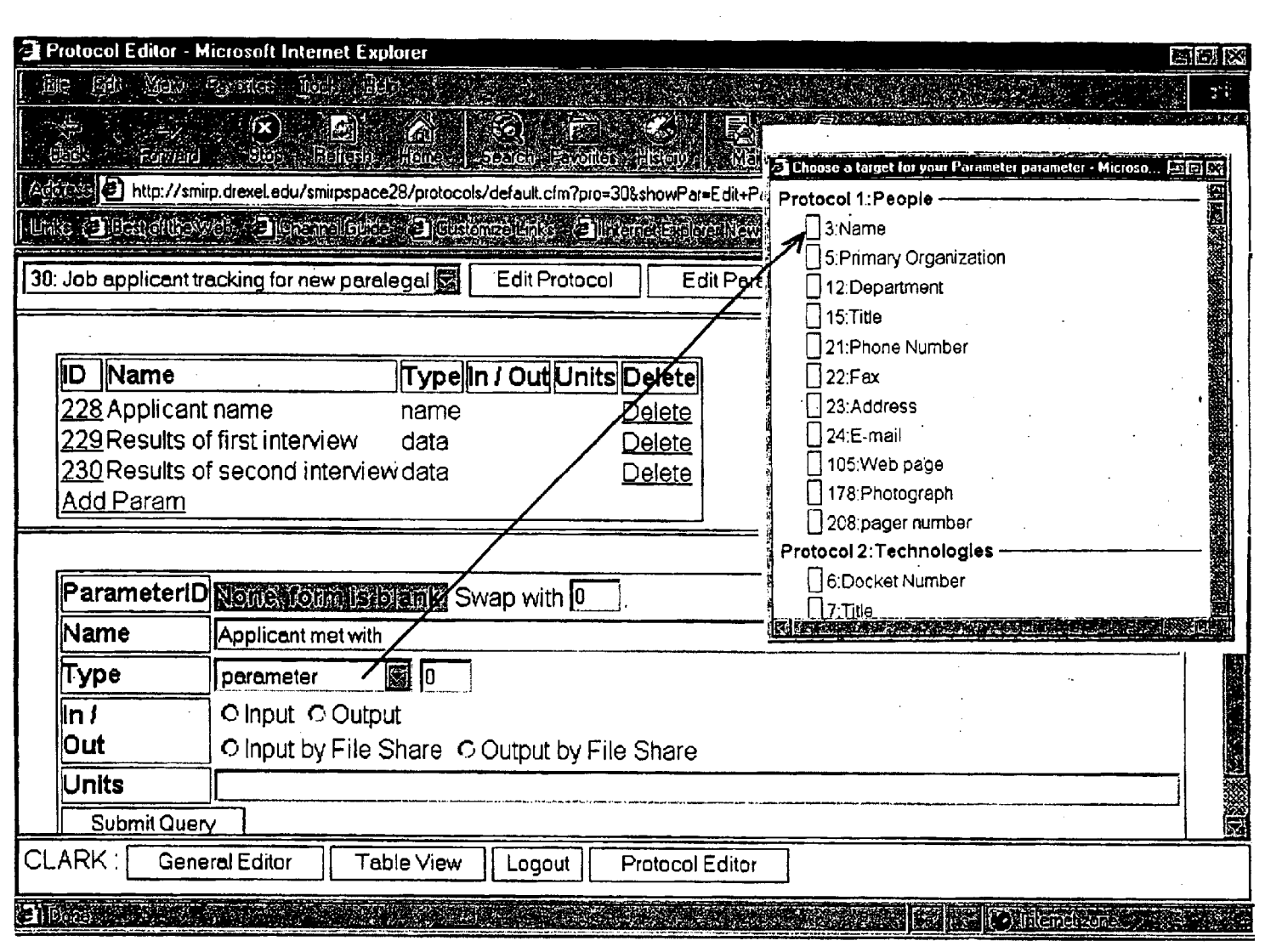
Figure 12K:
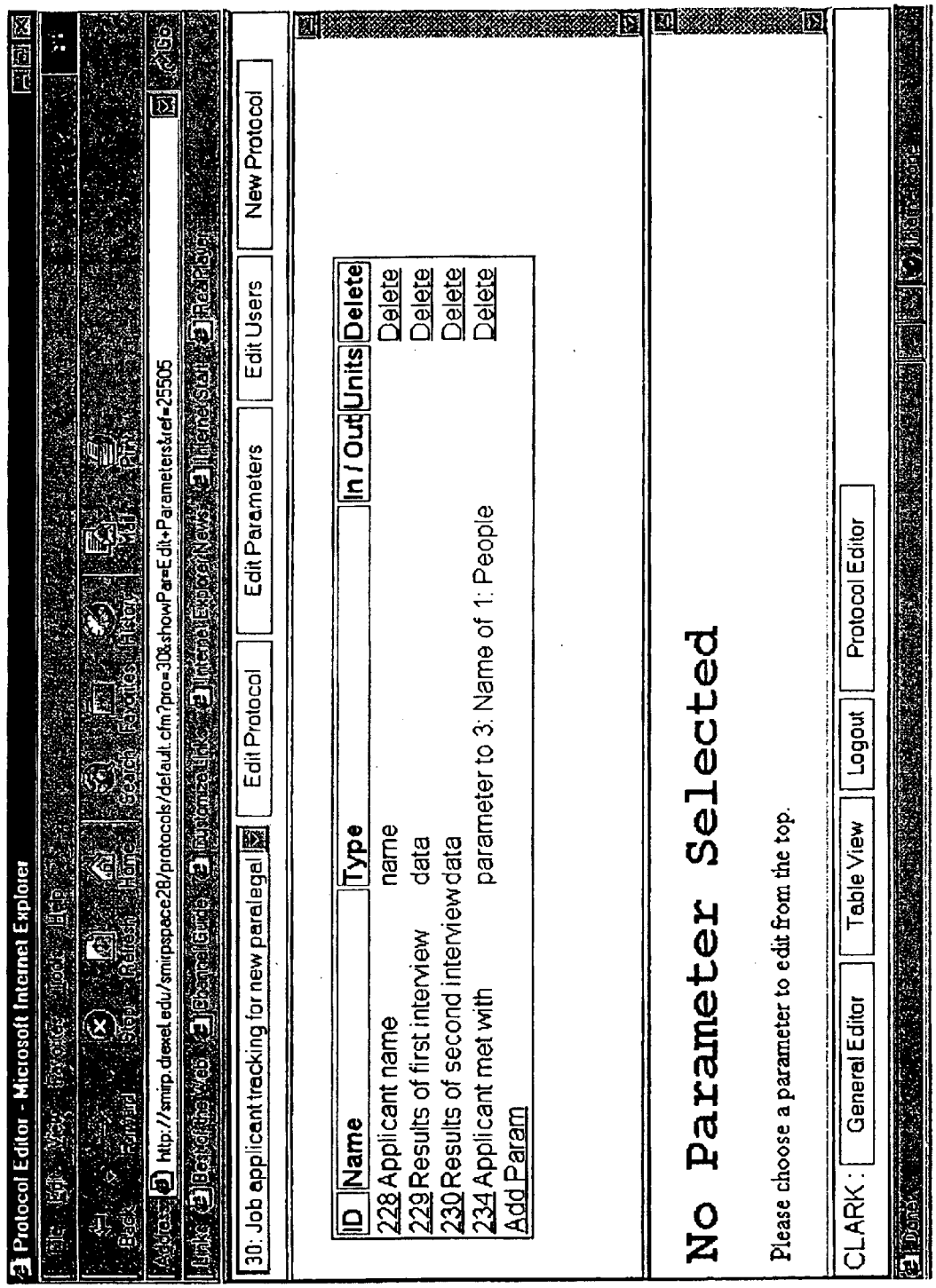
Figure 12M:
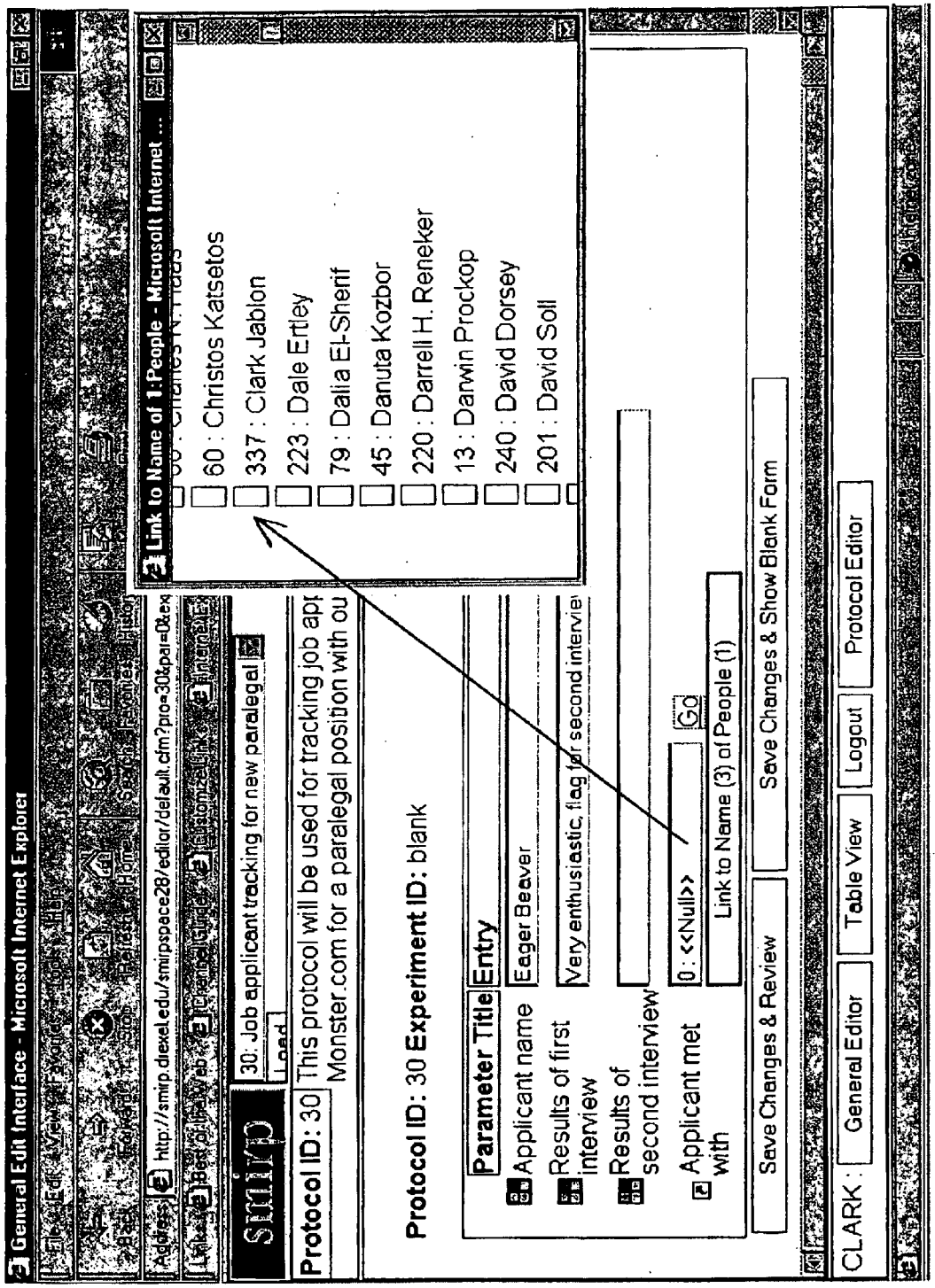
Figure 12N:
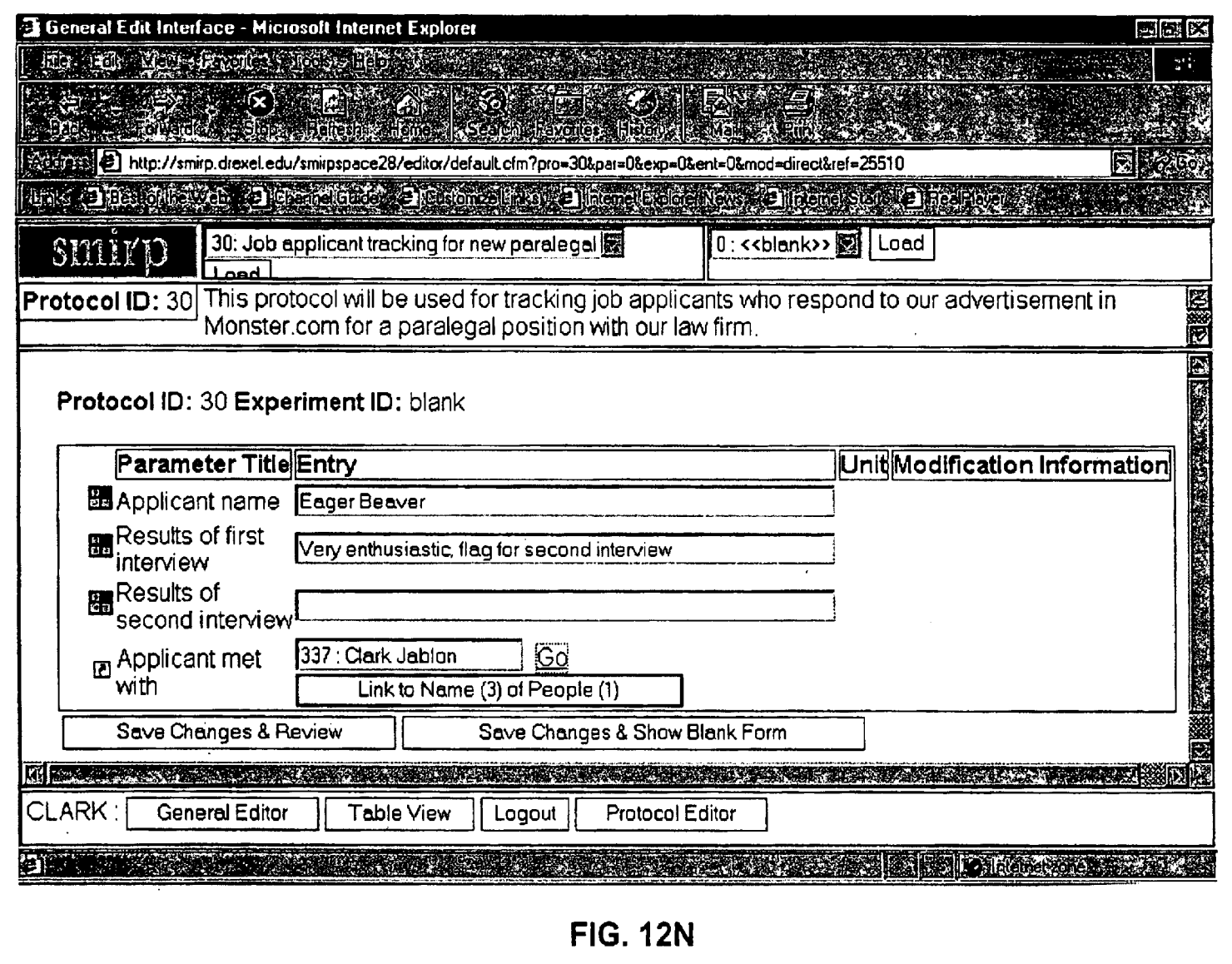
Figure 12O:
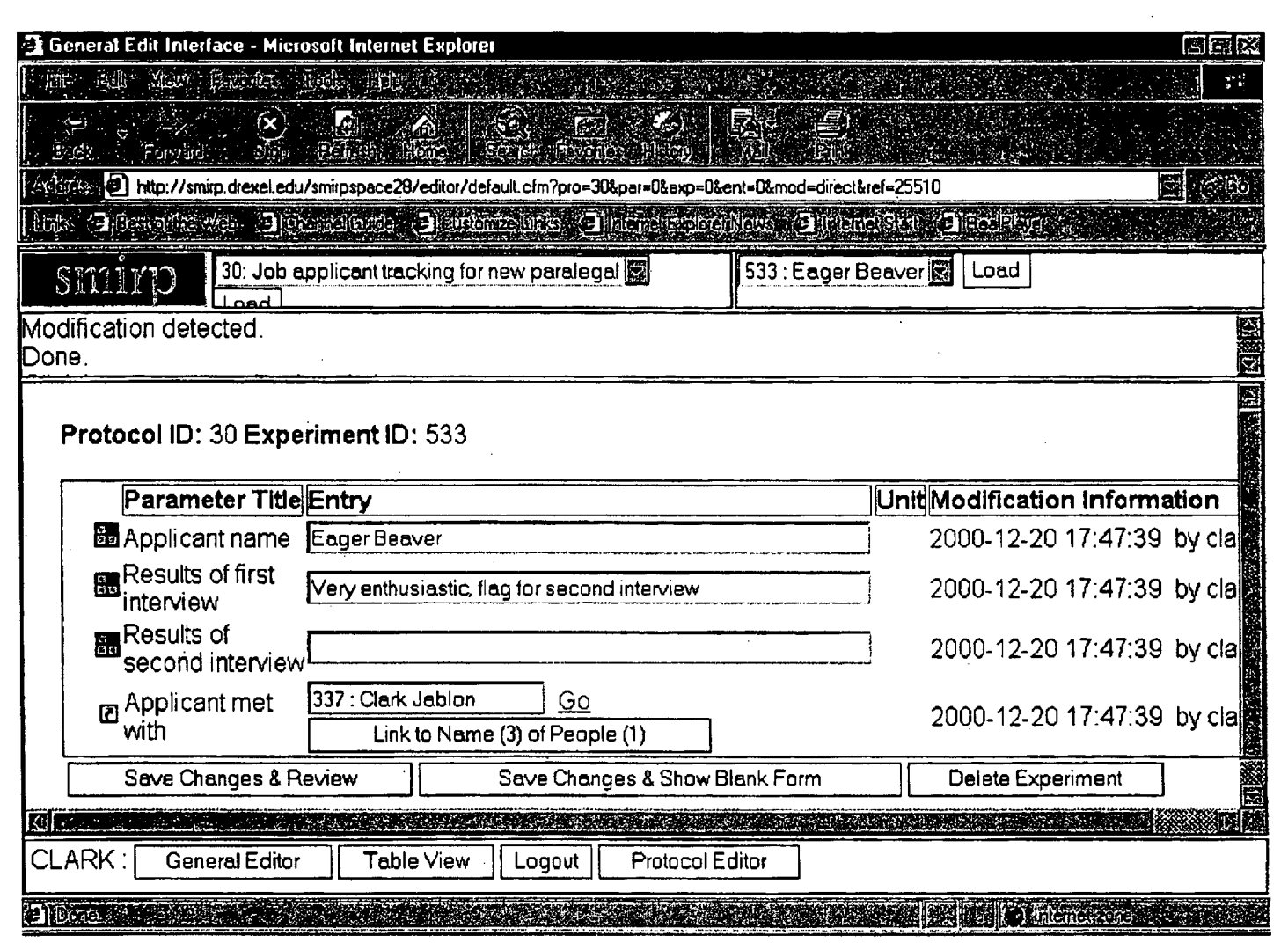

2. Selects the "New Protocol" menu button, thereby causing a New Protocol screen to appear (FIG. 12B).
3. Fill out the Name, Description, Owner and Guest and User Privileges entries and selections in the "New Protocol screen, as shown in FIG. 12C, and select the "Submit Query" menu button, thereby causing the screen shown in FIG. 12D to appear. The new protocol has now been given ID number 30. Further edits may be made to the protocol, if desired, by selecting the "Edit Protocol" menu button. If no further edits are desired, the next step is to create parameters by selecting the "Edit Parameters" menu button, thereby causing the screen shown in FIG. 12E to appear.
4. Select the "Add Param" menu button, thereby causing the default screen in FIG. 12F to appear.
5. Fill in the name of the first parameter and select a parameter type from the drop-down menu, as shown in FIG. 12G. Here, the first parameter is the Applicant's name, and the parameter type is selected to be "experiment name." By selecting "experiment name" as the parameter type, the experiment name (here, the Applicant name) will also be displayed in conjunction with the experiment number when the experiment number is assigned. Next, select the "Submit Query" menu button. The screen shown in FIG. 12H will then appear. As each parameter is created, it is assigned a Parameter ID number. Here, the Applicant name was assigned Parameter ID: 228. Additional parameters may now be selected, if desired.
6. FIG. 12I shows the addition of a data-type parameter called "Results of first interview." Another data-type parameter called "Results of second interview" was also added (no screen shown).
7. FIG. 12J shows the addition of a parameter-type parameter, as discussed above. When a parameter-type parameter is selected, the user must select a previously defined parameter. In one embodiment of the present invention, a pop-up window appears to make the selection. Any previously defined parameter of any existing protocol may be selected by clicking on the box next to the parameter name in the pop-up window. Here, the parameter 2: Name of Protocol 1 was selected. (In an alternative embodiment of the present invention, a drop-down menu associated with the "Applicant Met With" parameter may be used instead of the pop-up screen if there are only a small number of parameters to be displayed.) FIG. 12K shows the resulting screen which confirms the linking of Parameter ID: 234 "Applicant Met With" to Parameter 3: Name in Protocol 1: People. In this example, the protocol has now been completed. The user may then switch to the General Editor to enter an experiment (here, a job applicant). This causes the default screen shown in FIG. 12L to appear.
8. FIG. 12M shows the process of filling in the parameters of a blank experiment. When the "Applicant Met With" parameter is selected, a pop-up screen appears that lists the experiments in the Parameter 3: Name in Protocol 1: People. The user then selects the name from the pop-up screen. (In an alternative embodiment of the present invention, a drop-down menu associated with the "Applicant Met With" parameter may be used instead of the pop-up screen if there are only a small number of experiments to be displayed.) FIG. 12N shows the screen after the experiment is selected. When the appropriate parameters have been entered, the "Save Changes & Review" button may be selected, thereby causing the screen shown in FIG. 12O to appear. An Experiment ID: 533 has now been assigned to the previously blank experiment. Referring again to FIG. 12N, if the "Save Changes & Show Blank Form" button is selected, the FIG. 12L blank experiment screen appears.
9. The user may select the Protocol Editor screen if subsequent changes are desired to the parameters in any previously defined experiment. Likewise, subsequent changes can be made to protocols. Of course, a user can only make changes to experiments and protocols if authorized to do so.

The present invention may be used for a plurality of automated, computer-implemented knowledge exchange processes. Two such processes are described below. The two processes may be used separately or together in a single seamless process. One purpose of these processes is to tap the resources of students who must perform academic-oriented research tasks for completion of course requirements. In certain academic disciplines, course requirements may consist of research tasks, such as performing experiments or answering complex queries or questions. The experiments may mimic previously performed and proven experiments, thereby testing the skills of the student. Alternatively, the experiments may be designed to uncover new knowledge. The complex queries may be hypothetical or real. In the present academic model, the students perform the required research and submit their work to an instructor (typically, an expert in the field of the research) who reviews the work and assigns a grade to the student based on the research and other factors. Commercial entities, such as companies, often conduct research in areas that overlap academic courses. The present invention may be used to tap the resources of the captive students to conduct research tasks for commercial entities for the financial benefit of all parties involved in the knowledge exchange process, such as the student, the instructor, and the academic institution of the student.

In one preferred embodiment of the process, a commercial entity supplies the queries that are provided to the students. One important feature of the process is that the answers returned to the commercial entity are validated by an expert in the field of the inquiry, such as the instructor of the course in which the students are enrolled. A plurality of different levels of validation may occur. One level of validation relates to the quality of the answer. The instructor must grade the answer as part of the duties of teaching the course. An answer that receives a grade at or above a predetermined level (e.g., A or A+ answers) may be determined to be a validated answer. If the student is required to support the answer with a published reference, then another level of validation relates to the quality of the reference. That is, the instructor will also validate the reference to verify that the reference meets any predetermined standards that are set in the instructions to the students (e.g., the reference must be from a peer-reviewed scientific journal), and that the cited passages in the reference support the reason that the student is relying upon the reference in the student's answer. The student's grade may incorporate the quality of the answer and the quality of the reference. For example, an A-type answer may require a properly validated reference, as well as an excellent answer. The grades may be used as an automated filter to determine which answers should be electronically communicate to the commercial entity.

EXAMPLE 1 of automated, computer-implemented knowledge exchange process:

A computer-implemented process is provided of providing queries to respondents and selling to customers validated answers to the queries. The following steps occur in the process:

1. At least one query is electronically communicated to a plurality of respondents, such as students in a class.
2. At least one of the respondents electronically communicates to an electronic file location a proposed answer to the query.
3. The proposed answers are electronically communicated from the electronic file location to an expert in the field of the query, such as the class instructor.
4. The expert reviews and validates the proposed answers, and electronically communicates to the electronic file location an indication that selected proposed answers are determined to be properly validated.
5. A plurality of customers access the electronic file location to view the queries having properly validated answers.
6. The customer electronically authorizes payment to access the answer related to a specific query.
7. Upon approval of the payment authorization, the customer is allowed to electronically access the answer. The customer payments for receipt of answers may be electronically allocated among a plurality of entities (e.g., the student, the instructor, and the academic institution of the student) based on a predetermined allocation scheme.

If reference validation is part of the process, then step 2 further includes communicating to the electronic file at least one citation of a published reference that the respondents believe supports each of the proposed answers, step 3 further includes electronically communicating the reference citations to the expert, and step 4 further includes having the expert review and validate the references associated with the reference citations and electronically communicating to the electronic file location an indication that the references associated with the reference citations are determined to be properly validated. Also, the following additional steps are performed:

8. The customer electronically authorizes payment to access the references associated with the reference citations related to a specific query having an answer and reference citations that were determined to be properly validated.
9. Upon approval of the payment authorization, the customer is allowed to electronically access the references. In one embodiment of the process, the references are accessed from a content site that contains electronic copies of all of the cited references. The customer payments for receipt of the references may be automatically allocated to a plurality of predetermined entities, such as the electronic file location and the content site.

In one preferred embodiment of the present invention, the electronic file location is a web site. However, the scope of the present invention includes other types of electronic file locations, such as storage media accessible via other types of electronic networks, or a storage media in a workstation computer.

EXAMPLE 2 of automated, computer-implemented knowledge exchange process:

A computer-implemented process is provided of selling to customers validated answers to queries. The following steps occur in the process:

1. At least one query is electronically communicated to a plurality of respondents, such as students in a class.
2. At least one of the respondents electronically communicates to an electronic file location a proposed answer to the query and at least one citation of a published reference that the respondent believes supports the proposed answer. The electronic file location may further include an electronic copy of any cited reference or a hyperlink to an electronic copy of any cited reference.
3. The proposed answers and the reference citations are electronically communicated from the electronic file location to an expert in the field of the query. If the respondents are students, then the expert may be the class instructor.
4. The expert reviews and validates the proposed answers and the references associated with the reference citations, and electronically communicating to the electronic file location an indication that selected proposed answers and the references associated with the reference citations are determined to be properly validated.

EXAMPLE 3 of automated, computer-implemented knowledge exchange process:

A computer-implemented process is provided of selling to customers validated answers to queries, wherein the answers are also supported by validated references. The following steps occur in the process:

1. At a first electronic file location, provide a plurality of queries and respective answers, and at least one citation of a published reference that supports each of the answers.
2. A plurality of customers electronically communicate with the first electronic file location to view the queries.
3. A customer electronically authorizes a first payment to access the answer to a specific query.
4. Upon approval of the payment authorization, the customer is allowed to electronically access the answer stored in the first electronic file location.

If access to the supporting reference is desired, the customer electronically authorizes a second payment to access an electronic copy of each reference that supports the answer to a specific query. Upon approval of the payment authorization, the customer is allowed to electronically access each of the supporting references.

The first and second electronic file location may be the same file location or different file locations. In one embodiment of the present invention, a content aggregator hosts all of the references at a second electronic file location which is physically separate from the first file location.

For each of the processes described above, the following additional features may be provided:

1. A variety of different communication processes may be used to communicate data to and from the electronic file location. For example, the queries, answers and reference citations may be directly viewed, retrieved and posted to and from the electronic file location by the appropriate parties. Alternatively, the queries, proposed answers and reference citations may be e-mailed to and from the electronic file location by the appropriate parties. Likewise access to and from the electronic file location by the expert for the validation steps may be via direct viewing and posting or via e-mail. Combinations of e-mailing and direct posting are also possible.
2. The reference citations may be required to be citations to peer-reviewed scientific journal references.
3. The validation indication may be a grade assigned by the class instructor.

4. The respondents may be allowed to view proposed answers and reference citations provided by other respondents at the electronic file location. In this manner, the electronic file location may be used by the respondents as a collaborative tool in preparing their individual proposed answers and reference citations.

5. The electronic file location may be a web site, accessible via a browser interface. However, the scope of the present invention includes other types of electronic file locations, such as storage media accessible via other types of electronic networks, or a storage media in a workstation computer.

6. The customer may be a company in a life science field. However, the present invention may be used to answer queries in any particular field of endeavor.

In all of the processes, appropriate security is provided via login IDs and passwords so that the customers, respondents, and experts may access only the information that they are entitled to access.

FIGS. 10A–10E show how SMIRP may be used to implement the knowledge exchange processes described above. The protocols of FIG. 10A are created using the same protocol creation process described in FIGS. 12A–12O. The protocols are used as follows:

1. Queries are placed in Protocol 2: Questions. See FIG. 10B.

2. Respondents (here, students) enter the answers in Protocol 3: Answers. See FIGS. 10C, 10D and 10E. References are entered in Protocol 5: References. The respondent links the references to the answers in Protocol 3: Answers. See FIG. 10E.

3. The expert validates the answers in the Answer Grade parameter of Protocol 3: Answers. The student has read-only privileges with respect to this parameter.

4. The validated answers that meet a predetermined quality level are provided to another SMIRPspace, or to another electronic file location for retrieval and payment by the customer, as described above.

Figure 13:
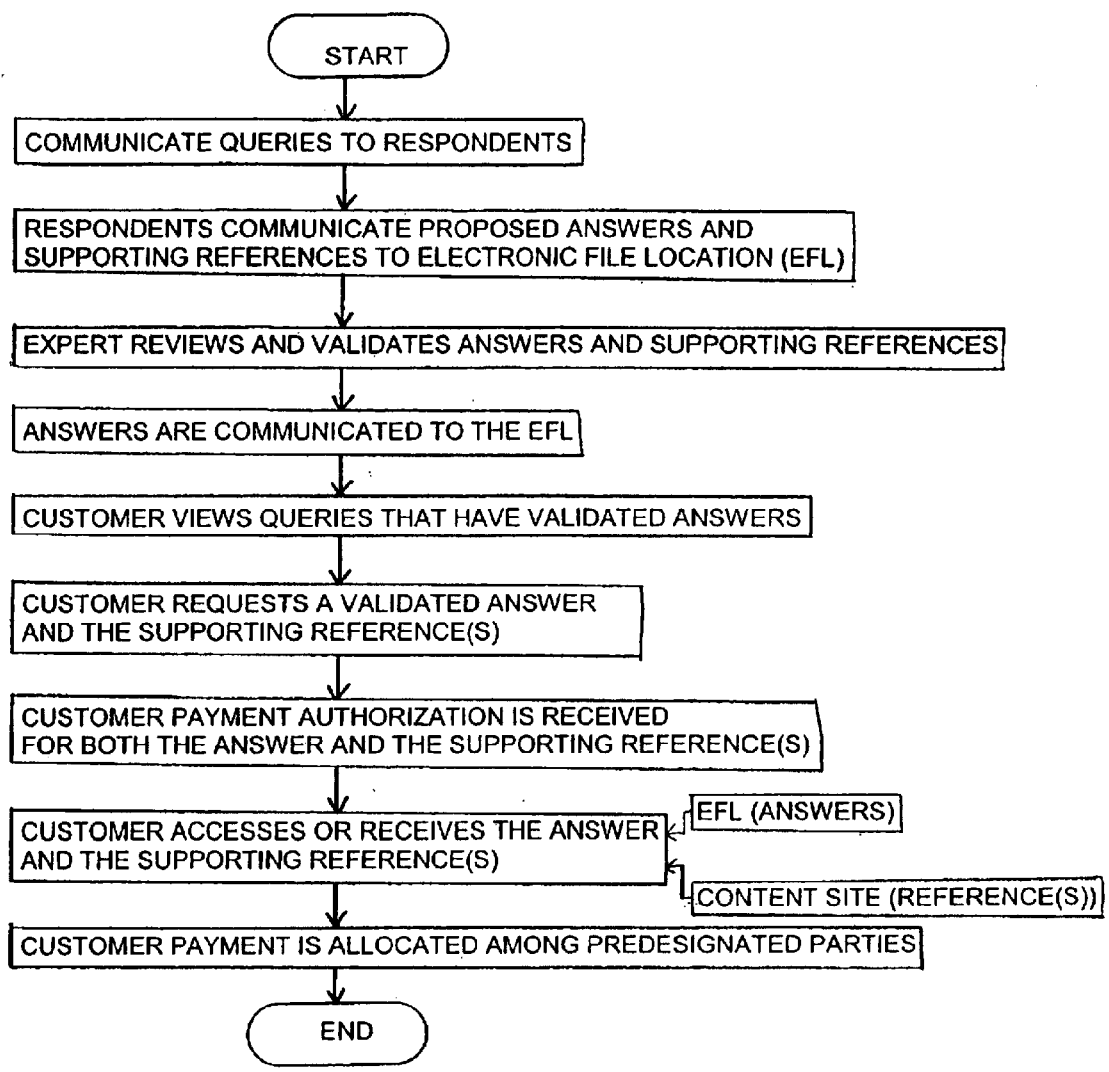
FIG. 13 is a self-explanatory functional flowchart showing the overall process of how the present invention may be used to implement the knowledge exchange process.

FIG. 13 is a self-explanatory functional flowchart showing the overall process of how SMIRP may be used to implement the knowledge exchange process.

SMIRP Alerts

Various types of e-mail alerts are sent out to selected individuals at specific intervals when certain types of SMIRP activity are detected. A commonly used alert is a summary of recent updates to a certain SMIRPspace sent every hour, on the hour. This alert provides the relevant parameter entries with the corresponding date/time stamps, users, protocols, experiments and parameters. A second type of commonly used alert provides information viewed as well as inputted.

FIG. 14A shows an example of an alert that provides an hourly audit of all activity in a particular SMIRPspace. FIGS. 14B–14N shows an example of an alert that provides a profile dump of all activity that has occurred in a particular SMIRPspace. The alerts are programmed to be sent to predefined entities at periodic time intervals. In one embodiment of the present invention, the alerts are e-mailed to selected recipients in a spreadsheet format. For the alert in FIG. 14A, the e-mail header may read:
From: sender@institution.edu
To: recipient@location.com
Subject: smirpspace28—Hourly audit For the alert in FIG. 14B, the e-mail header may read:
From: sender@institution.edu
To: recipient@location.com
Subject: smirpspace28—Profile Dump The alerts shown in FIGS. 14A–14N relate to the activity shown in FIGS. 12A–12O. For example, FIG. 14A shows that entries were made for Protocol ID: 30, Experiment ID: 533 in SMIRPspace28. FIGS. 14B–14N provide more extensive details of all activity that occurred in SMIRPspace28, including login, and all read, deletion, and insertion activity for each protocol that was entered by a user. In the example, the activity of only one user is shown. However, if other users were active in SMIRPspace28 during the time period covered by the alert, their activity would also be shown.

Alert use for the teaching SMIRPspace example (FIGS. 10A–10E and 11A–11B) is described next.

Throughout the course of using SMIRP to assist in the teaching of the class, comments may be posted by students and the teacher in text boxes in the References and the Answers protocol. This type of modification, in addition to any other entries by any participant in the teaching SMIRPspace may be e-mailed in summary form every hour on the hour to the class administrators, unless there are no entries to report. A second type of alert, including not only modified information, but also views, may be e-mailed in the same manner at the same frequency. In this manner, it is possible for the teacher to be aware of issues explicitly addressed by the students, as well as the type of activities each student was involved in. It is thus possible to quickly respond to the way problems are approached, even before completion of the assignments. In addition, technical issues relating to SMIRP use may be addressed very quickly by the technical class administrators.

Figure 15A:
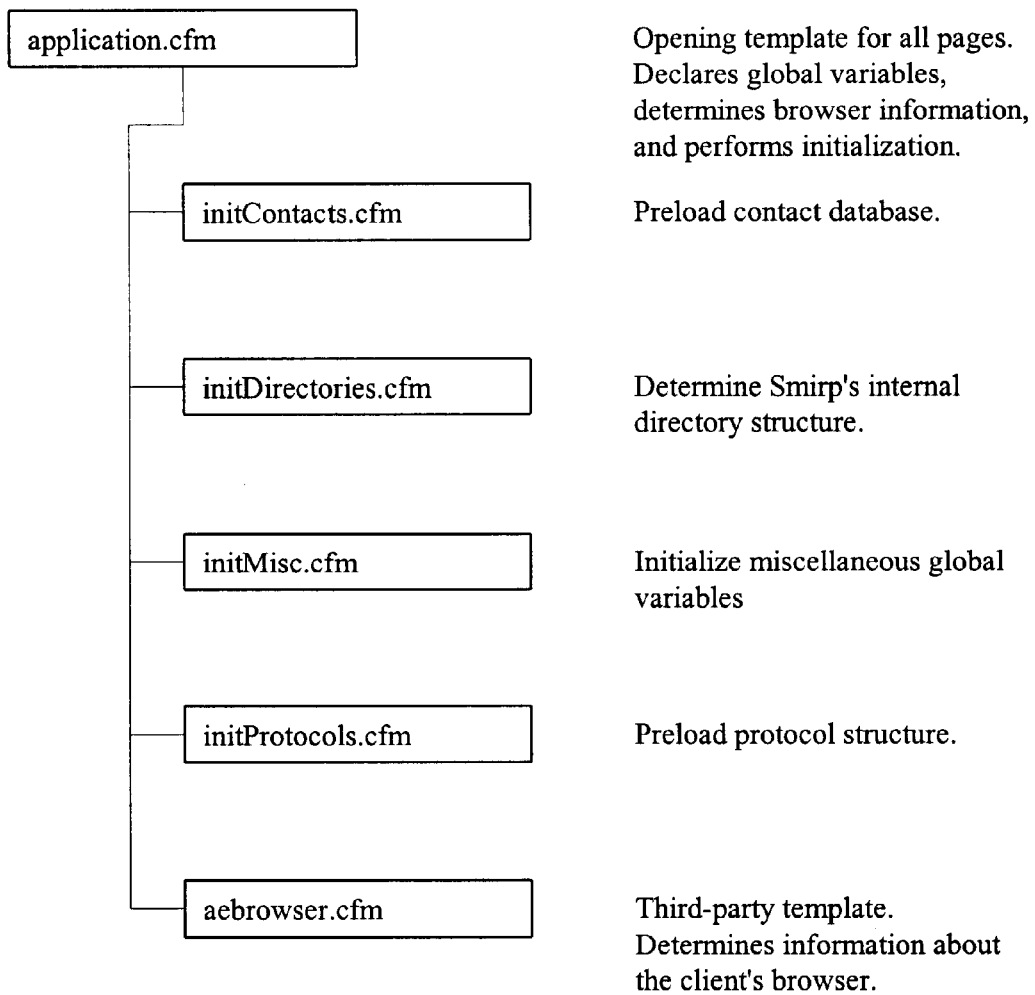
FIGS. 15A–15R provide a list and brief description of all of the files needed to run one embodiment of the present invention.
Figure 15C:
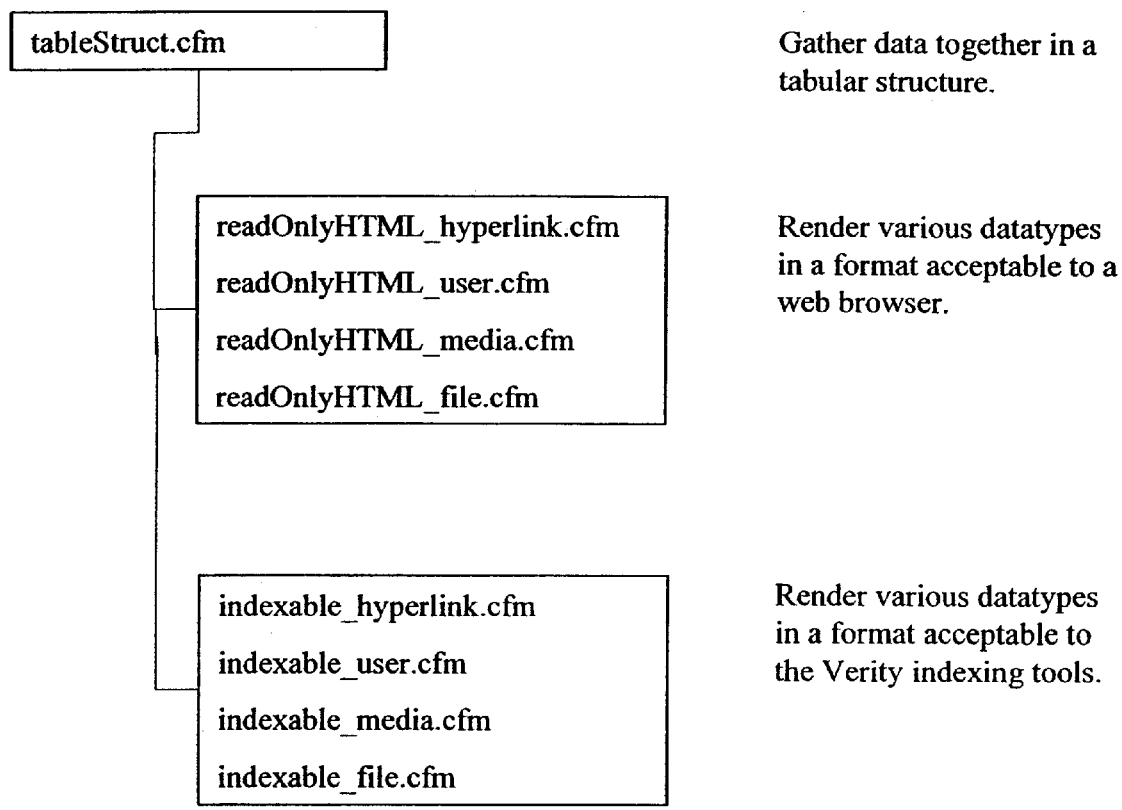
Figure 15D:
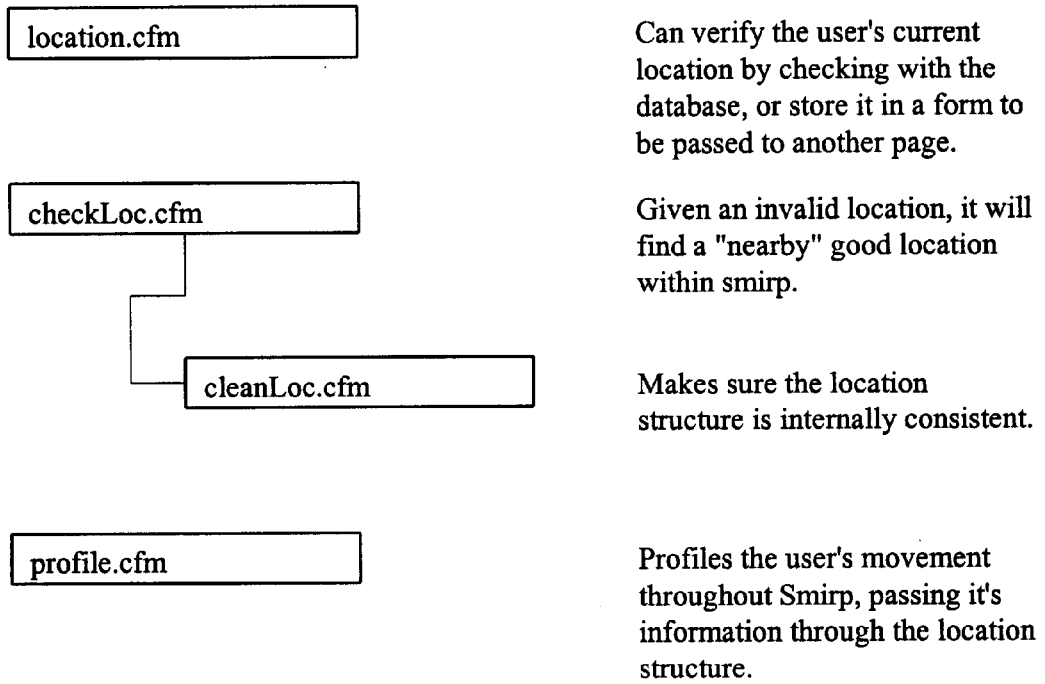
Figure 15F:
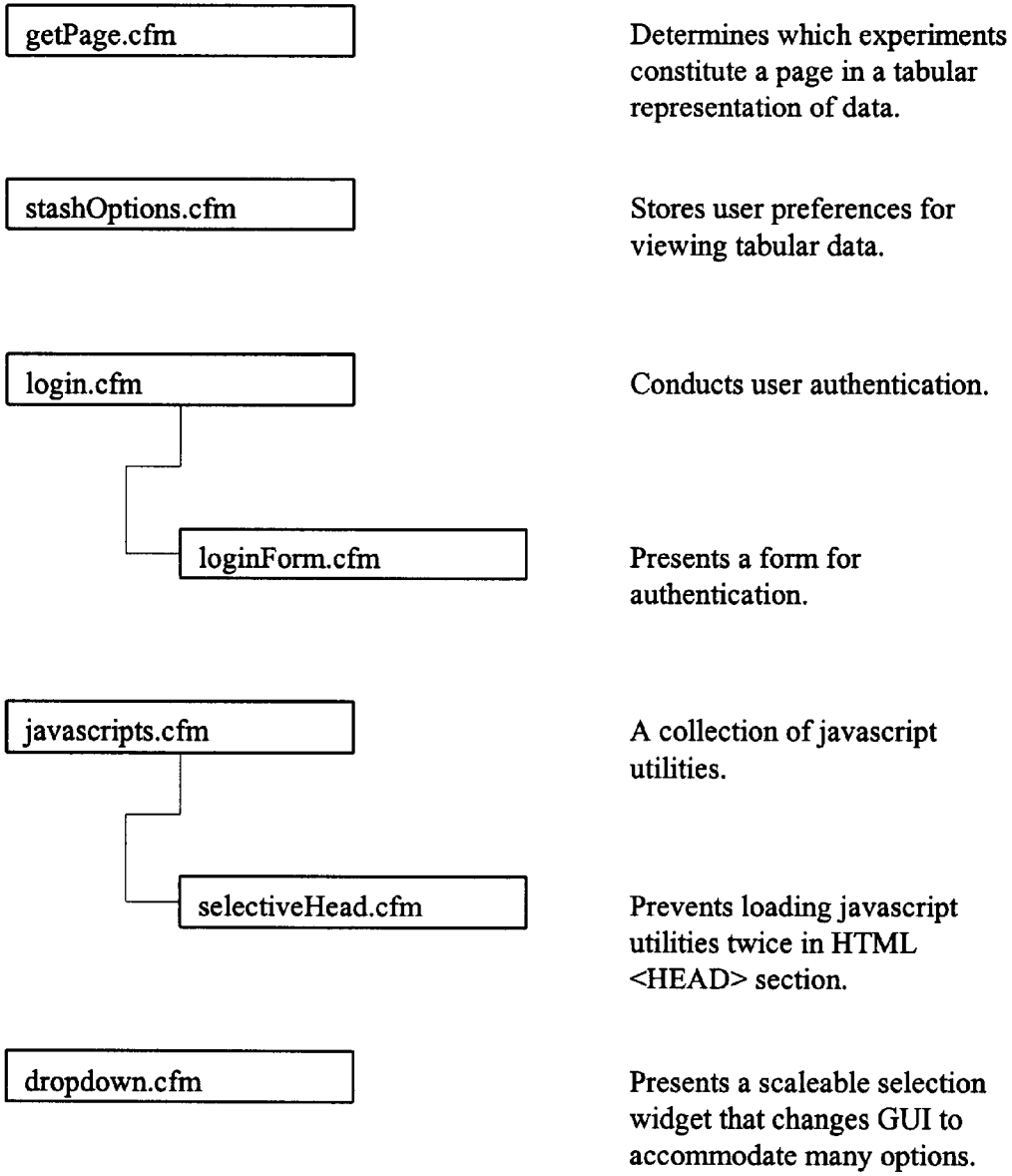
Figure 15G:
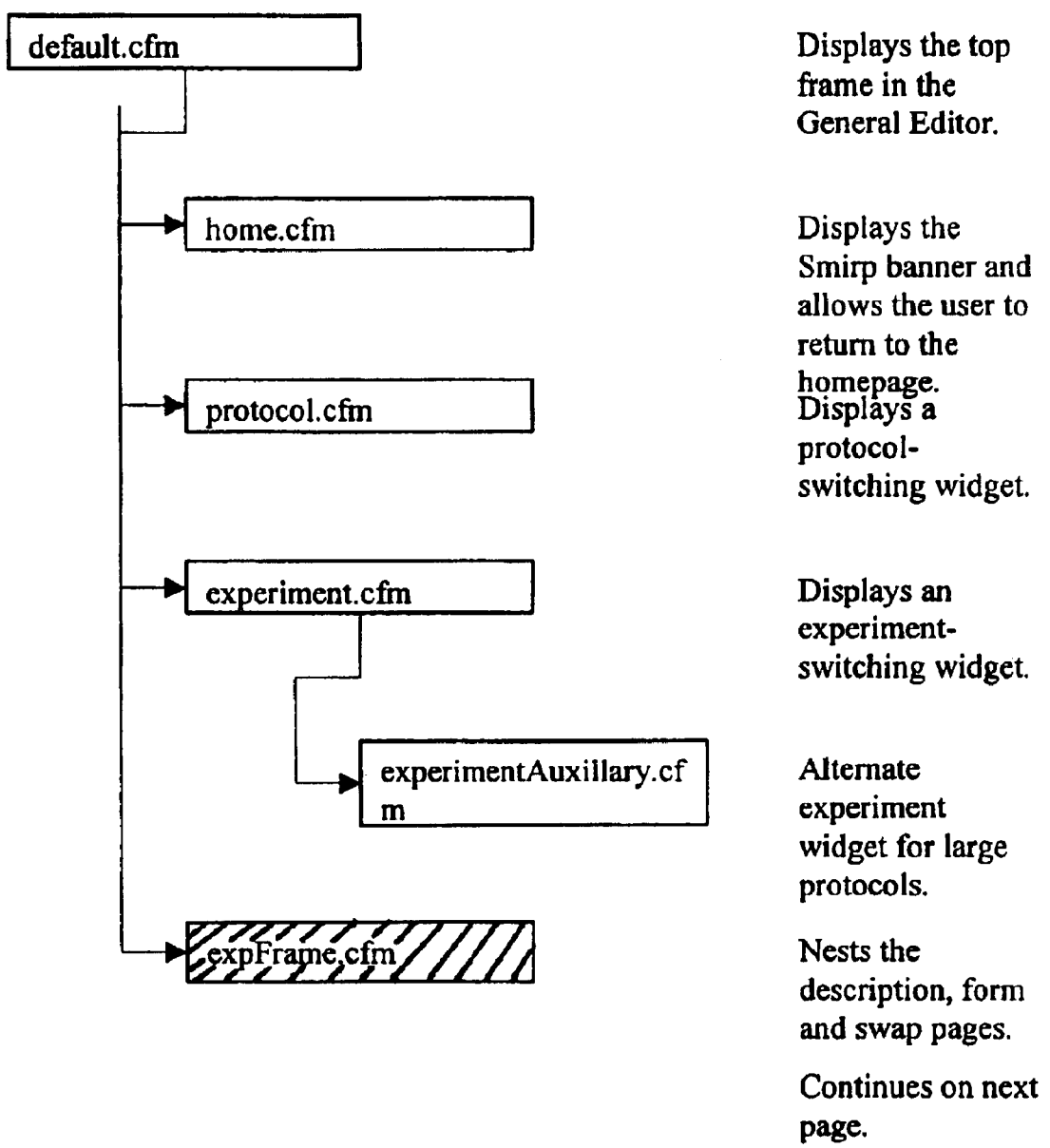
Figure 15H:
Figure 15I:
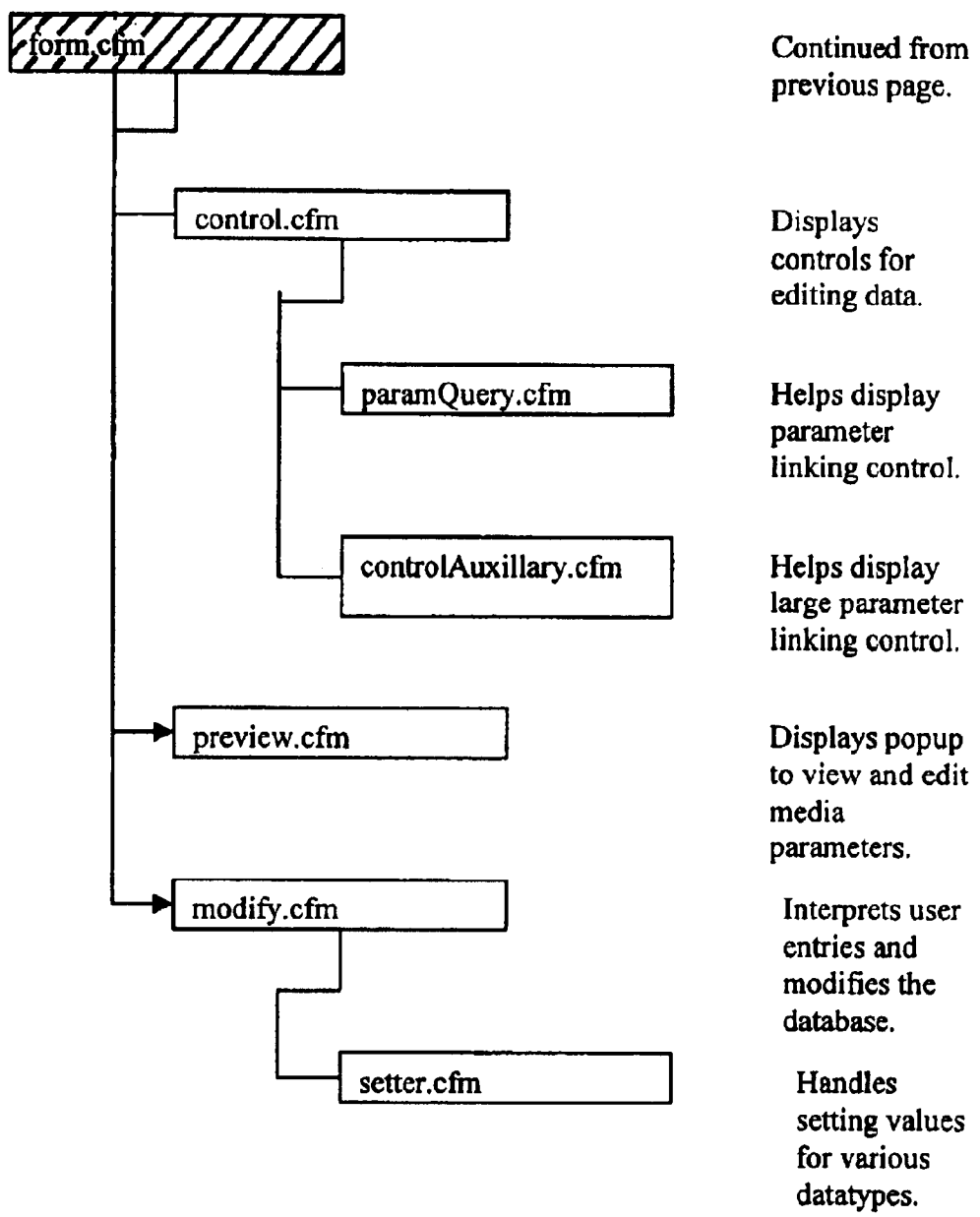
Figure 15J:
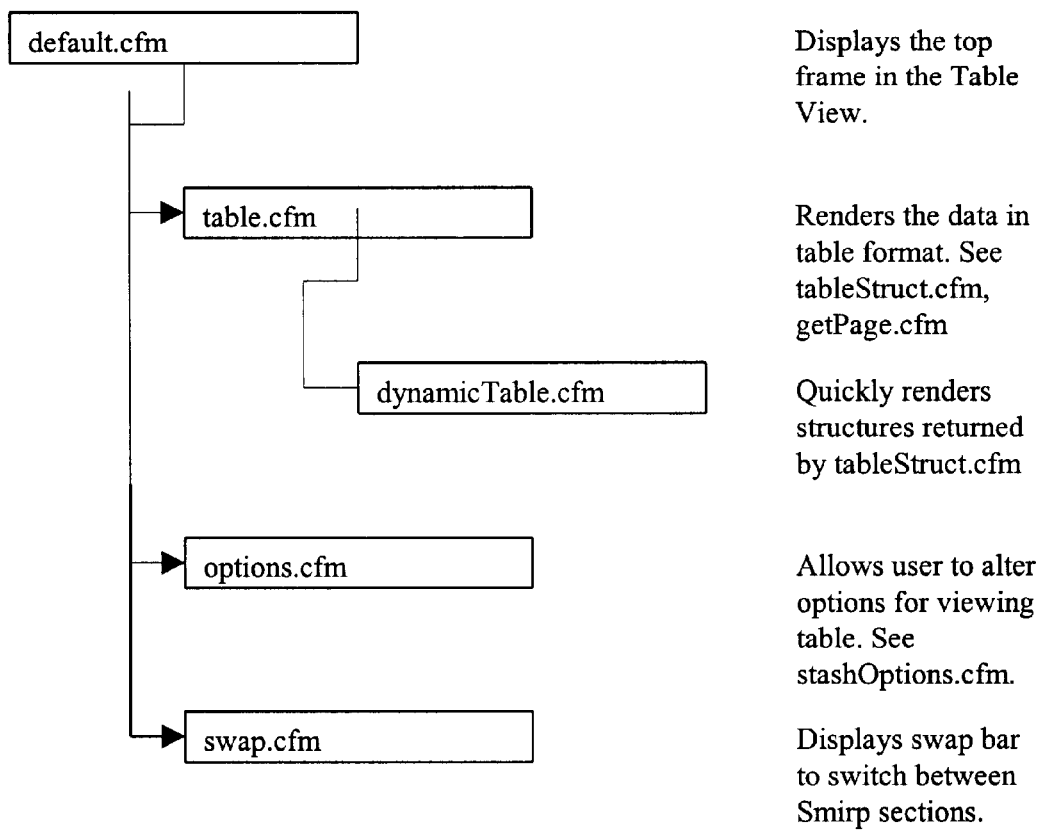
Figure 15K:
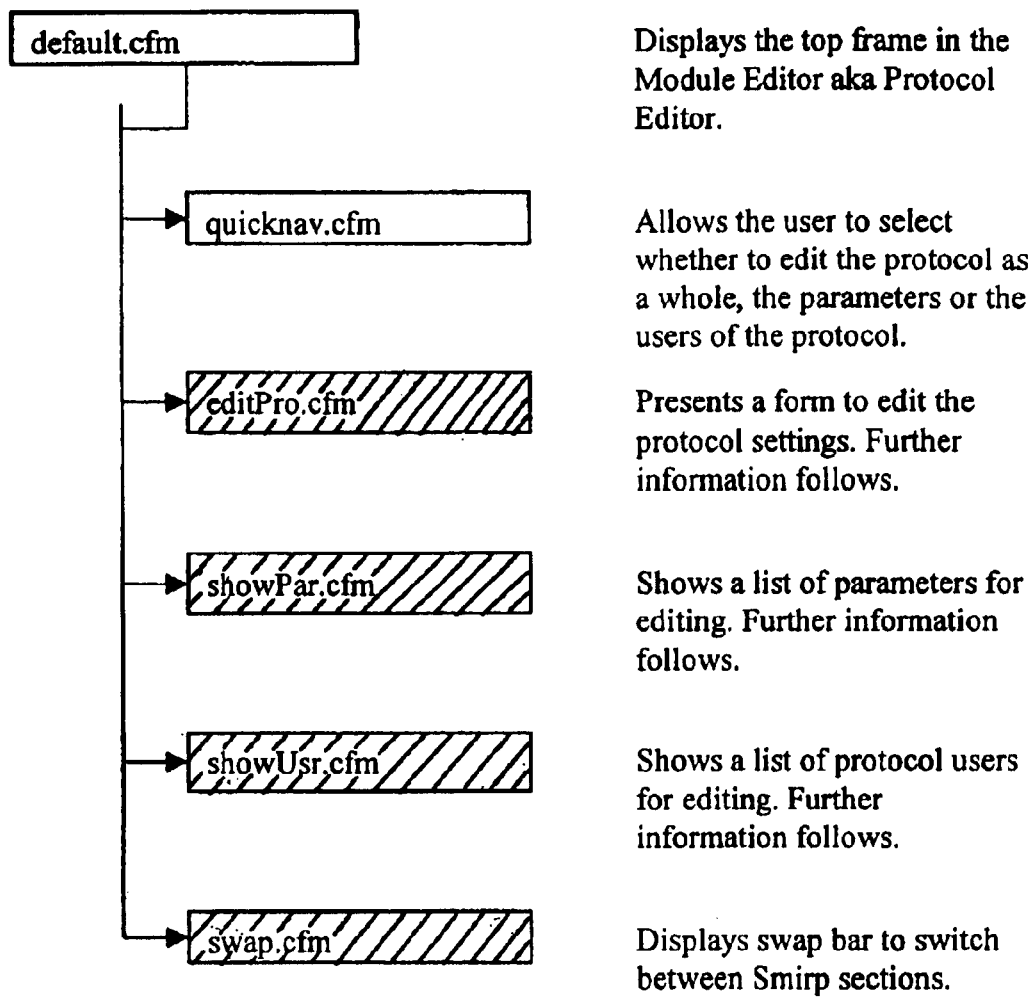
Figure 15L:
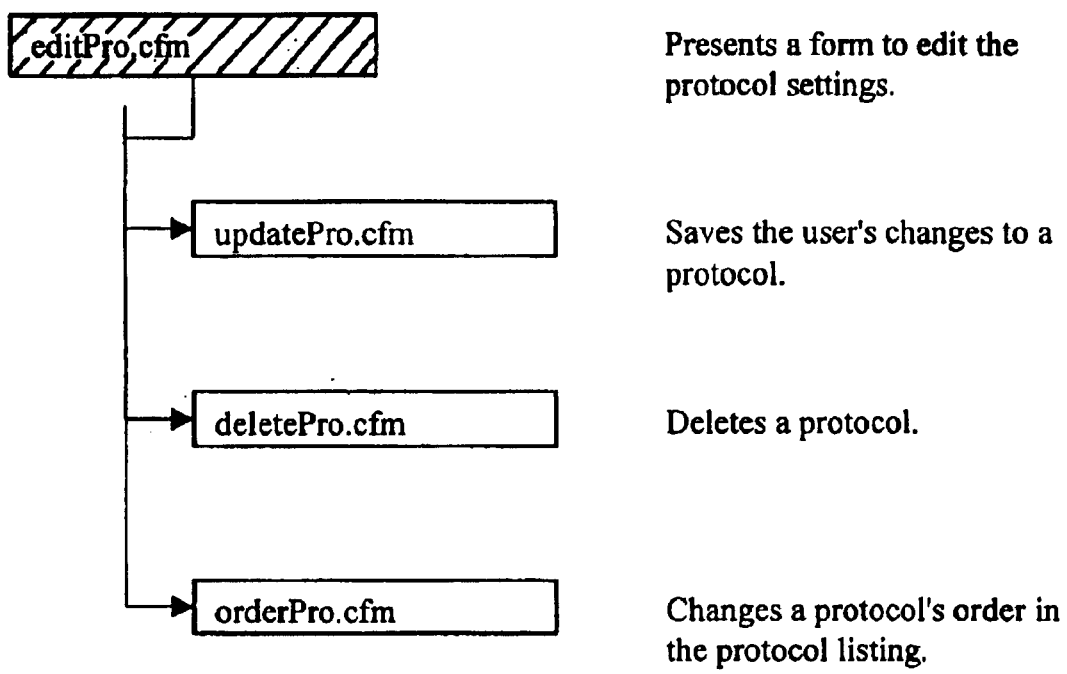
Figure 15M:
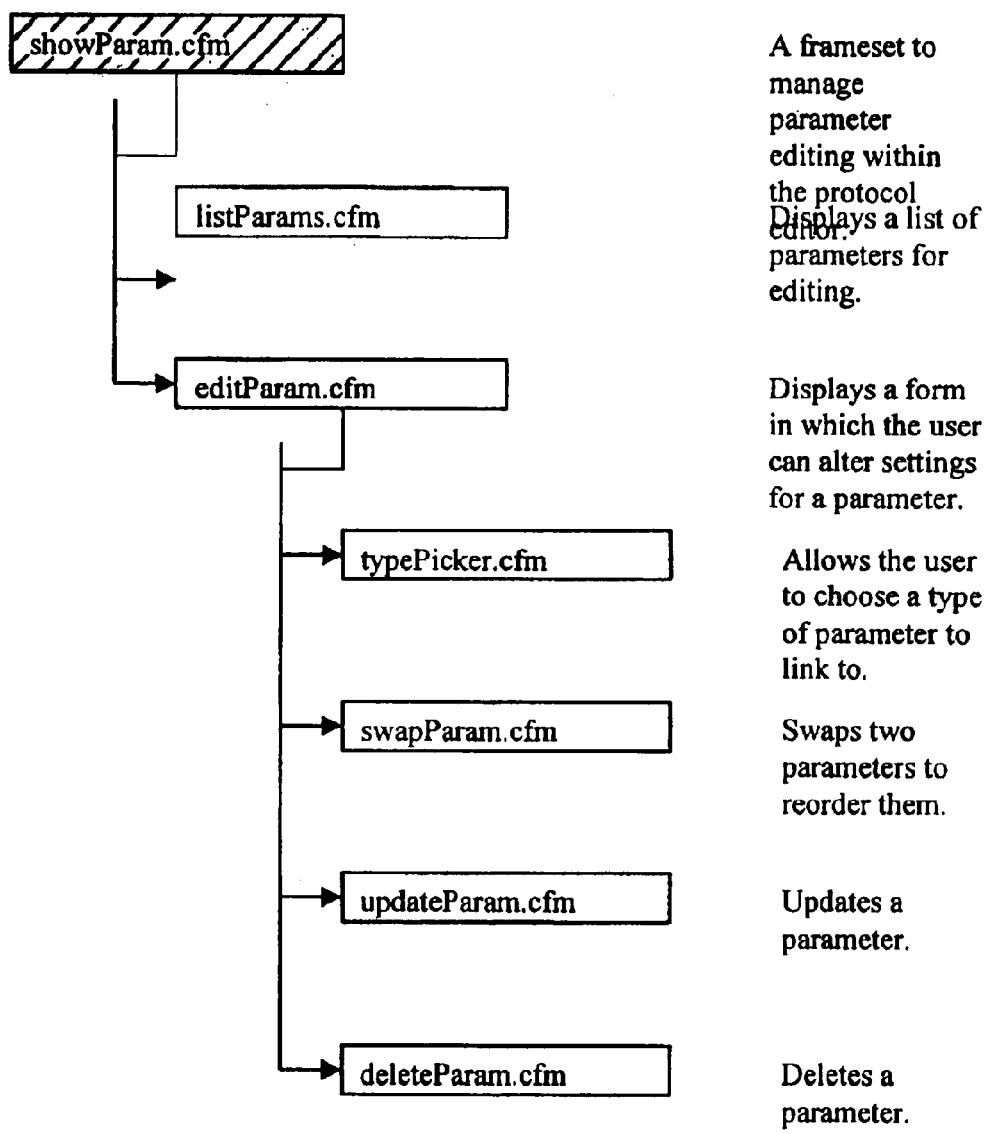
Figure 15N:
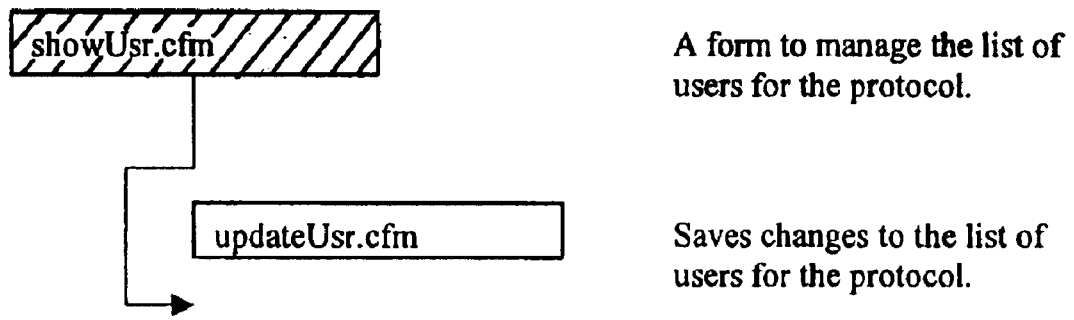
Figure 150:
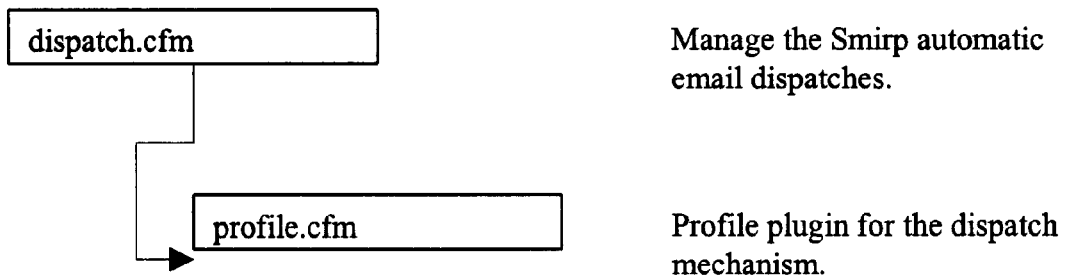
Figure 15P:
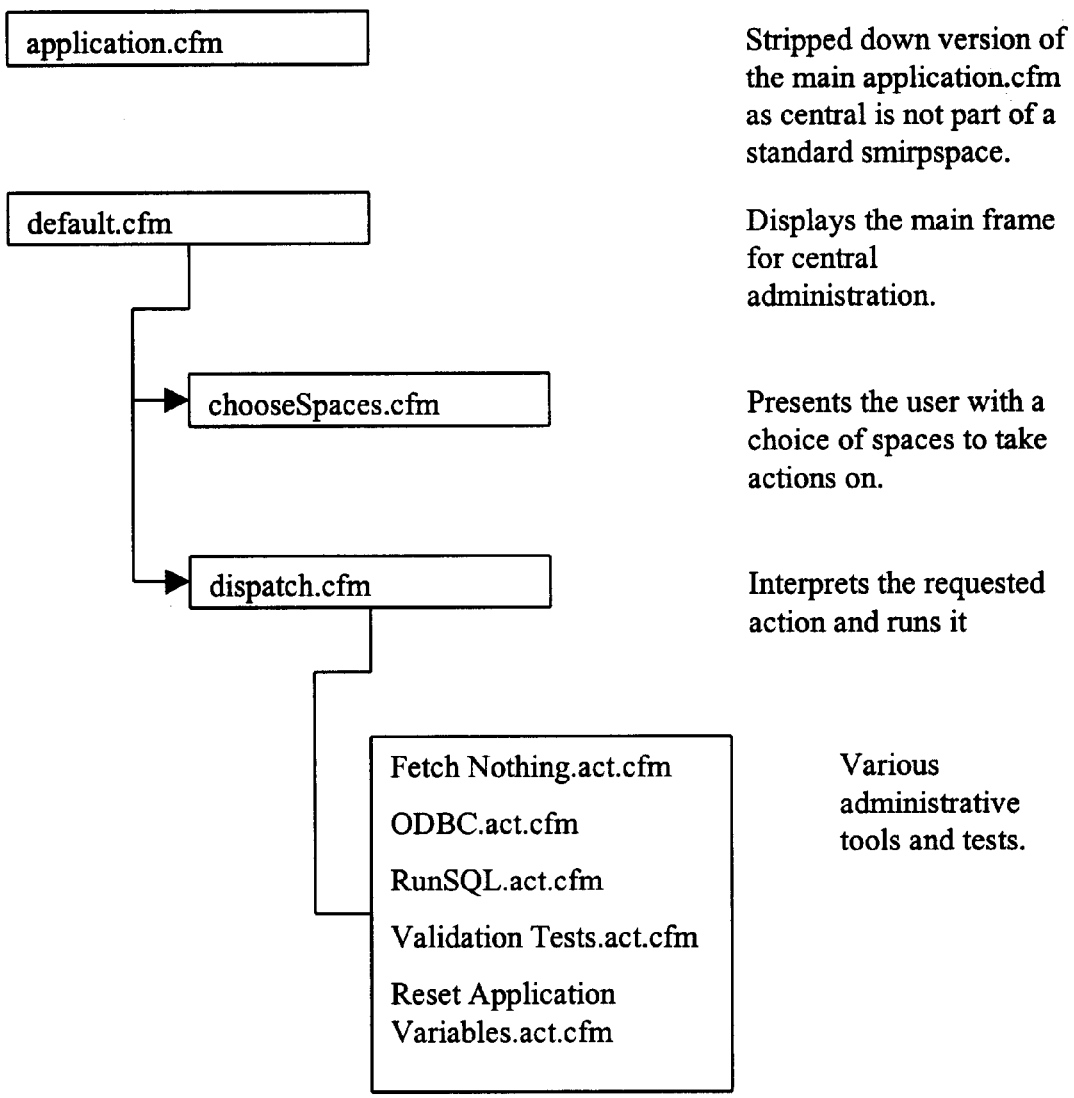

FIGS. 15A–15R provide a list of all of the files needed to run one embodiment of SMIRP described herein, with a brief description of each file in chart format.

The Appendix provides source code for the embodiment of SMIRP outlined in FIGS. 15A–15R.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. A method of establishing a database system, the database system being defined by a plurality of database-oriented projects, each project having one or more parameters, each project also having one or more instances thereof, wherein an entry is associated with each parameter in each instance of a project, the method comprising:

(a) for at least one project, defining at least one parameter as being a parameter of a previously defined project;

(b) designating the at least one parameter as a link to the parameter of the previously defined project, wherein the link designation changes the structure of the database system;

(c) entering the name of a previously defined instance of a previously defined project for any linked parameter entries;

(d) displaying a previously defined instance of a project having at least one linked parameter entries; and (e) viewing an instance of a project having a linked parameter entry by selecting the respective link from the display.

2. A method of establishing a database system, the database system being defined by a plurality of database-oriented projects, each project having one or more parameters, each project also having one or more instances thereof, wherein an entry is associated with each parameter in each instance of a project, the method comprising:

(a) for at least one project, defining at least one parameter as being a parameter of a previously defined project;

(b) designating the at least one parameter as a link to the parameter of the previously defined project, wherein the link designation changes the structure of the database system;

(c) entering the name of a previously defined instance of a previously defined project for any linked parameter entries; and (d) displaying a previously defined instance of a project, the display further including links to any instances having at least one link to the currently displayed instance of a project.

3. The method of claim 2 further comprising:

(e) viewing the linked instances by selecting the respectively displayed link from the display.

4. A method of establishing a database system, the database system being defined by a plurality of database-oriented projects, each project having one or more parameters, the method comprising:

(a) for at least one project, via a web browser interface, defining at least one parameter as being a parameter of a previously defined instance of a project;

(b) via a web browser interface, designating the at least one parameter as a link to the parameter of the previously defined instance of a project; and (c) using the link designation to change the structure of the database system, wherein the structure of the database system is not limited to a tree structure.

* * * * *